US007156442B2

(12) United States Patent
McManus et al.

(10) Patent No.: US 7,156,442 B2
(45) Date of Patent: Jan. 2, 2007

(54) ADJUSTABLE VEHICLE SEAT

(75) Inventors: Patrick W. McManus, Bloomington, IN (US); Martin P. McManus, Mishawaka, IN (US)

(73) Assignee: The Riverbank LLC, Bloomington, IN (US)

(*) Notice: Subject to any disclaimer, the term of this patent is extended or adjusted under 35 U.S.C. 154(b) by 0 days.

(21) Appl. No.: 10/842,143

(22) Filed: May 10, 2004

(65) Prior Publication Data

US 2004/0256894 A1    Dec. 23, 2004

Related U.S. Application Data

(60) Provisional application No. 60/480,204, filed on Jun. 20, 2003.

(51) Int. Cl.
*B60N 2/02* (2006.01)
(52) U.S. Cl. ..................... 296/65.09; 297/92
(58) Field of Classification Search ............. 297/93, 297/92, 61, 283.1, 283.2, 283.3, 316, 313, 297/344.1, 403, 404, 407, 410, 391, 65.09, 297/397, 283.4, 256.14; 296/65.01, 65.09
See application file for complete search history.

(56) References Cited

U.S. PATENT DOCUMENTS

| 3,336,071 | A |   | 8/1967  | Neale et al. |
|-----------|---|---|---------|--------------|
| 3,964,785 | A |   | 6/1976  | Plume |
| 4,081,051 | A |   | 3/1978  | Logsdon |
| 4,198,091 | A |   | 4/1980  | Appleton |
| 4,466,662 | A | * | 8/1984  | McDonald et al. .......... 297/406 |
| 4,840,427 | A |   | 6/1989  | Hong |
| 5,056,849 | A | * | 10/1991 | Norris et al. ............ 296/65.05 |
| 5,076,640 | A |   | 12/1991 | Bulte |
| 5,273,336 | A |   | 12/1993 | Schubring et al. |
| 5,431,360 | A | * | 7/1995  | Yu ......................... 244/122 R |
| 5,951,104 | A | * | 9/1999  | Tsuchiya et al. ............ 297/316 |
| 6,074,010 | A | * | 6/2000  | Takeda ........................ 297/391 |
| 6,155,626 | A |   | 12/2000 | Chabanne et al. |
| 6,199,945 | B1|   | 3/2001  | Kim |
| 6,494,531 | B1|   | 12/2002 | Kim |
| 6,715,825 | B1|   | 4/2004  | Tame |

\* cited by examiner

*Primary Examiner*—Milton Nelson, Jr.
(74) *Attorney, Agent, or Firm*—Baker & Daniels LLP

(57) ABSTRACT

An adjustable seat for a vehicle includes a first support and a second support connected to the first support to form a seat, a mount for attachment to the vehicle floor; and an adjustment mechanism. The seat is movable between a forward orientation wherein the second support faces forward and a rearward orientation wherein the first support faces rearward.

62 Claims, 54 Drawing Sheets

ADJUSTABLE VEHICLE SEAT

CROSS-REFERENCE TO RELATED APPLICATION

This application claims benefit of U.S. Provisional Application Ser. No. 60/480,204, filed Jun. 20, 2003, titled Adjustable Vehicle Seat, the disclosure of which is expressly incorporated by reference herein.

FIELD OF THE INVENTION

The present invention generally relates to an adjustable seat for a vehicle, and more particularly to a seat that is adjustable between a forward orientation and a rearward orientation.

BACKGROUND OF THE INVENTION

Most vehicle seats are mounted to the vehicle in a forward facing orientation. Under many circumstances, the forward facing orientation of vehicle seats is adequate. Under certain circumstances, however, the comfort and convenience of the vehicle occupants would be enhanced if the seats were adjustable to a rearward facing orientation. For example, in vehicles having three or more rows of seats, occupants of the second row of seats may desire rearward facing seats to converse with or otherwise interact with forward facing occupants of the third row of seats. Alternatively, passengers in a watercraft may desire rearward facing seats to view others skiing or otherwise being towed behind the watercraft.

Some conventional seats are adjustable in that they may be configured to be raised, lowered, moved forward or rearward, reclined, or folded flat. None of these adjustments, however, change the orientation of the seat relative to the forward direction of the vehicle. Other conventional seats swivel between a forward facing orientation and other orientations relative to the forward direction of the vehicle. Such swivel seats, however, are deficient for various reasons. For example, swivel seats require clearance along the sides of the seats to facilitate the swiveling movement of the seat. As such, swivel seats cannot be placed directly adjacent another seat or other object that is mounted to or a part of the vehicle.

SUMMARY OF THE INVENTION

The present invention provides an adjustable seat that is movable between a forward orientation and a rearward orientation while remaining mounted to the floor of the vehicle. Additionally, a seat of the present invention may be moved between the forward orientation and the rearward orientation with minimal or no clearance between the sides of the seat and adjacent structure of the vehicle.

The features and advantages of the present invention described above, as well as additional features and advantages, will be readily apparent to those skilled in the art upon reference to the following description and the accompanying drawings.

DETAILED DESCRIPTION OF EMBODIMENTS OF THE INVENTION

The embodiments described below are merely exemplary and are not intended to limit the invention to the precise forms disclosed. Instead, the embodiments were selected for description to enable one of ordinary skill in the art to practice the invention.

Figure 1:
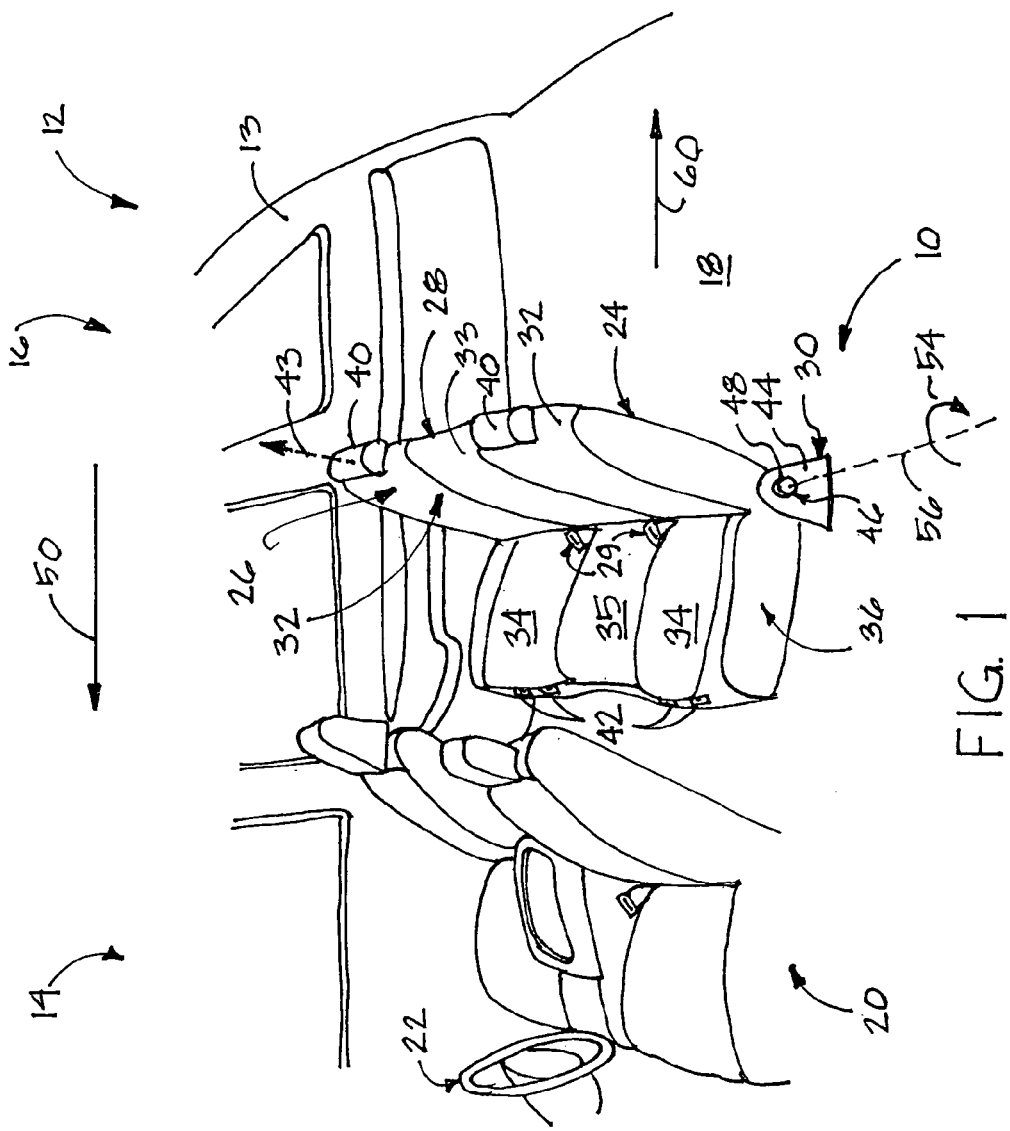
FIG. 1 is a fragmented perspective view of a vehicle having an adjustable seat according to the present invention in a forward orientation.
Figure 2:
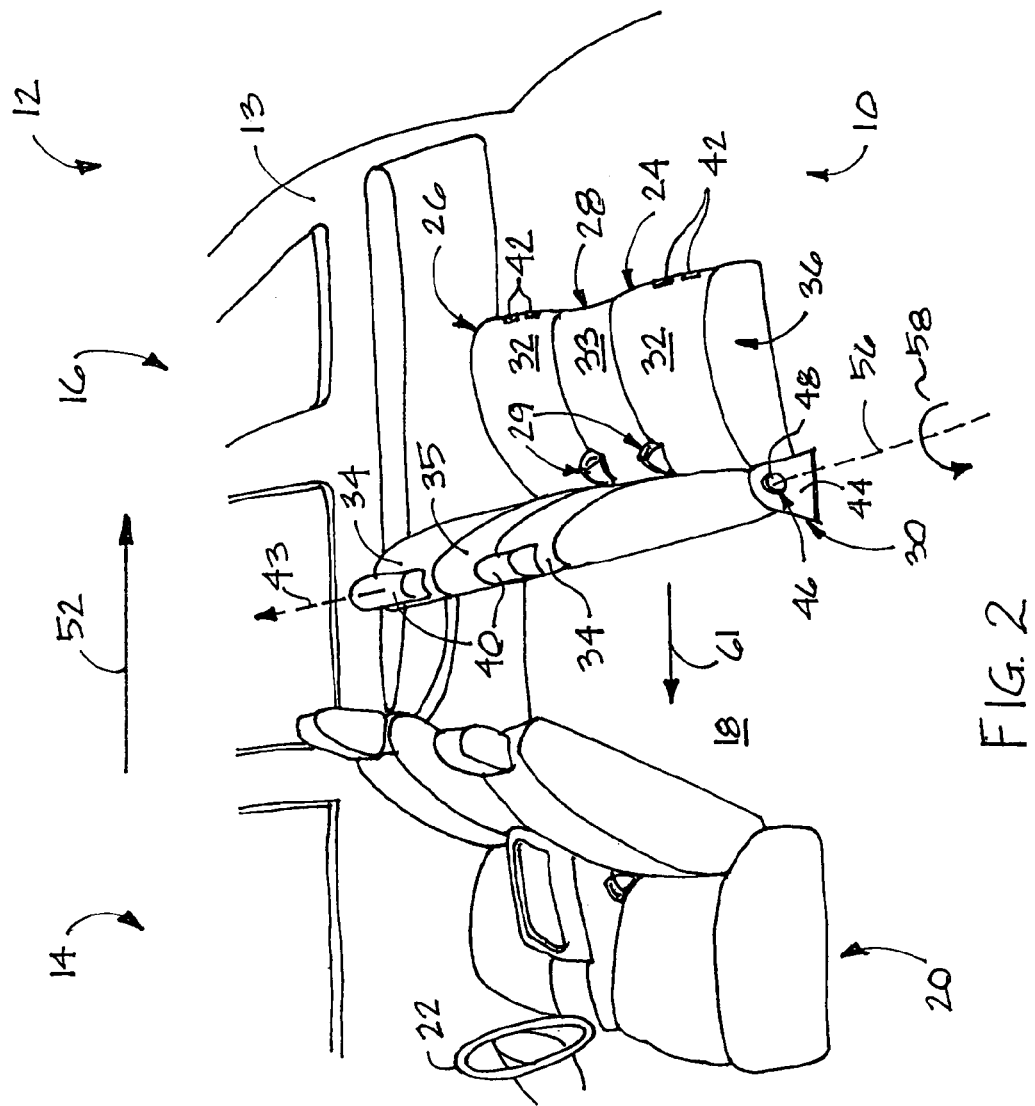
FIG. 2 is a fragmented perspective view similar to FIG. 1 with the seat shown in a rearward orientation.

Referring now to the drawings, an adjustable seat 10 according to the present invention is shown in FIGS. 1 and 2 as it would appear in a vehicle 12. Vehicle 12 may be any of a large variety of different categories of passenger and cargo vehicles including, for example and without limitation, cargo vans, mini vans, full size vans, SUVs, cross-over vehicles, pick-up trucks, limousines, boats, airplanes, and other similar types of vehicles.

As shown in FIGS. 1 and 2, vehicle 12 generally includes a body 13, a front end 14, a back end 16, a floor 18, a roof (not shown), a first row of seats 20, a steering wheel 22, and an adjustable seat 10 according to the present invention. It should be understood that while only one adjustable seat 10 is shown in the embodiment of FIGS. 1 and 2, any number of adjustable seats 10 could be used.

As shown in FIGS. 1 and 2, adjustable seat 10 generally includes a first seat 24, a second seat 26, a middle seat 28 positioned between first seat 24 and second seat 26, seat belt receptacles 29 configured to receive seat belts (not shown), and two or more adjustable mounts 30 located on opposite sides of adjustable seat 10 (only one mount 30 is shown). In the embodiment shown, adjustable seat 10 is a bench seat. It should be understood that any seat configuration could also be used such as bucket seats, split seats, or individual seats, including passenger seats (all not shown). Each of seats 24, 26 includes a first support 32, a second support 34, opposite facing side sections 36, removable headrests 40, and openings 42 configured to receive headrests 40. It should be understood that a single support having two sections may be used. Middle seat 28 includes a first support 33 and a second support 35. In the embodiment shown, supports 33, 35 are similar to supports 32, 34 only with no headrest 40 or openings 42. It should be understood that middle seat 28 could be replaced with a console (not shown) or removed completely. In such an embodiment, first seat 24 and second seat 26 would be configured as captain's seats. It should also be understood that a single adjustable seat 10 may be provided according to the present invention, without regard to the location of the seat within vehicle 12. It should be further understood that the teachings of the present invention may readily be adapted for use with the various expansion portions and other apparatuses disclosed in the provisional patent applications entitled "Apparatus for Configuring the Cargo Area of a Vehicle" Ser. No. 60/476,257 and "Apparatus for Configuring the Interior Space of a Vehicle" Ser. No. 60/476,155 both of which were filed Jun. 5, 2003, the entire disclosures of which are hereby expressly incorporated herein by references.

First seat 24, second seat 26, and middle seat 28 may be configured to perform any number of conventional seat operations including folding flat, being removed, or moved on either a track or additional mounting points (none shown) forward or backward to adjust spacing between the seat and first row of seats 20. Seat belts (only seat belt receptacles 29 are shown) could be removed or replaced by any restraint system such as a four-point harness, a three-point harness, or a lap belt. Also, the restraints could include movable seat belt mounts (not shown). In the embodiment shown, the seat belts (not shown) remain mounted in a single position. Also, it should be understood that any of a variety of headrest configurations could be incorporated with the teachings of the present invention including removable headrests 40, retractable headrests (not shown), or no headrests, as is more fully described below. In the embodiment shown, headrests 40 are received by openings 42 on first support 32 in FIG. 1 and by openings 42 on second support 34 in FIG. 2.

Headrests 40 are placed in openings 42 on support 32 or support 34 depending upon which support is in a substantially vertical position to support the back of a person, as described in detail below. To remove headrest 40, an operator may release a conventional release mechanism and lift headrest 40 in an upward direction 43 when the headrest is located on the top of its respective support 32 or 34.

Each of mounts 30 include a bracket 44 configured to be coupled to floor 18 of vehicle 12 (although bracket 44 could be configured to be coupled to any suitable location in vehicle 12, such as the ceiling, sidewalls, rear wall, or a movable portion of the vehicle as described in the above-referenced patent applications), a rod 46 extending between bracket 44 and one of side sections 36, and an opening 48 in bracket 44 configured to receive rod 46. Rod 46 may be a single rod extending the width of adjustable seat 10. Several alternatives for rod 46 could be used including two separate rods, each extending from one of supports 32 or 34 at side sections 36 into openings or recesses formed in brackets 44, or extending from brackets 44 to side sections 36. In the embodiment shown, each rod 46 is permitted to rotate in opening 48.

Adjustable seat 10 moves between a forward facing orientation shown in FIG. 1 and a rearward facing orientation shown in FIG. 2. As is further explained below, seat 10 may be moved manually or automatically using any of the drive mechanisms described herein. FIG. 1 shows adjustable seat 10 in a forward orientation facing direction 50 (the forward direction of vehicle 12) and FIG. 2 shows adjustable seat 10 in a rearward orientation facing direction 52. In FIG. 1, supports 32, 33 are positioned facing direction 50 at an angle relative to floor 18 to support the backs of occupants of seat 10 and supports 34, 35 are positioned at another, smaller angle relative to floor 18 to support the seats of the occupants. In this orientation, supports 32, 33 may be substantially vertical relative to floor 18, and supports 34, 35 may be substantially horizontal relative to floor 18. In FIG. 2, supports 32, 33 are positioned at an angle relative to floor 18 to support the seats of the occupants and supports 34, 35 are positioned facing direction 52 at a larger angle relative to floor 18. Adjustable seat 10 rotates from the forward orientation in a direction 54 about an axis 56 to the rearward orientation, as shown in FIG. 1. Adjustable seat 10 rotates from the rearward orientation in a direction 58 about axis 56 to the forward orientation, as shown in FIG. 2.

Seat 10 moves between the forward and rearward orientation while requiring minimal clearance adjacent side sections 36. This feature is in contrast to swivel seat configurations that require substantial clearance between the sides of the seat and adjacent structure, such as a door or wall of the vehicle. Additionally, it should be noted that, in this embodiment, seat 10 requires clearance in directions 52, 50 substantially corresponding to the length by which support 32 extends horizontally from mount 30 when seat 10 is in the rearward orientation and the length by which support 34 extends horizontally from mount 30 when seat 10 is in the rearward orientation, respectively.

As described above, prior to rotation of adjustable seat 10, the operator removes headrests 40 from openings 42. Next, the operator releases a locking mechanism (not shown), which when engaged, prevents movement of adjustable seat 10. The locking mechanism (not shown) can be a mechanical or automatic latch, lock or handle that is configured to keep adjustable seat 10 from moving, as is further described herein. After releasing the locking mechanism (not shown), the operator pushes or pulls seat 24, seat 26, or seat 28 in direction 60 to initiate rotation of adjustable seat 10. During rotation, rod 46 rotates in direction 54 about axis 56 in opening 48 facilitating the movement of adjustable seat 10. Once adjustable seat 10 is in position, the operator engages the locking mechanism (not shown). It can be appreciated that the locking mechanism could automatically engage when adjustable seat 10 is in the correct position and/or automatically disengage when seat 10 is to be moved from a particular position. The operator then places headrests 40 in openings 42. FIG. 2 shows adjustable seat 10 in the rearward orientation after the operator rotates adjustable seat 10 as described above. After releasing the locking mechanism (not shown), the operator pushes or pulls seat 24, seat 26, or seat 28 in direction 61 and reverses the steps above to move the adjustable seat 10 from the rearward orientation back to the forward orientation.

Figure 3:
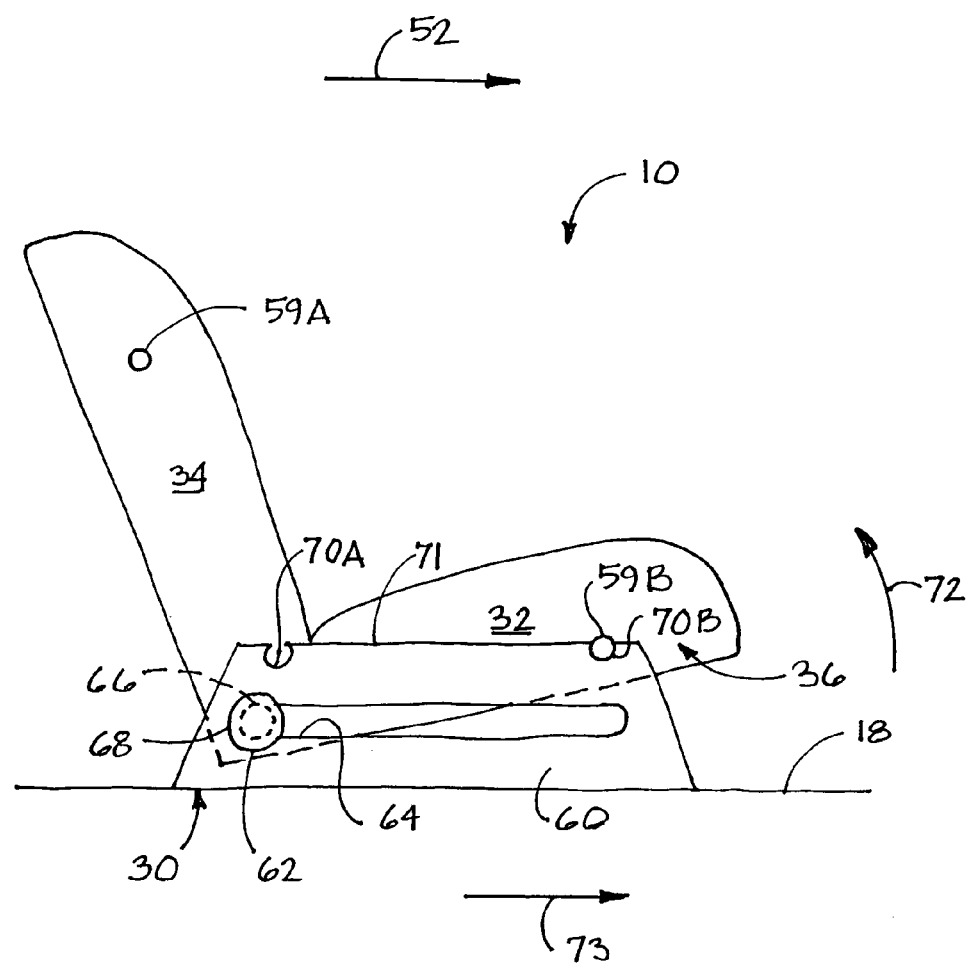
FIG. 3 is a side elevational view of another embodiment of an adjustable seat according to the present invention shown in a rearward orientation.
Figure 4:
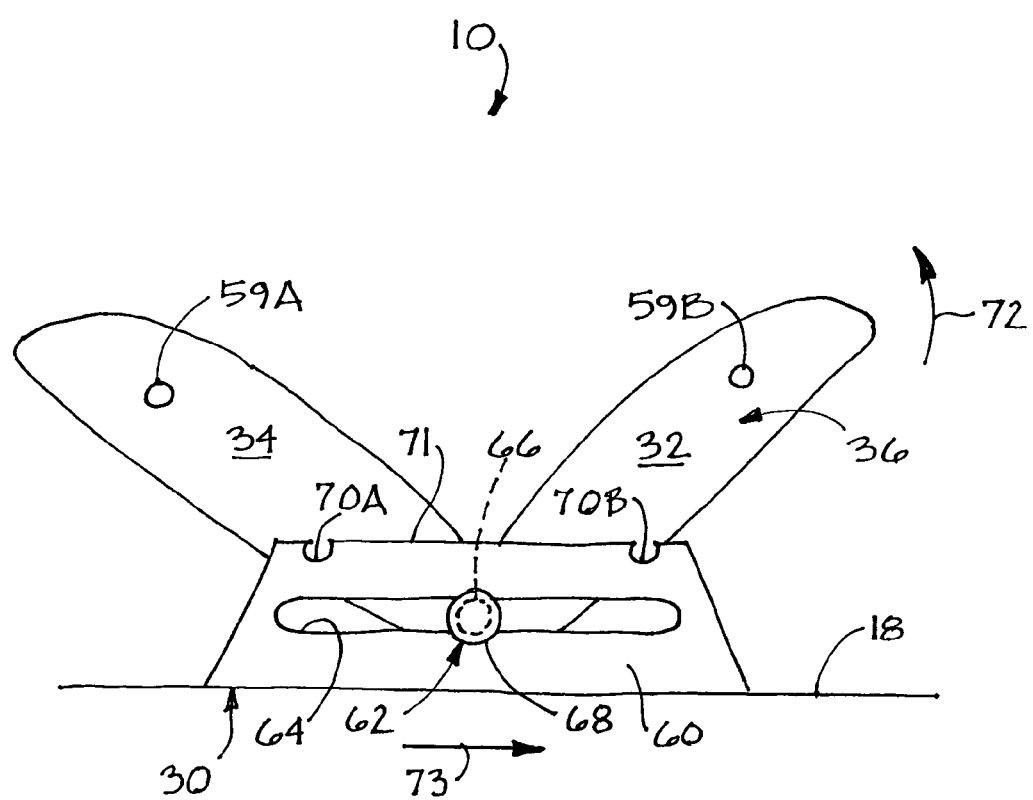
FIG. 4 is a side elevational view of the seat of FIG. 3 shown in a position between the rearward orientation and a forward orientation.
Figure 5:
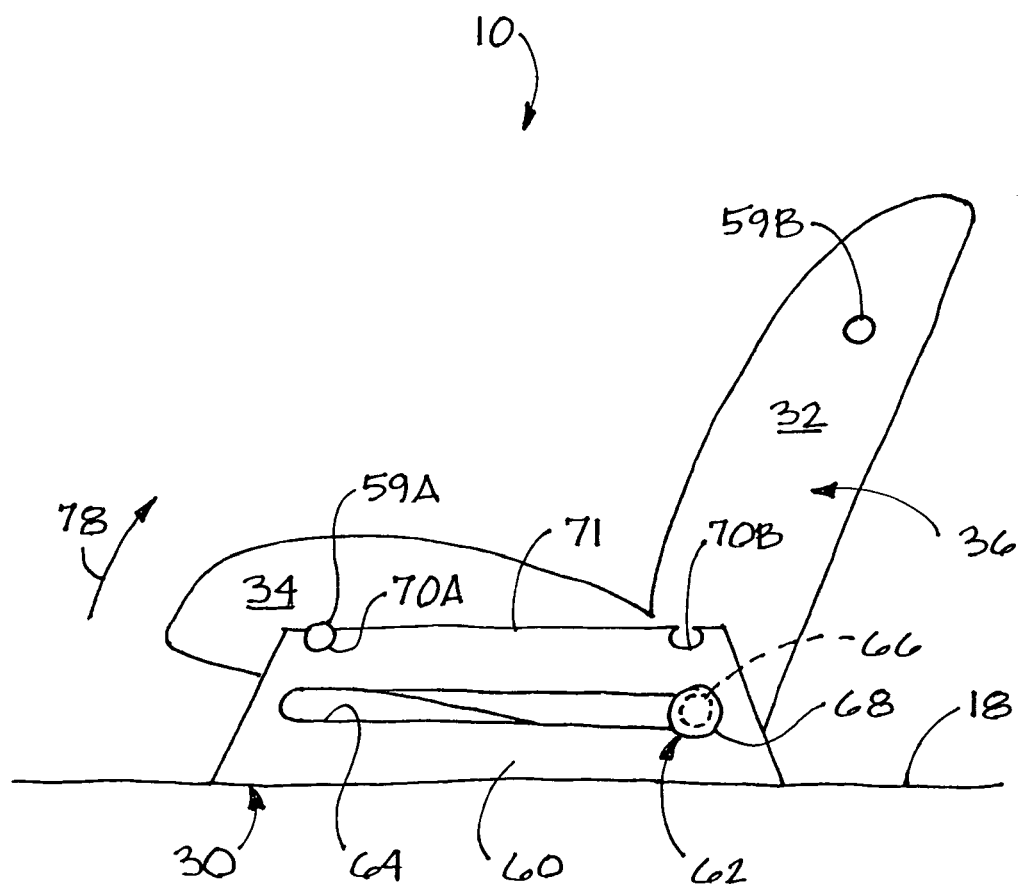
FIG. 5 is a side elevational view of the seat of FIG. 3 shown in the forward orientation.

FIGS. 3–5 show an alternate embodiment of the present invention. Since various components of the embodiments described herein, including components of the embodiment of FIGS. 3–5, are substantially identical to corresponding components in the previous figures, the same reference designations will be use for those components. Like the previous embodiment, adjustable seat 10 is configured to be mounted inside a vehicle. Only one adjustable seat 10 is shown but multiple adjustable seats could be used.

As shown in FIGS. 3–5, adjustable seat 10 includes a first support 32, a second support 34 connected to first support 32 to define side sections 36 (only one shown) on opposite sides of adjustable seat 10, and adjustable mounts 30 (only one shown). Supports 32, 34 include four pins 59A, 59B (only two shown) extending outward from side sections 36. Pins 59A, 59B could be two solid pins extending the width of support 32, 34 or four short pin segments that extend outwardly from an internal frame (not shown) of seat 10. Alternatively, only two pin segments may be used, each extending from the same side section 36 of seat 10 to interact with a single mount 30 as described below. Mounts 30 include two brackets 60 located opposite of each other and coupled to floor 18 (or any other suitable structure of vehicle 12), a rod 62 coupled to side sections 36 of seat 10, and an opening 64 in each of brackets 60 configured to receive rod 62. Rod 62 includes an inner body 66 configured to move in opening 64 and a larger dimension outer body 68 configured to prevent inner body 66 from moving out of opening 64. Brackets 60 further include four notches 70A, 70B (only two shown) located on an upper edge 71 of the brackets and configured to receive pins 59A, 59B to prevent movement of adjustable seat 10 as is further described below.

FIG. 3 shows adjustable seat 10 in the rearward orientation. To initiate a change of position, an operator releases a locking mechanism (not shown), which may lock pins 59A, 59B into notches 70A, 70B or otherwise prevent movement of adjustable seat 10. The locking mechanism (not shown) can be a mechanical or automatic latch, lock or handle that is configured to keep adjustable seat 10 from rotating. After releasing the locking mechanism (not shown), the operator moves seat 10 in direction 72 causing pins 59B to move from rearward notches 70B, as shown in FIG. 3. After pins 59B of support 32 are free from notches 70B, the operator pushes or pulls support 32 or support 34 in direction 73. This motion causes rod 62 to slide in direction 73 as suggested by FIG. 4. When rod 62 reaches the end of opening 64, the operator again pushes or pulls support 32 or support 34 in direction 72. This allows pins 59A of support 34 to engage with forward notches 70A, thereby locking adjustable seat 10 in the forward orientation as shown in FIG. 5. To move adjustable seat 10 from the forward orientation to the rearward orientation, the operator releases the locking mechanism (not shown), pushes support 32 or support 34 in direction 78, and reverses the steps described above.

It should be understood that in this embodiment, the clearance required in directions 50, 52 is less than that required for the embodiment of FIGS. 1 and 2. More specifically, in this embodiment, supports 32 and 34 extend horizontally from mounts 30 by substantially the same distances, regardless of whether seat 10 is positioned in a forward orientation or a rearward orientation. This reduced "adjustment footprint" (as compared to that of the previous embodiment) is a result of the travel of seat 10 along opening 64 during the forward or rearward adjustment. In fact, one skilled in the art could readily modify the positions of notches 70A, B and the configuration of opening 64 to result in any desired "adjustment footprint."

Figure 6:
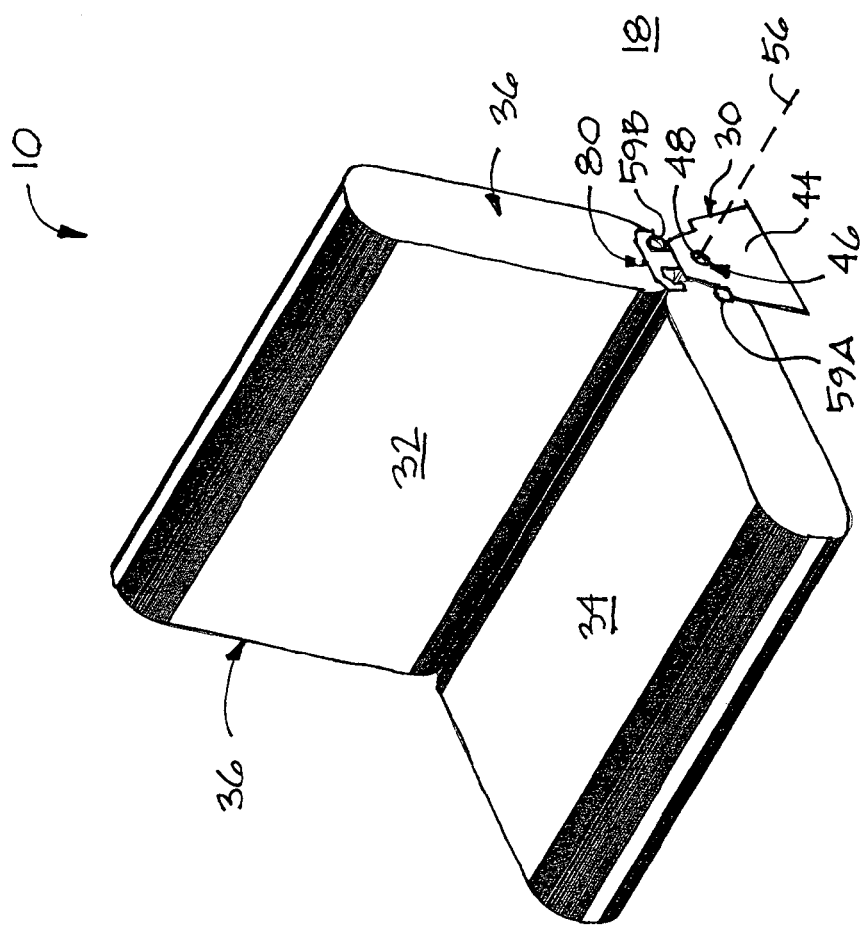
FIG. 6 is a perspective view of another embodiment of an adjustable seat according to the present invention shown in a forward orientation.

Referring now to FIGS. 6 through 10, another embodiment of an adjustable seat according to the present invention is shown. Since the embodiment of FIGS. 6 through 10 shares many components that are the same or similar to previously described embodiments, the same reference designations will be used for such common components. As best shown in FIG. 6, seat 10 generally includes a pair of mounts 30 (one shown) adapted for connection to floor 18 of vehicle 12 (or any other suitable structure), a first support 32, a second support 34 connected to first support 32 to form a pair of side sections 36, and a pair of retainers 80 (one shown) coupled between side sections 36 and mounts 30. It should be understood that while use of two retainers 80 is described herein, a single retainer 80 may be used to accomplish the same locking function. Since each of mounts 30 and each of retainers 80 are substantially identical to one another, only one is described herein.

Each of side sections 36 of seat 10 includes a pair of pins 59A, 59B that extend substantially perpendicularly from side sections 36. Again, however, a single set of pins may be used. As is further described below, pins 59A, 59B are positioned to be received by notches 70A, 70B, respectively, formed by edge 71 of mount bracket 44, depending upon the position or orientation of seat 10. Additionally, a rod 46 extends through seat 10 into openings 48 formed in mounts 30. Rod 46 may function as the pivot member for seat 10 and a guide for movement of retainers 80. Instead of a single rod 46, a pair of rods 46 may be provided, one extending from each of side sections 36 into a respective opening 48 of a respective mount 30. As indicated above, it should be understood that instead of rods 46 extending from seat 10 into openings of mounts 30, rods 46 may extend into recesses formed in mounts 30, or rods 46 may extend from mounts 30 into openings or recesses formed in side sections 36 of seat 10. Of course, other suitable connections between seat 10 and mounts 30 may readily be incorporated into the present invention for providing a movable connection between seat 10 and mounts 30 wherein seat 10 rotates about an axis 56.

Figure 7:
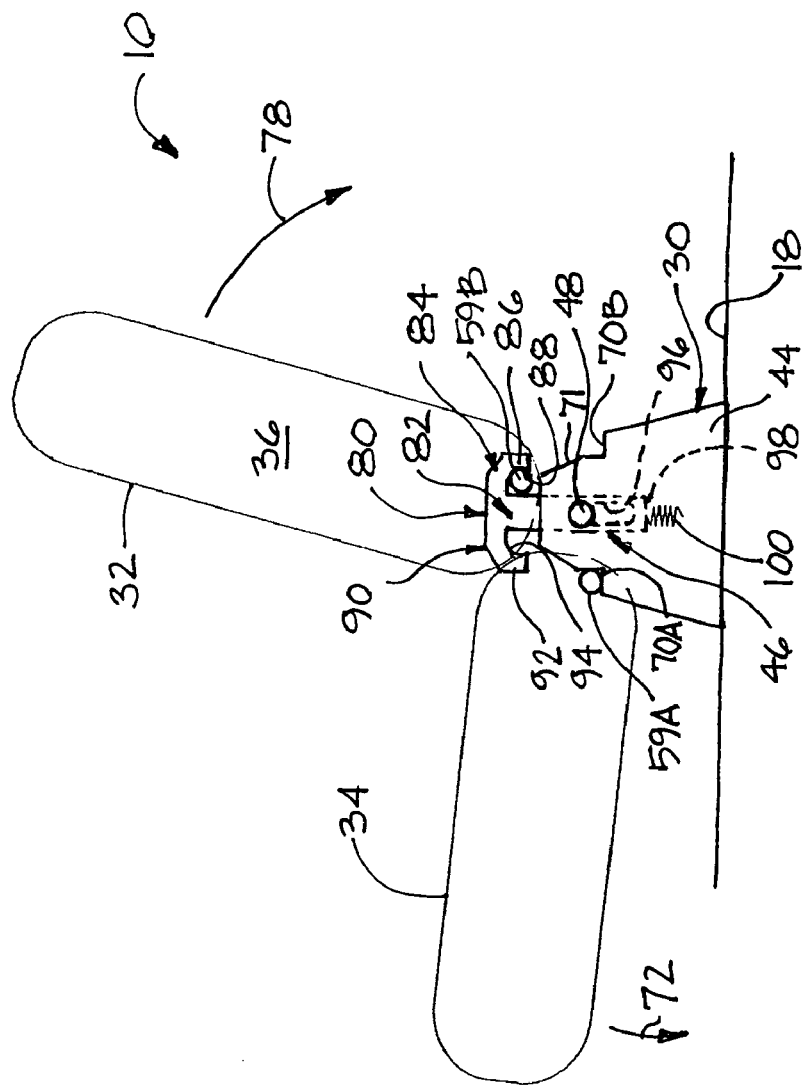
FIG. 7 is a side elevational view of the seat of FIG. 6.

Referring now to FIG. 7, retainer 80 is shown as further including a body 82 from which extends a first arm 84 having a downwardly projecting segment 86 forming a notch 88, and a second arm 90 having a downwardly projecting segment 92 forming a notch 94. Body 82 of retainer 80 also includes an opening 96 shown as an elongated slot extending along a longitudinal axis of body 82. A free end 98 of body 82 is connected to a biasing element 100, which is connected to bracket 44 of mount 30. While in the depicted embodiment, biasing element 100 is a helical spring, it should be understood that any type of flat, spiral or helical spring, or other type of biasing element, may be used consistent with the teachings of the present invention. In an alternate embodiment, retainer 80 is biased upwardly and arms 84, 90 include upwardly projecting segments to form notches 88, 94.

As indicated above, seat 10 is shown in the forward orientation in FIG. 7. In this orientation, pin 59A is received by notch 70A, rod 46 extends though both opening 96 of retainer body 82 and opening 48 of bracket 44, and pin 59B is captured within notch 88 of first arm 84 to prevent rotation of seat 10. More specifically, the downward biasing force exerted on retainer 80 by biasing element 100 (shown in a partially extended state), urges first arm 84 downwardly onto pin 59B such that notch 88 substantially surrounds all but the lower portion of pin 59B. Since retainer 80 (and first arm 84) is biased downwardly and connected to bracket 44 in a manner preventing movement of retainer 80 (except upward and downward movement along an axis that is parallel a longitudinal axis of opening 96), seat 10 is prevented from rotating about rod 48 in direction 78. It should also be noted that while retainer 80 similarly inhibits rotational movement in direction 72, pin 59A, which engages notch 70A of bracket 44, also prevents movement in direction 72.

Figure 10:
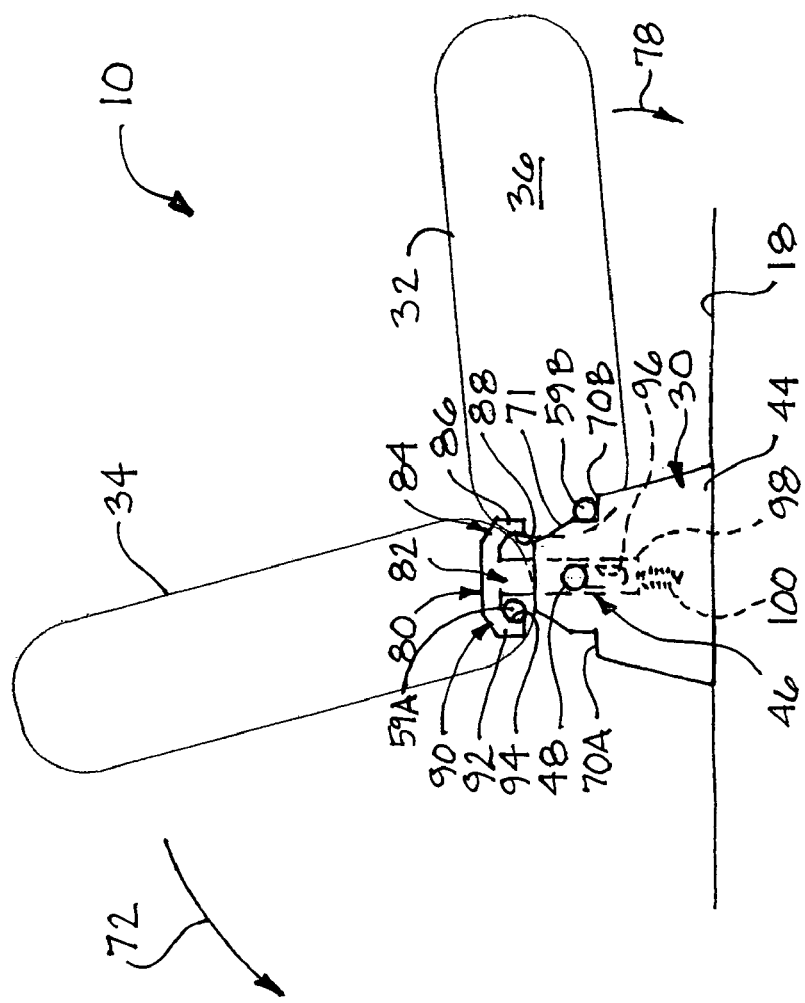
FIG. 10 is a side elevational view of the seat of FIG. 6 shown in the rearward orientation.

When a user desires to move seat 10 from the forward orientation of FIG. 7 to the rearward orientation of FIG. 10, the user first lifts retainer 80 upwardly, away from floor 18 of vehicle 12 and against the biasing force of biasing element 100. It should be understood that a handle (not shown) may be attached directly to retainer 80, or indirectly through levers, cables and pulleys, or any other suitable structure, to provide the user a convenient, easy-to-use manual actuation device for lifting retainer 80. Alternatively, retainer 80 may be lifted using an automatic (i.e., electric, hydraulic, pneumatic, magnetic, etc.) actuation device appropriately coupled to retainer 80 and activated by the user via a button or switch. Moreover, two or more retainers 80 may be linked together such that they move simultaneously to release (and lock) seat 10. It should further be understood that the same powered actuation device used to engage and disengage retainer 80 may also be configured to move seat 10 between the forward and rearward orientations. As retainer 80 is lifted, body 82 moves upwardly, opening 96 moves over rod 46, and first arm 84 moves out of engagement with pin 59B. Consequently, pin 59B (and seat 10) is free to rotate in direction 78.

Figure 8:
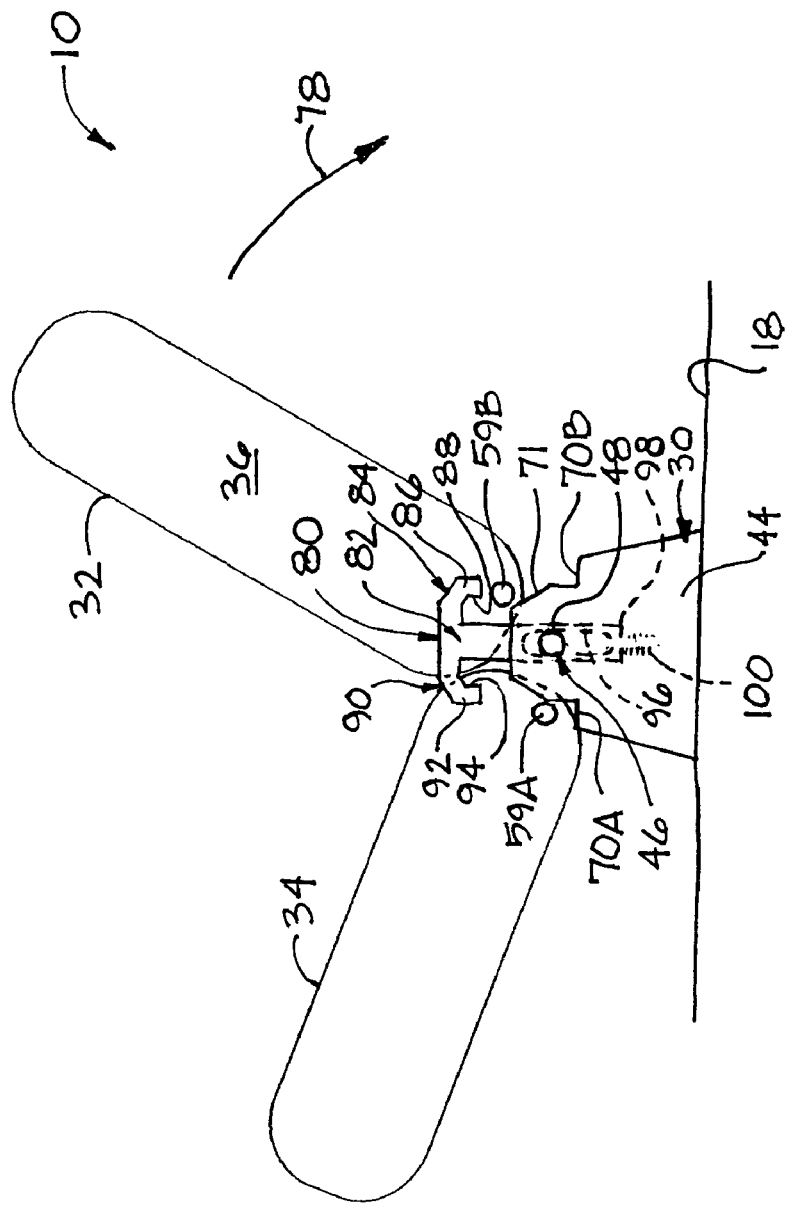
FIGS. 8 and 9 are side elevational views of the seat of FIG. 6 shown in intermediate positions between the forward orientation and a rearward orientation.
Figure 9:
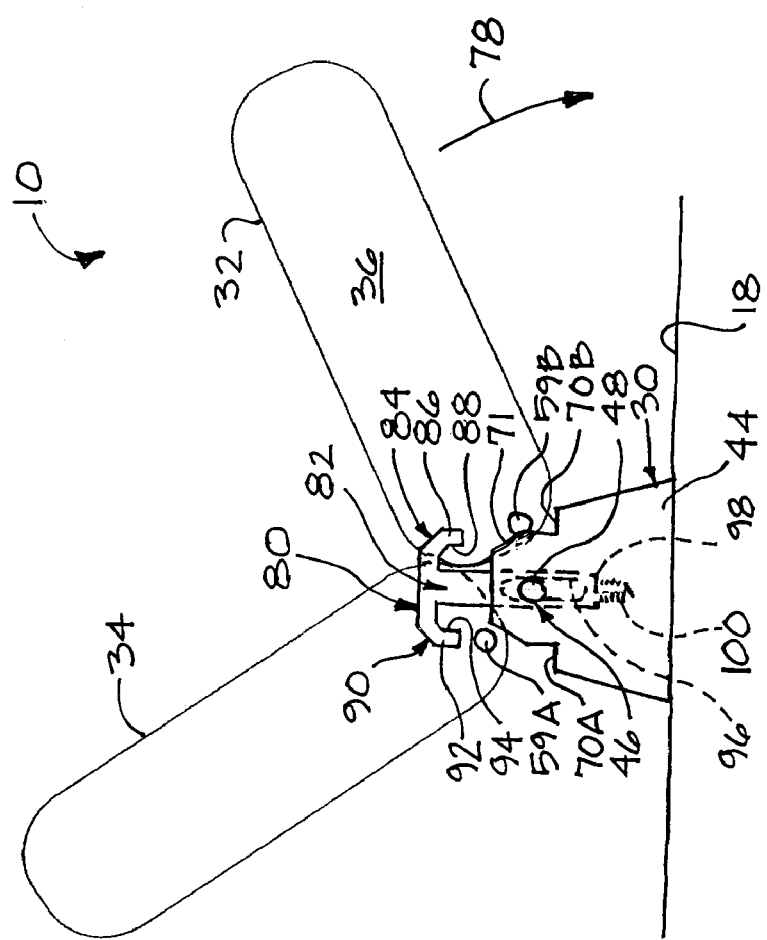

FIGS. 8 and 9 show retainer 80 in the above-described upward position with biasing element 100 in a farther extended state. FIG. 8 shows seat 10 after partial rotation about rod 46 in direction 78, and illustrates the position of pin 59B when freed from notch 88 and pin 59A after pivoting out of engagement with notch 70A. FIG. 9 shows seat 10 as it approaches the rearward orientation after further rotation in direction 78. In FIG. 9, pin 59A is nearly positioned under notch 94 of second arm 90, and pin 59B is approaching engagement with notch 70B of bracket 44.

After the user has fully rotated seat 10 in direction 78 to the rearward orientation shown in FIG. 10, the user releases (manually or automatically) retainer 80. Biasing element 100 draws retainer 80 in a downward direction toward floor 18 such that notch 94 of second arm 90 captures pin 59A in the manner described above with reference to notch 88 and pin 59B. As retainer 80 moves downwardly, opening 96 of body 82 moves over rod 46 and biasing element 100 returns to its partially extended state. The downward movement of retainer 80 may be stopped by engagement between rod 46 and the upper end of opening 96. In the rearward orientation shown in FIG. 10, rotation of seat 10 in direction 72 is prevented by retainer 80 and rotation of seat 10 in direction 78 is prevented by retainer 80 and the engagement between pin 59B and notch 70B in a manner similar to that described above with reference to seat 10 in the forward orientation. The user may return seat 10 to the forward orientation by reversing the above-described procedure.

The "adjustment footprint" of this embodiment is substantially the same as that of the embodiment of FIGS. 1 and 2.

Figure 11:
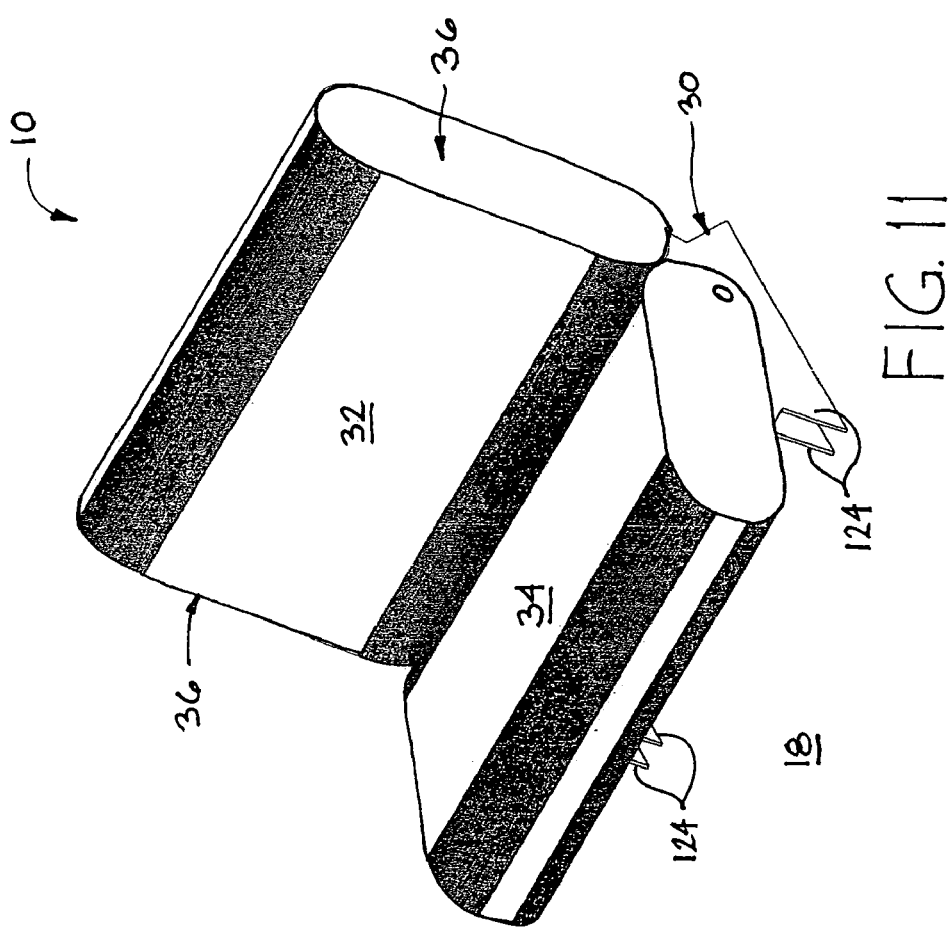
FIG. 11 is a perspective view of another embodiment of an adjustable seat according to the present invention shown in a forward orientation.
Figure 12:
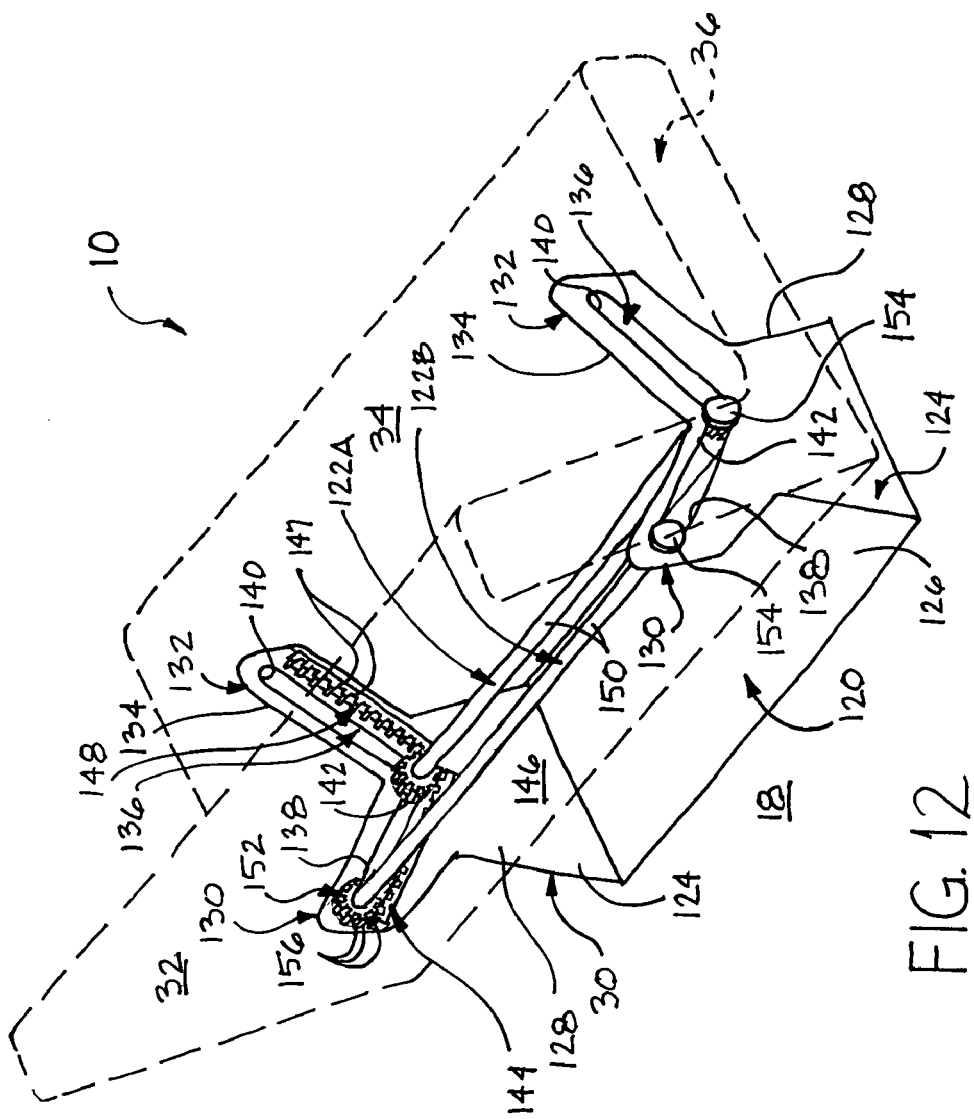
FIG. 12 is a perspective view of a mount according to the present invention.
Figure 13:
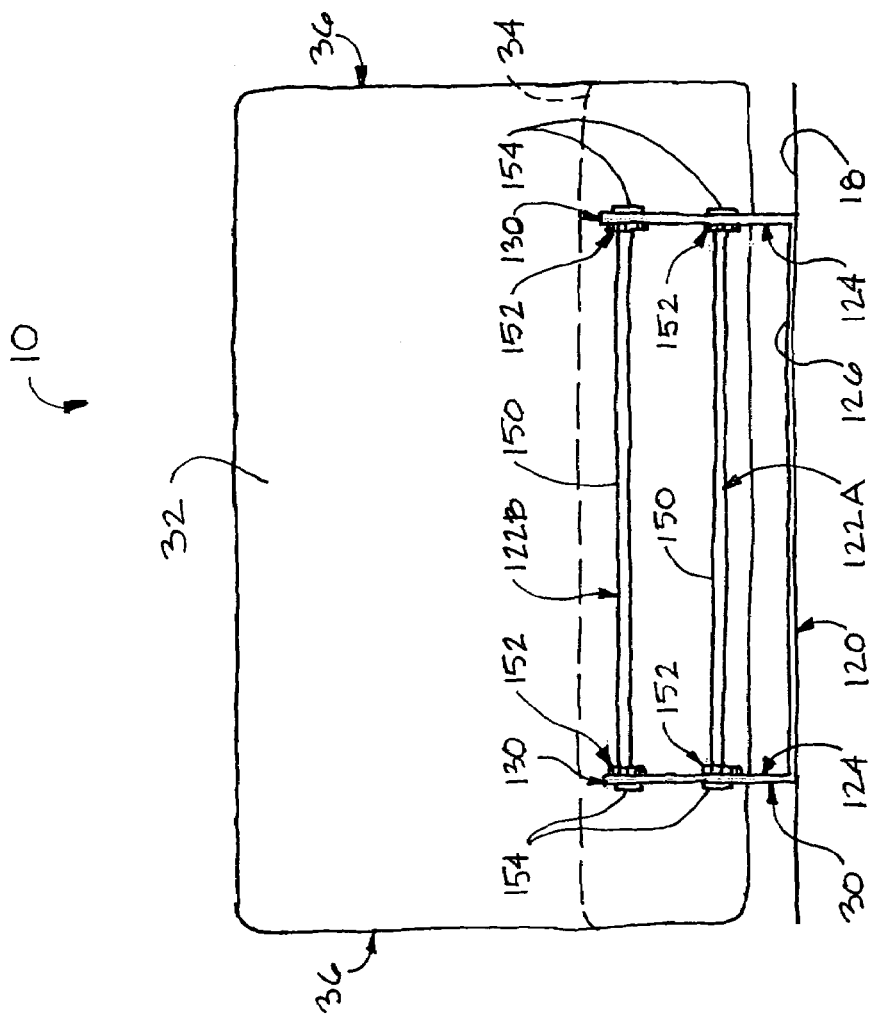
FIG. 13 is a rear elevational view of the mount of FIG. 12.

FIGS. 11–13 depict an alternate embodiment of an adjustable seat 10 according to the present invention. Seat 10 of these figures includes a plurality of components that are identical or similar to components described above. Accordingly, the same reference designations will be used for these shared components. Seat 10 of these figures differs primarily in that a modified mount 30 is provided for attaching the seat to vehicle 12 and moving the seat between a rearward position and a forward position.

As best shown in FIGS. 12 and 13, mount 30 generally includes a bracket 120 configured for connection to floor 18 (or any other suitable structure of vehicle 12) and a pair of drive mechanisms 122A, B. As will be further apparent from the following description, drive mechanisms are connected to seat 10 such that movement of drive mechanisms 122A, B relative to bracket 120 also causes movement of seat 10 relative to bracket 120. As will become apparent from the following description, a single drive mechanism could be used, with the other mechanism functioning as a follower.

FIG. 11 depicts bracket 120 of mount 30 as including a pair of plates 124 mounted to floor 18 adjacent each side 36 of seat 10. Alternatively, as shown in FIGS. 12 and 13, bracket 120 may include a single plate 124 adjacent each end 36 of seat 10. In this embodiment, plates 124 may be connected together by a lower plate 126, which is attached to floor 18. Plates 124 are mounted in substantially parallel relationship with one another, perpendicular to lower plate 126 and floor 18. Since plates 124 are substantially identical to one another, only one plate 124 is described in detail herein.

Plate 124 includes a body 128 having a first arm 130 and a second arm 132. Arms 130, 132 extend from body 128 at angle relative to one another to form a substantially V-shaped upper edge 134. It should be understood, however, that arms 130, 132 may assume any shape and upper edge 134 need not be V-shaped so long as the frame (not shown) of seat 10 is configured to accommodate the shape of body 128 during adjustment between the forward and the rearward positions. A slot 136 is defined in arms 130, 132 such that slot 136 is substantially V-shaped. Slot 136 includes a first portion or end 138 formed in first arm 130, a second portion or end 140 formed in second arm 132, and a midpoint 142 formed at the intersection between the two portions. As shown in the drawing, the two portions of slot 136 diverge from one another with distance from midpoint 142. Plate 124 further includes a rack 144 mounted on inside surface 146 of plate 124 adjacent slot 136 as shown in FIG. 12. As shown, rack 146 is also formed to follow the V-shape of slot 136. Rack 144 includes a plurality of teeth 148 formed along an upper edge 148 of rack 144 adjacent slot 136.

In the embodiment of FIGS. 12 and 13, each of drive mechanisms 122A, B include a shaft 150 having a pinion gear 152 mounted adjacent each end of shaft 150. Drive mechanisms 122A, B may further include a retainer 154 connected at each end of shaft 150 as is further described below. Pinion gears 152, however, may be configured to function as retainers as will be apparent from the following description. Shafts 150 of drive mechanisms 122A, B are mounted in spaced apart, parallel relationship to one another and connected to a frame (not shown) attached to first support 32 and second support 34 of seat 10. The connection between drive mechanisms 122A, B and the frame of seat 10 is such that shafts 150 (or at least pinion gears 152) can rotate about a corresponding longitudinal axis of shafts 150 but otherwise remain in a fixed position relative to the frame of seat 10. Each of pinion gears 152 include a plurality of teeth 156 that are sized to mate with teeth 147 of rack 144 such that rotation of shafts 150 and pinion gears 152 causes movement of drive mechanisms 122A, B along rack 144, thereby causing seat 10 to move between a rearward and a forward position as is further described below. It should be understood that the ends of shafts 150 move within slots 136 as pinion gears 152 move along racks 144. Retainers 154 have a dimension that is larger than the width of slots 136 to prevent the ends of shafts 150 from moving out of slots 136. As mentioned above, pinion gears 152 may perform this function.

A variety of different mechanisms may be employed, consistent with the teachings of the present invention, to cause rotation of pinion gears 152 and consequent movement of seat 10 between the forward position and the rearward position. For example, one or both of shafts 150 may be coupled through a linkage to a manual crank (or an opening for receiving a crank or drill bit) or other manual actuation device for causing rotation of shafts 150 and pinion gears 152, or rotation of pinion gears 152 alone.

Figure 14:
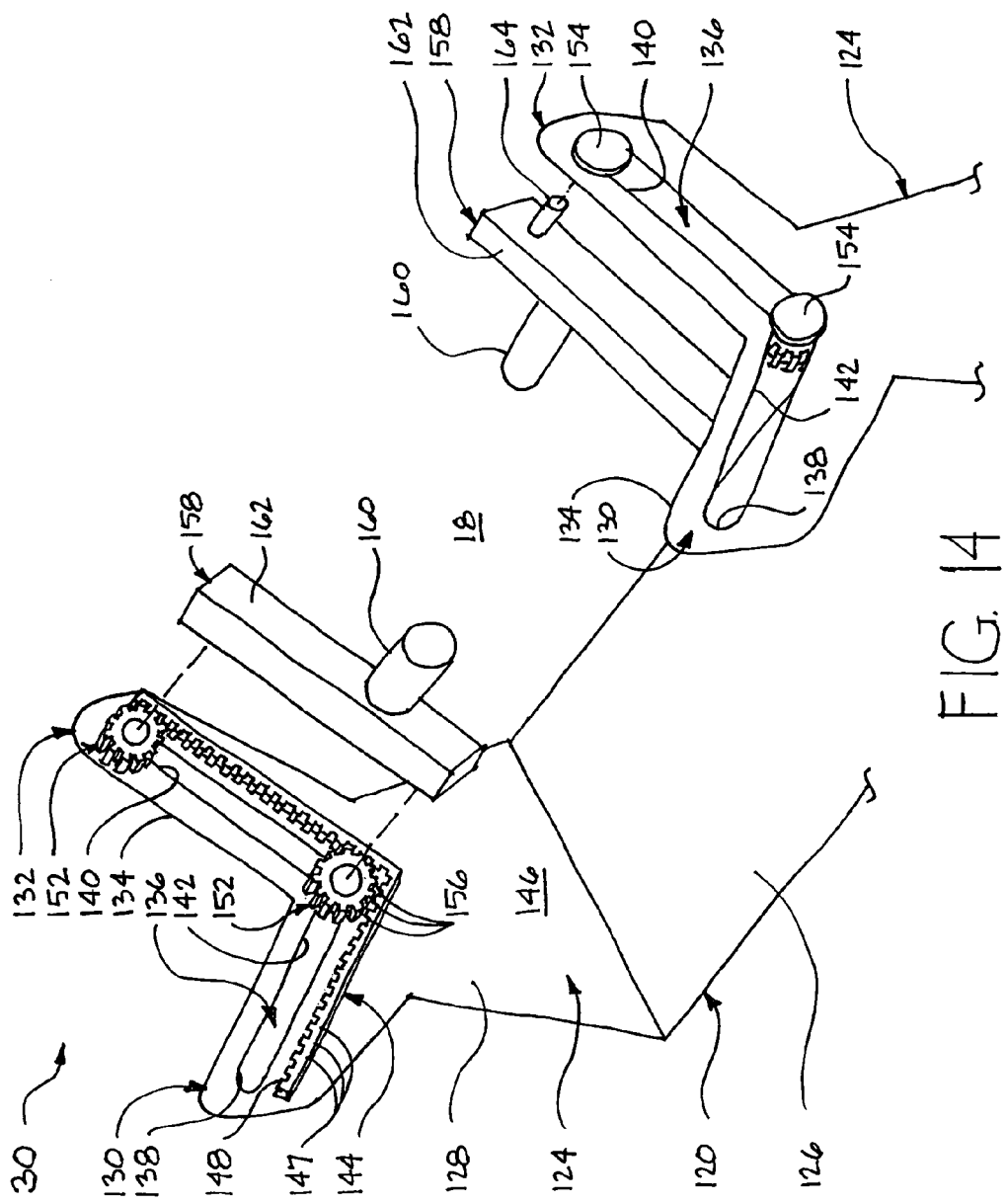
FIG. 14 is a partially fragmented, perspective view of another embodiment of a mount according to the present invention.

Alternatively, as shown in FIG. 14, shafts 150 may be replaced with a pair gear boxes 158, each being mounted to the frame (not shown) connecting first support 32 to second support 34. Each of gear boxes 158 includes an electric motor 160 connected to a housing 162. While electric motor 160 is described herein, one skilled in the art could readily replace motor 160 with a different power source such as a hydraulic or pneumatic drive. Housing 162 encloses gears or other structure for translating the force generated by motor 160 into rotation of a pair of drive rods 164 (one shown) which are respectively coupled to pinion gears 152. Accordingly, when motor 160 of gear box 158 is activated, drive rods 164 cause simultaneous rotation of pinion gears 152 connected thereto, thereby causing pinion gears 152 to move along rack 144 as is further described below. Gear boxes 158 may include a conventional self-locking feature such that rotation of drive rods 164 is prevented by gear boxes 158 when motors 160 are no longer activated. Alternatively, gear box 158 may be constructed to include a conventional brake mechanism which requires activation of motor 160 to release the brake. As such, the user of seat 10 may stop seat 10 in any of a plurality of locked positions between and including the forward position and the rearward position by simply deactivating motor 160.

Figure 15:
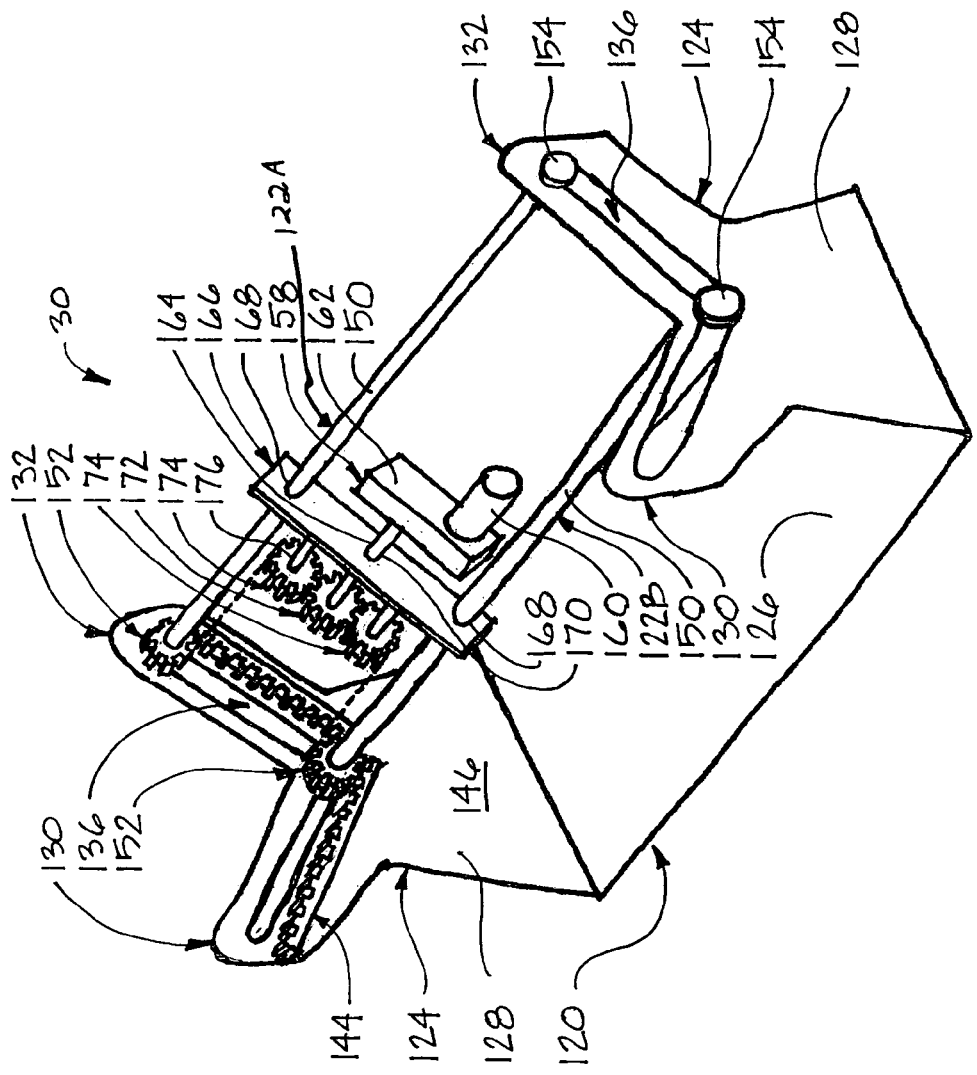
FIG. 15 is a perspective view of yet another embodiment of a mount according to the present invention.

Another embodiment of the drive mechanism is shown in FIG. 15. In this embodiment, a gear box 158 having a single drive rod 164 is mounted to the frame (not shown) of supports 32, 34 and/or a bracket 166. Bracket 166 includes a pair of openings 168 for receiving shafts 150, and a bore 170 for receiving drive rod 164. It should be understood that openings 168 may be sized such that shafts 150 are free to rotate within openings 168 (e.g., with the use of ring bearings), or sized such that shafts 150 are retained (or otherwise attached) to bracket 166. In the latter embodiment, pinion gears 152 would be rotatable relative to shaft 150. In the embodiment of FIG. 15, a drive pinion 172 is connected to drive rod 164 such that rotation of drive 164 causes rotation of drive pinion 172. Additionally, a pair of idler gears 174 is rotatably mounted on shafts 176, which are connected to bracket 166.

As indicated by the dotted lines shown in FIG. 15, bracket 166 may be mounted on shafts 150 such that the teeth of idler gears 174 mesh with teeth 156 of pinion gears 152. Additionally, the teeth of idler gears 174 are positioned to mesh with the teeth of drive pinion 172. Accordingly, when motor 160 is activated, drive rod 164 rotates, causing drive pinion 172 to rotate. For example, assuming drive pinion 172 rotates in a counter-clockwise direction as viewed in FIG. 15, its interaction with idler gears 174 causes idler gears 174 to rotate in a clockwise direction. Interaction between idler gears 174 and pinion gears 152 causes pinion gears 152 to rotate in a counter-clockwise direction. As such, pinion gears 152 move along rack 144 to the left as viewed in FIG. 15. Consequently, the position of seat 10 (not shown in FIG. 15) is adjusted.

Figure 16:
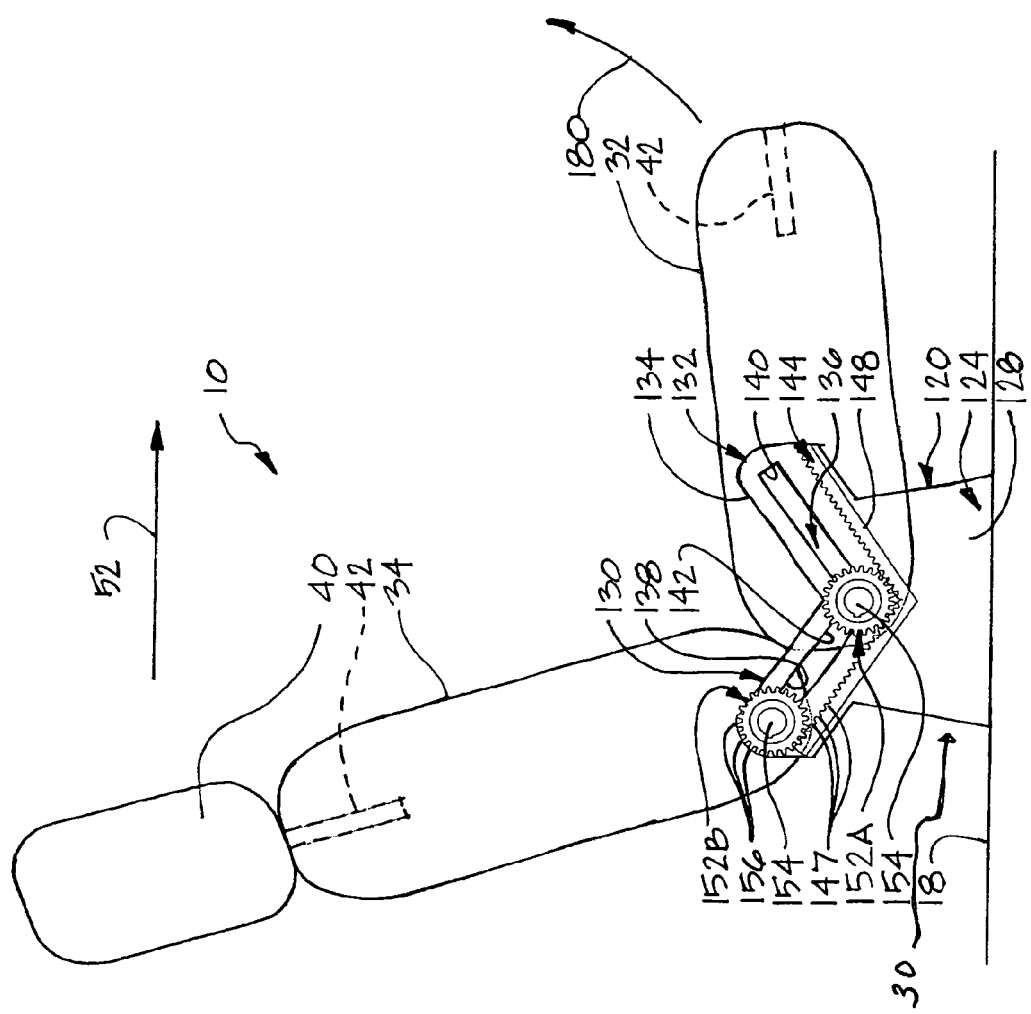
FIG. 16 is side elevational view of the seat of FIG. 11 shown in a rearward orientation.
Figure 17:
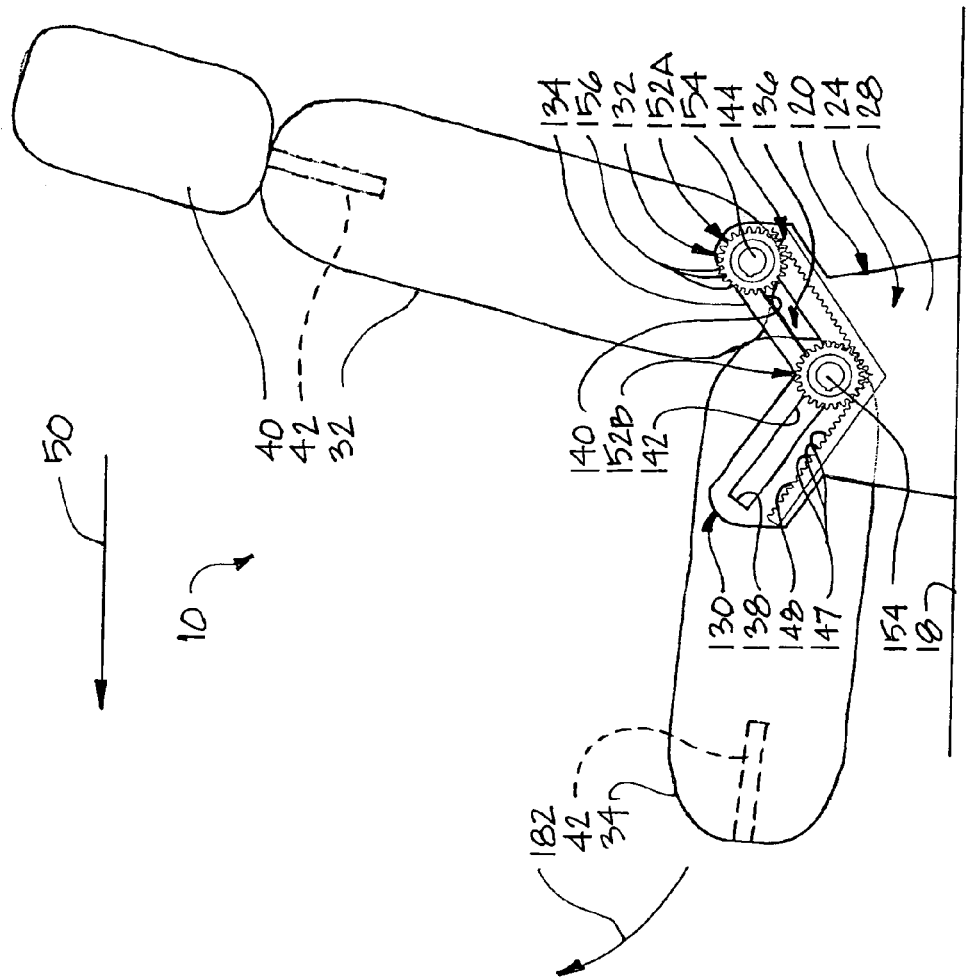
FIG. 17 is a side elevational view of the seat of FIG. 11 shown in a forward orientation.

FIGS. 16 and 17 illustrate the movement of seat 10 from a rearward position (FIG. 16) to a forward position (FIG. 17). Any of the above described drive mechanisms may be used to cause this movement. As shown in FIG. 16, seat 10 is positioned in a rearward facing orientation such that second support 34 faces direction 52. Headrest 40 is shown inserted in openings 42 of second support 34. Additionally, pinion gear 152B is positioned adjacent end 138 of slot 136, and pinion gear 158A is positioned adjacent midpoint 142 of slot 136. When a user either manually or automatically causes rotation of pinion gears 152A, B in a clockwise direction, for example, teeth 156 of pinion gears 152A, B mesh with teeth 147 of rack 144 such that pinion gears 152A, B move within slot 136 generally in direction 52. The V-shape of slot 136 and rack 144 causes seat 10 to rotate in direction 180 as pinion gear 152B moves downwardly and pinion gear 152A moves upwardly while both pinion gears 152A, B move in direction 52.

FIG. 17 shows seat 10 at the end of the above-described repositioning. Thus, support 32 is now in a forward orientation facing in direction 50. Additionally, pinion gear 152A is positioned adjacent end 140 of slot 136 and pinion gear 152B is position adjacent midpoint 142 of slot 136. It should be noted that headrest 40 is shown as having been removed from openings 42 of support 34 and inserted into openings 42 of support 32. Seat 10 may be repositioned to the rearward facing orientation by reversing the direction of the drive mechanism, thereby causing rotation of seat 10 in direction 182.

It should further be noted that, as compared to the seat embodiment of FIGS. 6–10, the embodiment of FIGS. 11–17 requires less clearance in directions 50 and 52 to move between the forward orientation and the rearward orientation. More specifically, since supports 32, 34 move, for example, in direction 52 as part of the rotation of seat 10 in direction 180, as opposed to pivoting about a fixed axis, support 34 does not extend from mount 30 in direction 50 when seat 10 is in the forward orientation as shown in FIG. 17 as far as support 34 would extend if supports 32, 34 were not shifted in direction 52 during the rotation of seat 10 in direction 180.

It should be further understood that any of the embodiments of seat 10 described herein may further incorporate a position sensor or sensors or other type of sensor or sensors that detect whether seat 10 is occupied when rotation is initiated, when seat 10 reaches the forward or rearward orientation, and whether the movement of seat 10 results in contact with an obstacle or item in the path of movement of seat 10. A conventional seat belt sensor may be used to determine whether seat 10 is occupied, since such sensors detect the weight an occupant. In such an embodiment, movement of seat 10 would be prevented when an occupant is detected. Such a conventional seat belt sensor would be present in both of supports 32, 34 since both function to support the seat of the occupant, depending upon the orientation of seat 10. Additionally, a position sensor based on any of a plurality of different sensing technologies (mechanical, optical, electrical, magnetic, etc.) may be incorporated into seat 10 to detect, for example, the presence of one of pinion gears 152A, B at one of ends 138, 140 of slots 136. Additionally, any of a variety of different interference detectors may be used, such as a current limiter coupled to a motor for driving pinion gears 152A, B. In such an embodiment, if seat 10 collides with another object (or, for that matter, an excessive load is present on seat 10), the motor that drives seat 10 draws an increased electrical current that is sensed by the current limiter. A signal is sent to a control circuit which deactivates the motor. A conventional circuit breaker of the appropriate size and rating may also be used to accomplish this function.

Figure 18:
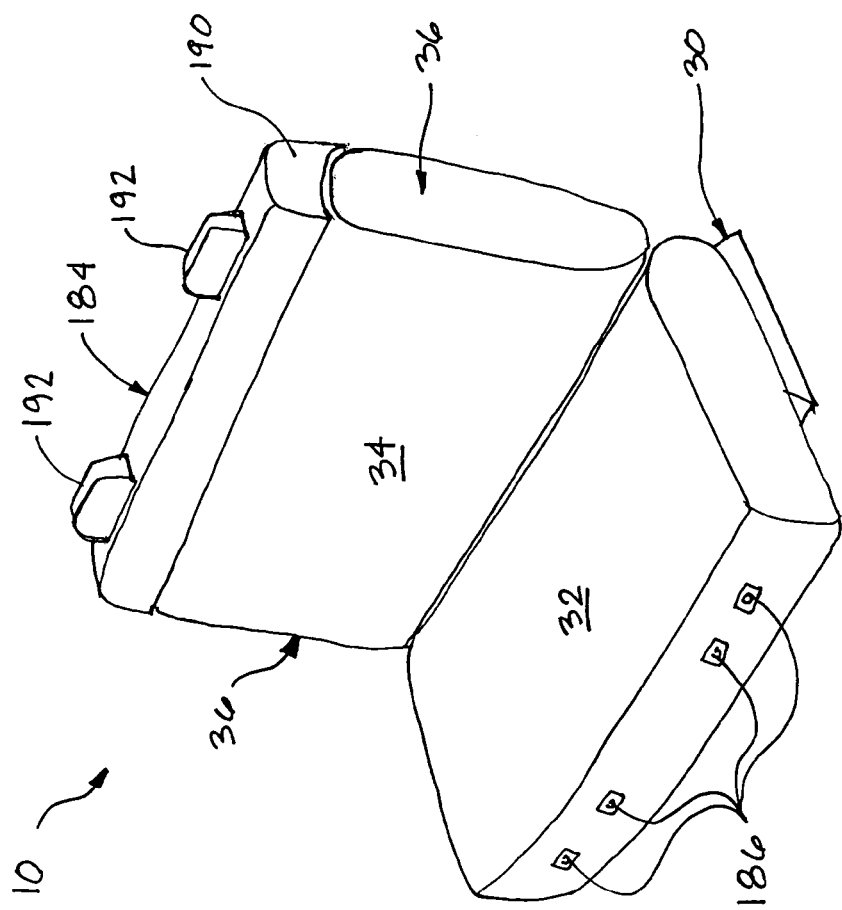
FIGS. 18 and 19 are perspective views of another embodiment of a seat according to the present invention.
Figure 19:
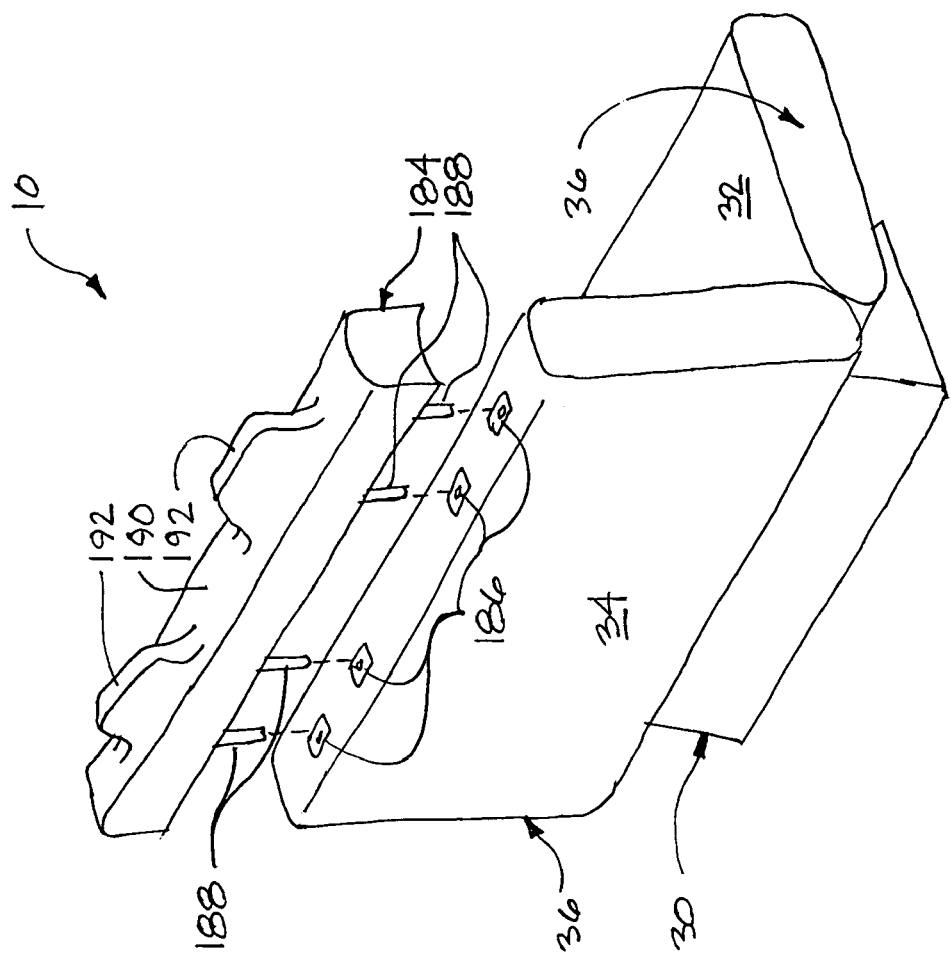
Figure 20:
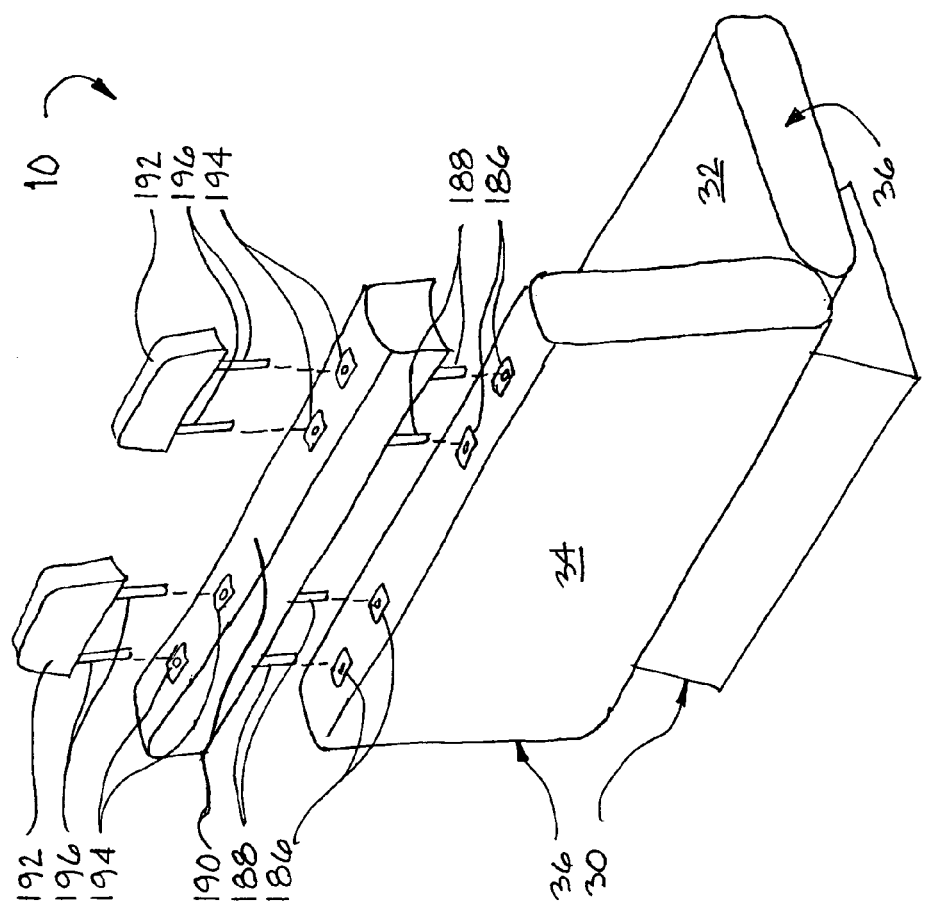
FIG. 20 is a perspective view of yet another embodiment of a seat according to the present invention.

Referring now to FIGS. 18–20, an alternate embodiment of a seat 10 according to the present invention is shown. In this embodiment, headrest 40 of the previously described embodiments is replaced by support assembly 184. It should be understood that any of the previously described embodiments may include support assembly 184 instead of the headrests 40 shown. It should further be understood that while seat 10 of the embodiment of FIGS. 18–20 is shown as a bench seat, a single seat may be adapted to include the features described below.

In general, back portions and seat portions of seats do not typically extend the same distance from the intersection between the back portion and the seat portion. Typically, the back portion extends farther from this intersection to accommodate the shape of the human torso. Accordingly, rather than provide a seat 10 wherein the seat portion (support 32 or support 34, depending upon the orientation of seat 10) extends farther than necessary from mount 30 when functioning as a seat portion so that it may provide the necessary support when functioning as a back portion, seat 10 of FIGS. 18–20 provides substantially identical supports 32, 34, both dimensioned to function as seat portions as opposed to back portions. Referring to FIG. 18, when seat 10 is positioned as shown, wherein support 32 functions as a seat portion and support 34 functions as a back portion, support assembly 184 is attached to support 34 to provide additional height to support 34, thereby enabling support 34 to function effectively as a back portion.

Each of supports 32, 34 include a plurality of openings 186 (four shown) for receiving posts 188 (FIG. 19) which extend from support assembly 184. Posts 188 may be locked into and removed from openings 186 in the manner described herein with reference to headrests 40.

Support assembly 184 generally includes a shoulder portion 190 and a pair of headrest portions 192. As suggested in FIG. 19, support assembly 184 may be removed from support 34, prior to repositioning of seat 10 such that support 32 is in a substantially upright position. Then, support assembly 184 may be inserted into openings 186 of support 32 to permit support 32 to function acceptably as a back portion.

FIG. 20 shows an alternate embodiment of support assembly 184 wherein shoulder portion 190 includes a plurality of openings 194, and headrest portions 192 include posts 196. As should be apparent from the drawing, headrest portions 192 may be removed from and inserted into openings 194 of shoulder portion 190 while shoulder portion 190 remains attached to one of supports 32, 34 as described above.

In other embodiments, as shown in FIGS. 21–54, a shoulder portion 190, 191 (including headrest portions 192) is movably attached to each of supports 32, 34 so that when a support 32, 34 is moved to a substantially vertical position, corresponding shoulder portion 190, 191 moves into the position shown in FIG. 18, and when support 32, 34 is moved to a substantially horizontal position, corresponding shoulder portion 190, 191 folds under the support. In this manner, shoulder portion 190, 191 may fold entirely under the horizontally positioned support 32, 34, or partially under support 32, 34 to function as a pedestal or leg for seat 198. Headrests 192 may fold into recesses formed in shoulder portions 190, 191, or fold into some other position relative to shoulder portion 190 such that headrests 192 are out of the way when the corresponding support 32, 34 is in a substantially horizontal position. Headrests 192 then move into a standard headrest position (as shown in FIG. 18) when the corresponding support 32, 34 is moved to the substantially vertical position. Movement of shoulder portion 190, 191 and headrests 192 may be accomplished using electric motors or other drive mechanisms (either the same as or separate from the drive mechanism for seat 198), or through mechanical linkage to the drive mechanism for seat 198.

Figure 21:
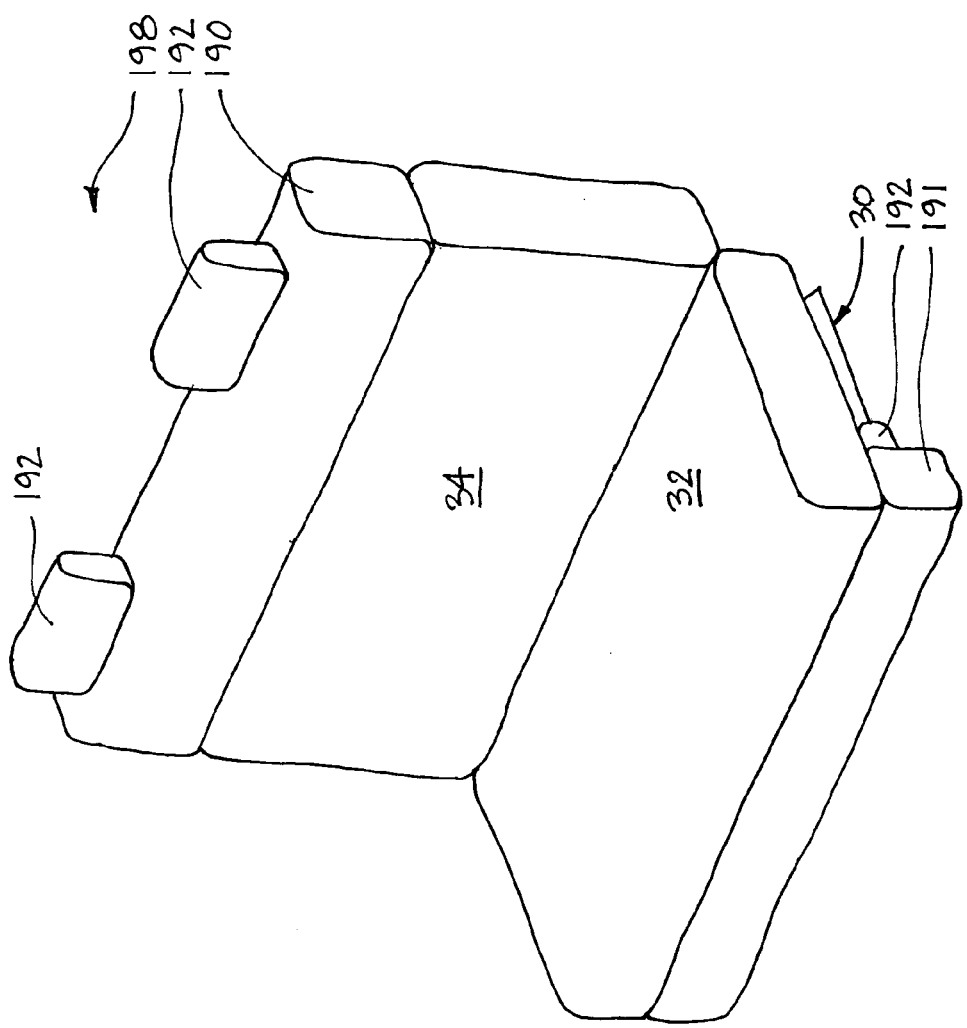
FIG. 21 is a perspective view of another embodiment of a seat according to the present invention shown in a forward orientation.

FIG. 21 shows a seat 198 with shoulder portions 190, 191 movably attached to respective supports 34, 32. Vertical support 34 couples to exposed shoulder portion 190 and headrests 192. Horizontal support 32 couples to retracted shoulder portion 191 and headrests 192.

Figure 22:
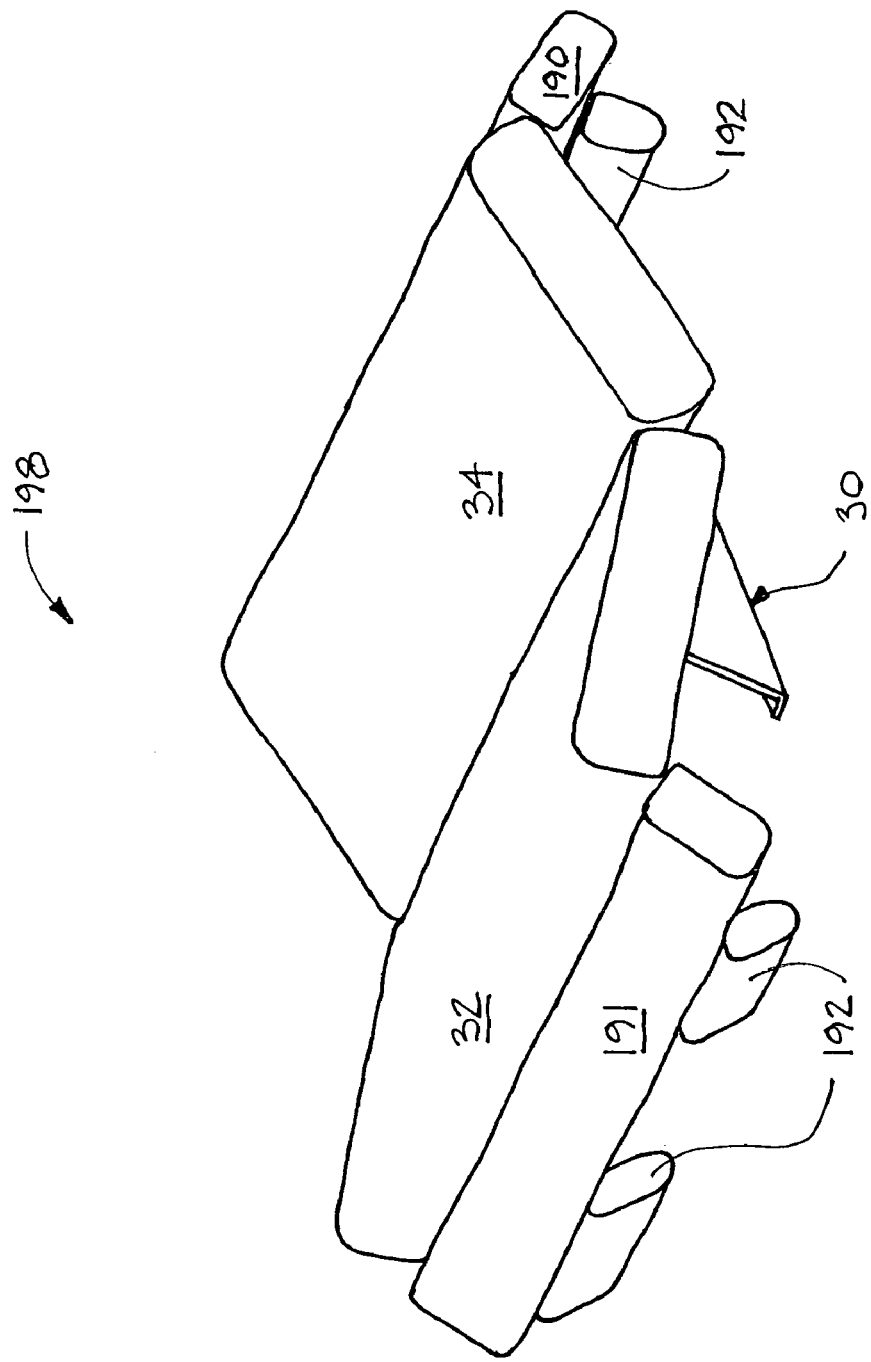
FIG. 22 is a perspective view of the seat of FIG. 21 shown traveling from the forward orientation toward a rearward orientation.
Figure 23:
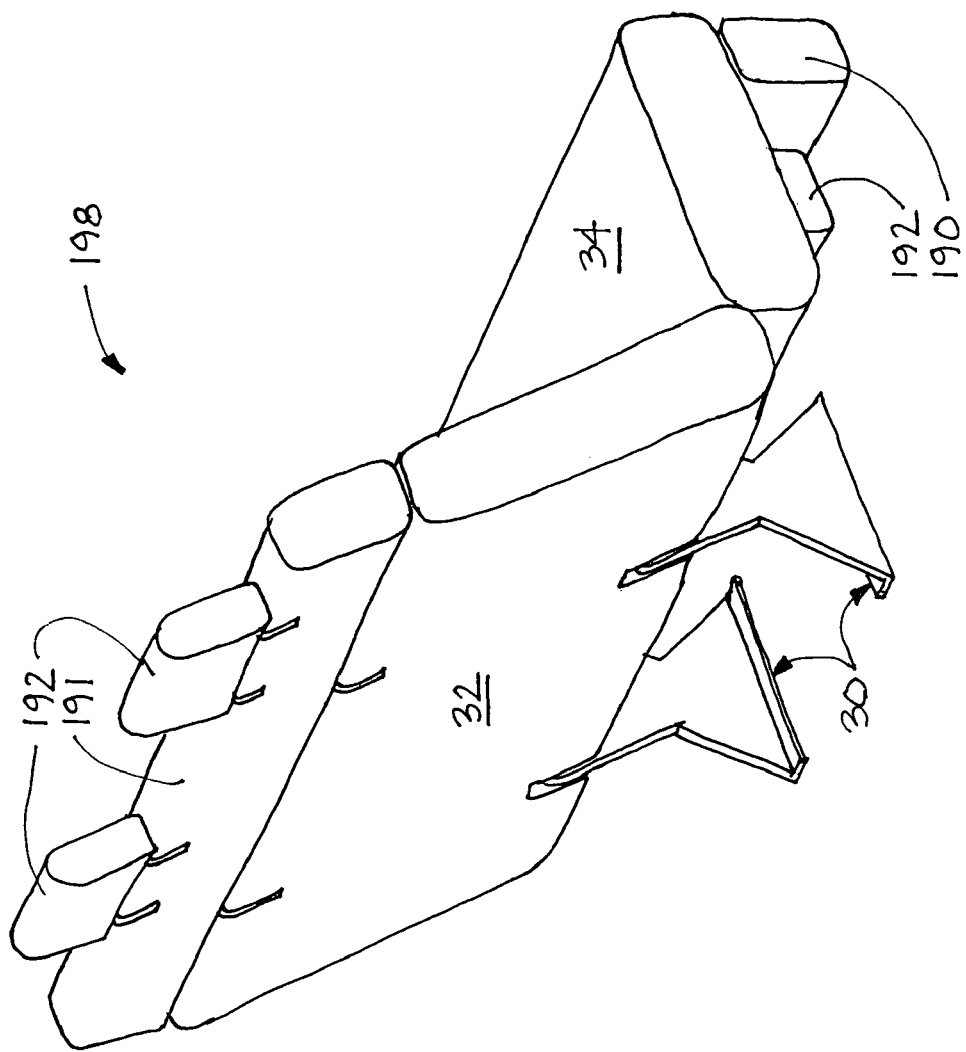
FIG. 23 is a perspective view of the seat of FIG. 21 shown in the rearward orientation.

While FIG. 21 shows seat 198 in a forward facing position, FIG. 23 shows seat 198 in a rearward facing position. FIG. 22 shows seat 198 in transition between the forward facing position and the rearward facing position. The transition causes shoulder portion 190 to retract and shoulder portion 191 to extend such that when seat 198 achieves the rearward facing position of FIG. 23, shoulder portion 190 is stowed below support 34 and shoulder portion 191 extends upwardly from support 32. Likewise, the respective headrests 192 extend and retract with respective shoulder portions 190, 191.

Seat 198 may have embodiments with a fixed seat angle or with an adjustable seat angle. Embodiments with a fixed seat angle provide that each position of support 32 has a corresponding position of support 34. Fixed angle embodiments do not allow independent movement of support 32 relative to support 34. However, embodiments having an adjustable seat angle allow each of the supports 32, 34 to move independently of the other.

Figure 24:
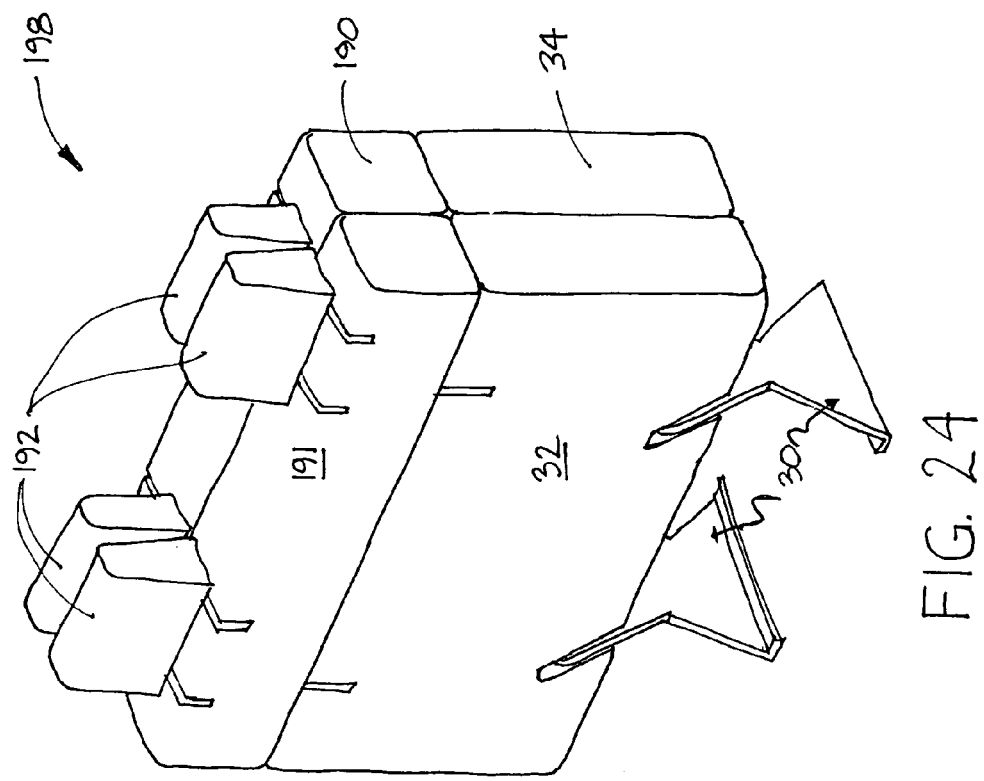
FIG. 24 is a perspective view of the seat of FIG. 21 shown in a folded up orientation.

FIG. 24 shows an adjustable seat angle embodiment of seat 198. Both supports 32, 34 are placed in a folded up position to minimize the footprint of seat 198 and allow for increased vehicle storage space. The folded up position is characterized by having supports 32, 34 substantially parallel to each other and substantially vertical to the floor. Likewise, shoulder portions 190, 191 and headrests 192 are extended to also be planar with their respective supports 32, 34. Thus, supports 32, 34 are substantially perpendicular to the floor or other surface on which seat 198 is mounted. Such placement results in a compact arrangement of seat 198 that is generally not used for seating by a user.

Figure 25:
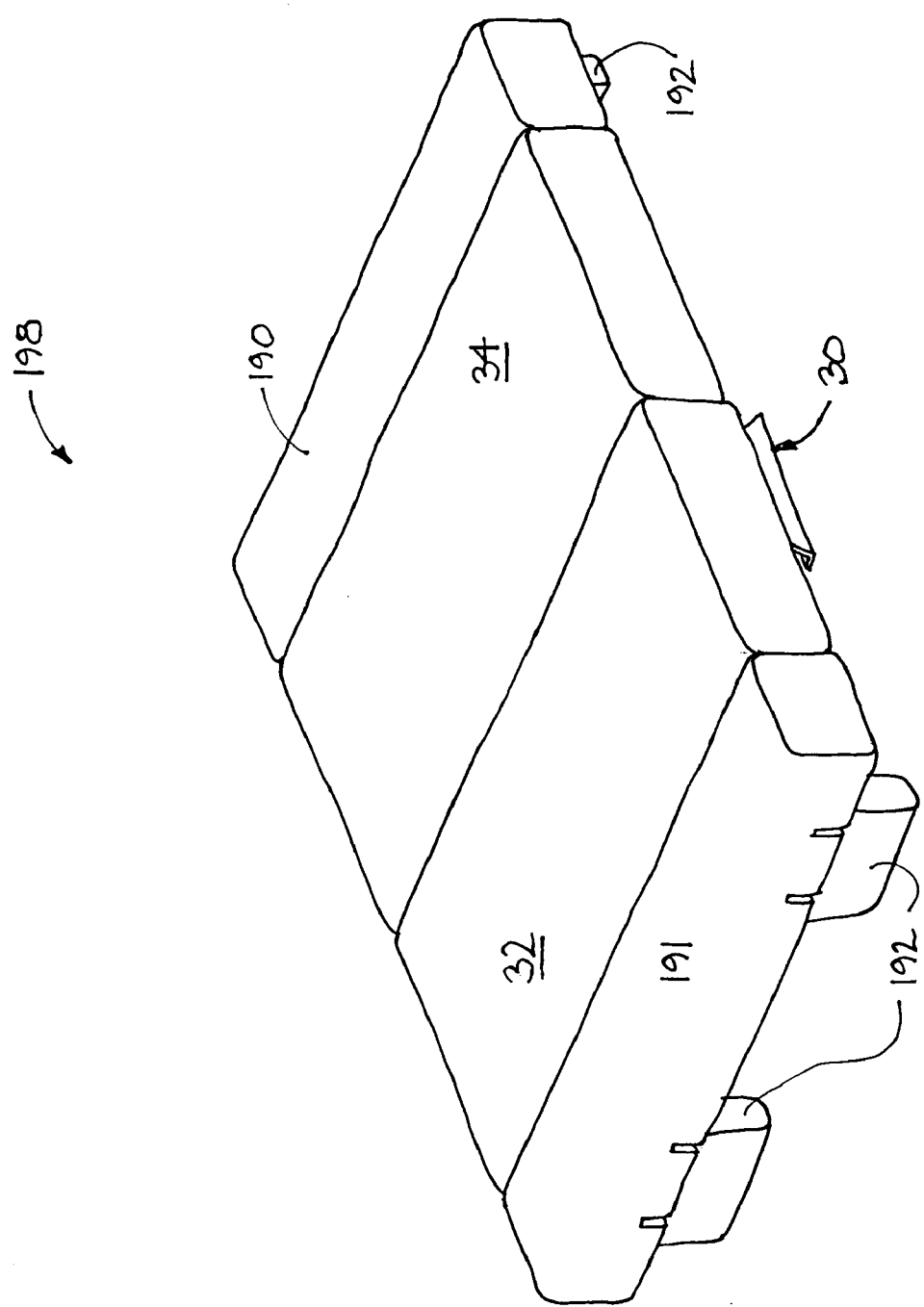
FIG. 25 is a perspective view of the seat of FIG. 21 shown in a folded down orientation.

FIG. 25 shows the adjustable seat angle embodiment of FIG. 24 in a folded down position. Both supports 32, 34 are horizontal and shoulder portions 190, 191 are extended horizontally to be substantially planar with supports 32, 34 rather than being positioned underneath. However, headrests 192 are still positioned beneath respective shoulder portions 190, 191. Positioning headrests 192 thereunder allows a similar second seat 198, in the folded down position, to abut the first seat 198 to create a larger continuous planar support surface (see FIG. 50). The folded down position provides a large horizontal support surface to allow user reclining or item storage thereupon.

Figure 26:
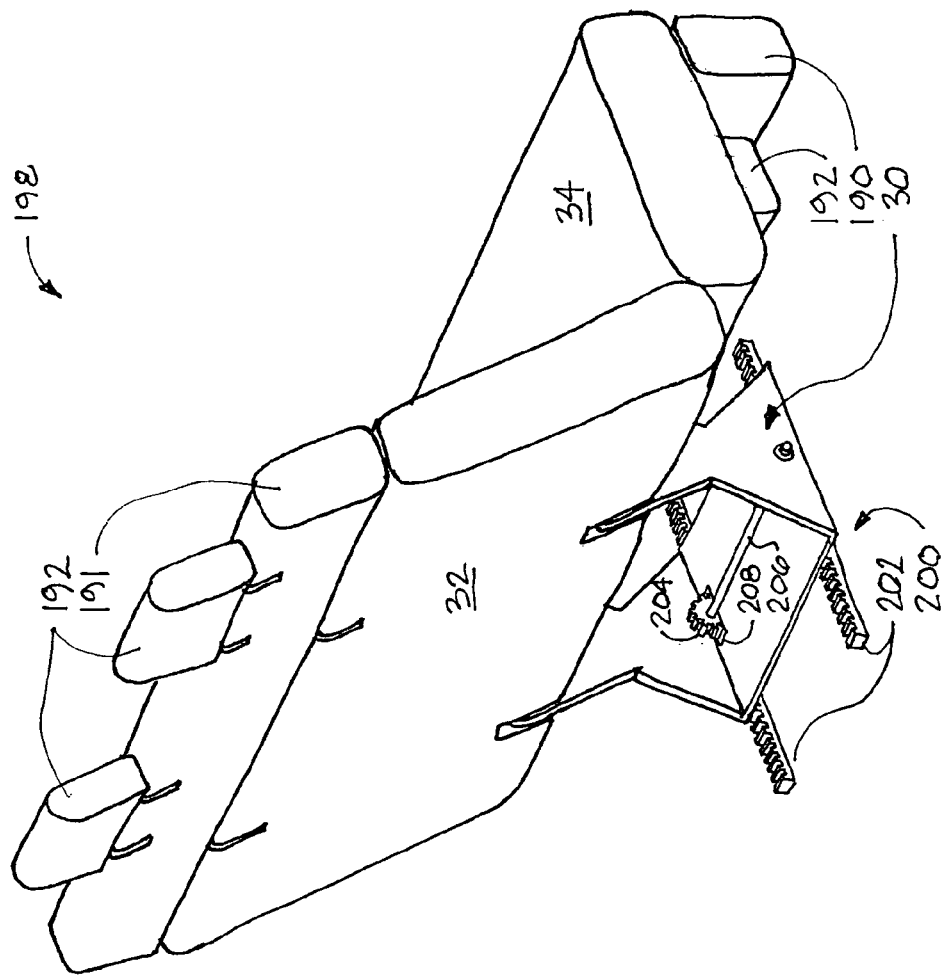
FIG. 26 is a perspective view of the seat of FIG. 23 shown with a transverse travel apparatus.

FIG. 26 shows the rearward facing seat 198 of FIG. 23 coupled to a transverse travel apparatus 200. Transverse travel apparatus 200 includes a set of two racks 202, two gears 204 (only one shown), and a rod 206 connecting the gears 204. Racks 202 are coupled to the floor of the vehicle in parallel at a distance within the width of mount 30. Gears 204 are configured to engage the racks through openings 208 in mount 30. Gears 204 selectively rotate while attached to rod 206 which is attached to mount 30. The rotation of gears 204 causes seat 198 to travel along racks 202 to alter the horizontal position of seat 198 relative to the vehicle. It should be appreciated that while most embodiments herein are described without a transverse travel apparatus 200, any of these embodiments are also envisioned with such an apparatus 200 attached thereto. Likewise embodiments shown with a transverse travel apparatus 200 are envisioned without such an apparatus 200.

Figure 27:
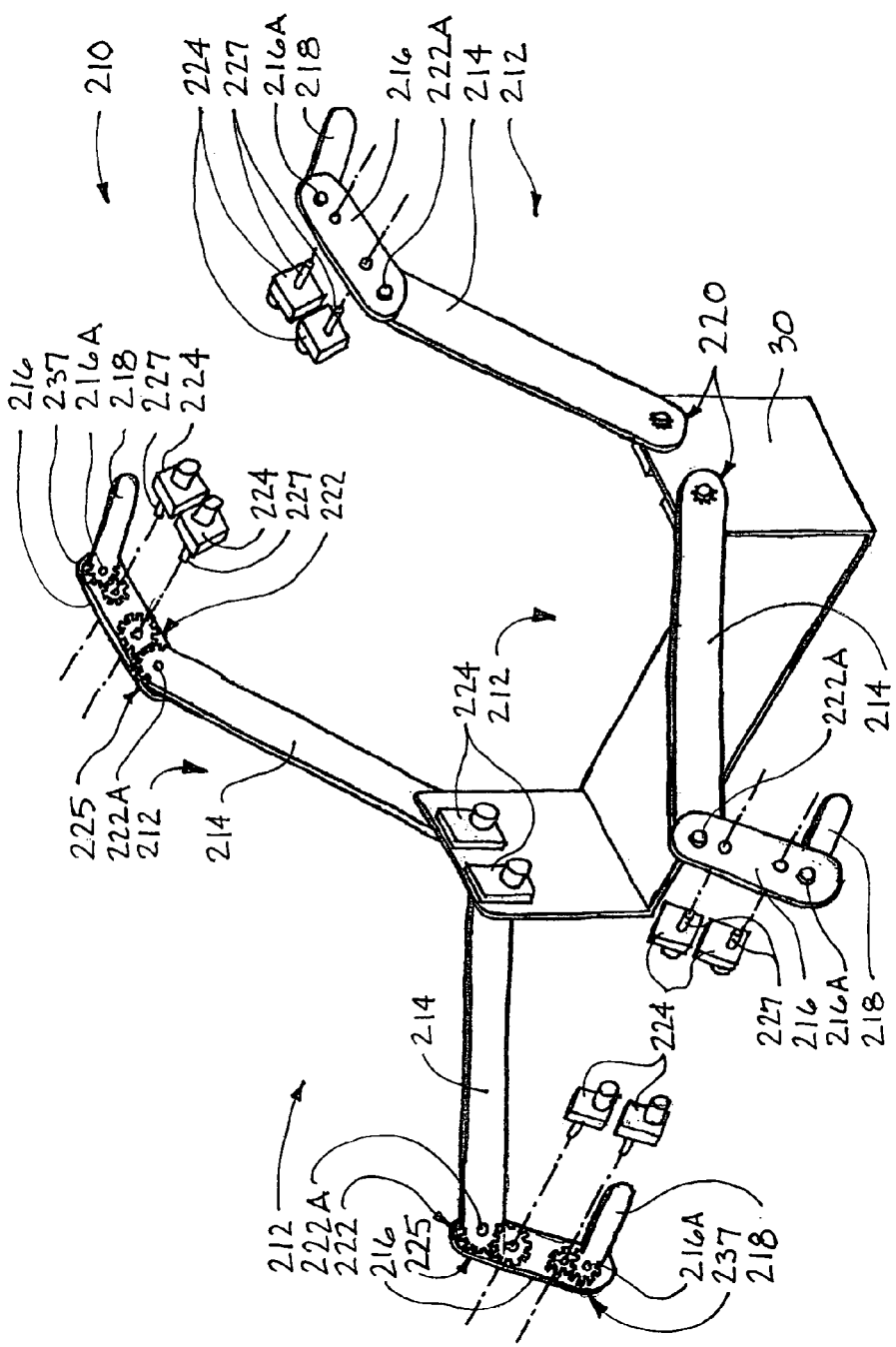
FIG. 27 is a perspective view of an electrically powered understructure that may be used with the seat of FIG. 21.

FIG. 27 shows an understructure 210 suitable for use within seat 198. The understructure 210 includes mount 30 and four support extensions 212. Mount 30 attaches to the floor or other surface of the vehicle in which it is placed. Support extensions 212 are coupled to mount 30. Each support extension 212 includes a back support 214, a shoulder support 216, and a headrest support 218. Back supports 214 are pivotally coupled at a first end 220 to mount 30 and at a second end 222 to shoulder support 216. The connection between first end 220 and mount 30 includes a motor/gearbox 224 to power rotation therebetween. Motor/gearbox 224 includes a driveshaft 227 that couples to first end 220. Rotation of driveshaft 227 of motor/gearbox 224 rotates back support 214 relative to mount 30. Likewise, the connection between second end 222 and shoulder support 216 includes a motor/gearbox 224 to power the rotation therebetween. Driveshaft 227 of motor/gearbox 224 at second end 222 is coupled to a gear 225. Each gear 225 is rotatably coupled to shoulder support 216. Gear 225 further includes teeth sized and shaped to engage fixed teeth on second end 222 of back support 214. Rotation of gear 225 causes rotation of shoulder support 216 relative to back support 214 about pivot pin 222A.

Shoulder support 216, in addition to being coupled to back support 214 is coupled to headrest support 218 by a pivot pin 216A. Like the back support 214/shoulder support 216 interface, the shoulder support 216/headrest support 218 interface includes a motor/gearbox 224 and a gear 237 that engages teeth on an end of headrest support 218 to generate movement therebetween. While headrests 192 and headrest supports 218 are shown in many embodiments herein, it should be appreciated that embodiments are also envisioned where headrests 192, headrest supports 218, and the connections associated therewith are omitted.

While motors/gearboxes 224 are shown at each support section 214, 216, 218, it should be appreciated that manual cranks may be employed wherever a motor/gearbox 224 is shown. Also, while motors/gearboxes 224 are described as electric drive modules, it should be appreciated that other suitable drive mechanisms such as hydraulic and pneumatic drives are envisioned. Motor/gearboxes 224 can be programmed to move together or independently to determine whether support extensions 212 operate as a fixed angle support or an adjustable angle support.

Figure 28:
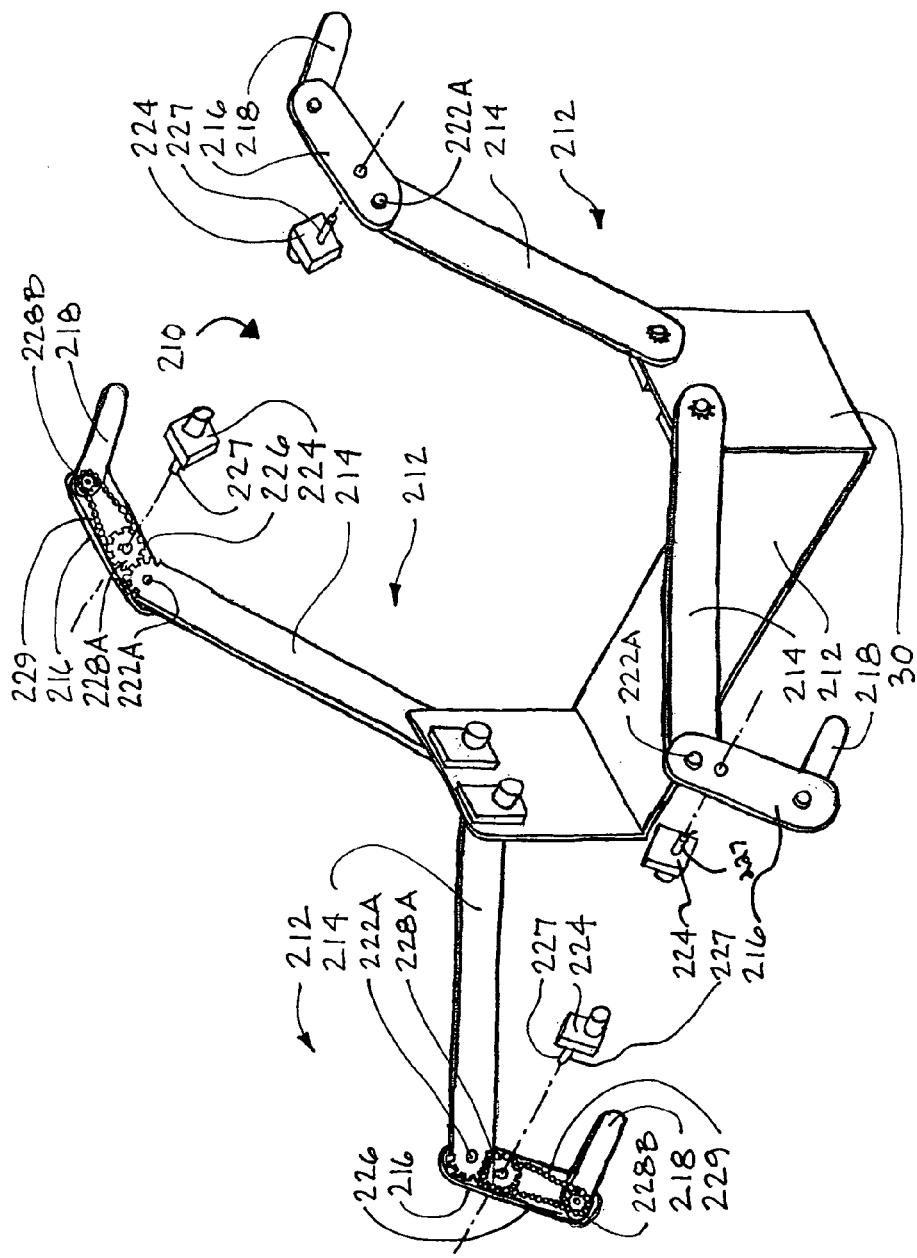
FIG. 28 is a perspective view of an understructure similar to the understructure of FIG. 27, having a linkage to operate headrest movement.

FIG. 28 shows an understructure similar to that shown in FIG. 27. However, motor/gearbox 224 that controls the position of shoulder support 216 relative to headrest support 218 is replaced with a linkage 226. Linkage 226 includes a set of two chain rings 228A, B and a chain 229 connecting chain rings 228. Chain rings 228A, B are sized and provided with a bolt pattern to achieve a desired gear and motion ratio. As shown in FIG. 28, large chain ring 228A is provided at the motor/gearbox 224 and small chain ring 228B is provided at the shoulder support 216/headrest support 218 interface. Therefore, motor/gearbox 224 that controls the position of shoulder support 216 relative to the back support 214 also controls the position of headrest support 218 relative to shoulder support 216. With the pictured gear ratio, a rotation of driveshaft 227 causes a similar rotation of large chain ring 228A and movement of shoulder support 216 relative to back support 214. The same rotation of driveshaft 227 causes the rotation of large chain ring 228A to be translated to chain 229 and small chain ring 228B to result in a larger movement of headrest support 218 relative to shoulder support 216. It should be appreciated that other motors/gearboxes 224 may be replaced with linkages similar to linkage 226. Furthermore, linkages 226 with different chain rings 228A, B may be used to cause different motion relationships. Replacement of motors/gearboxes 224 with linkages 226 will result in fewer motors/gearboxes 224 while still providing coordinated movement of sections.

Figure 29:
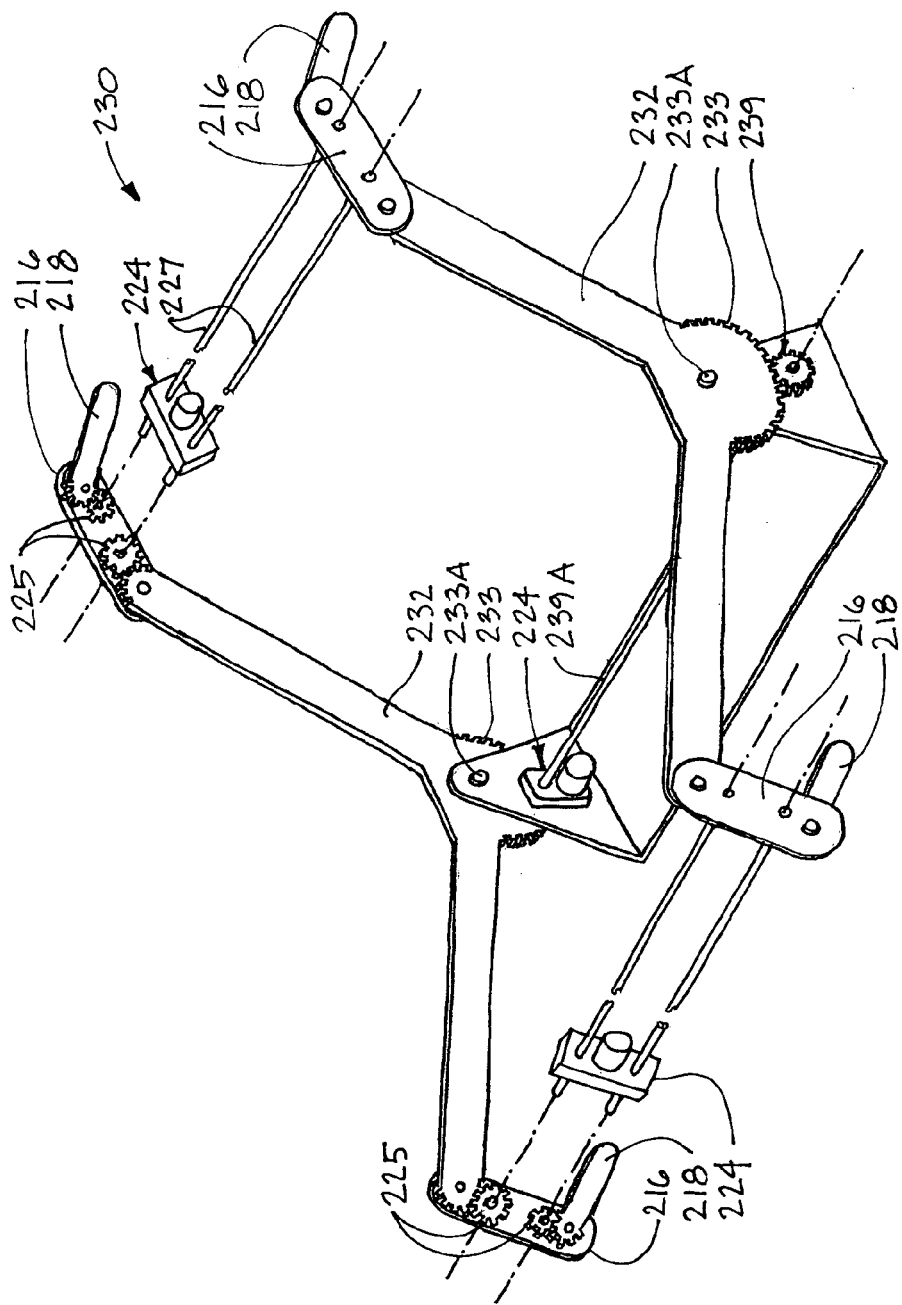
FIG. 29 is a perspective view of the understructure of FIG. 28 having a double geartrain to operate headrest movement.

FIG. 29 shows a fixed angle embodiment understructure 230 that is suitable to support seat 198 of FIG. 21. "V-shaped" armatures 232 are provided in place of back supports 214. Because armatures 232 provide a single piece to take the place of multiple back supports 214, understructure 230 is necessarily a fixed angle embodiment. A center portion 233 is rounded and toothed to interface with gear 239. Furthermore, center portion 233 couples to mount 30 at pivot pin 233A for rotation. One motor/gearbox 224 is provided to rotate a shaft 239A extending between gears 239 to engage teeth of center portion 233 and thereby alter and determine the angle of armatures 232. Movement of shoulder supports 216 and headrest supports 218 is controlled similarly to how it is controlled in understructure 210, with gears 225 engaging armatures 232 and headrest supports 218, and dual geartrains 224 with driveshafts 227 to rotate gears 225. Dual geartrains 224 include two driveshafts 227 that allow dual geartrain 224 to directly turn two gears 225.

Figure 30:
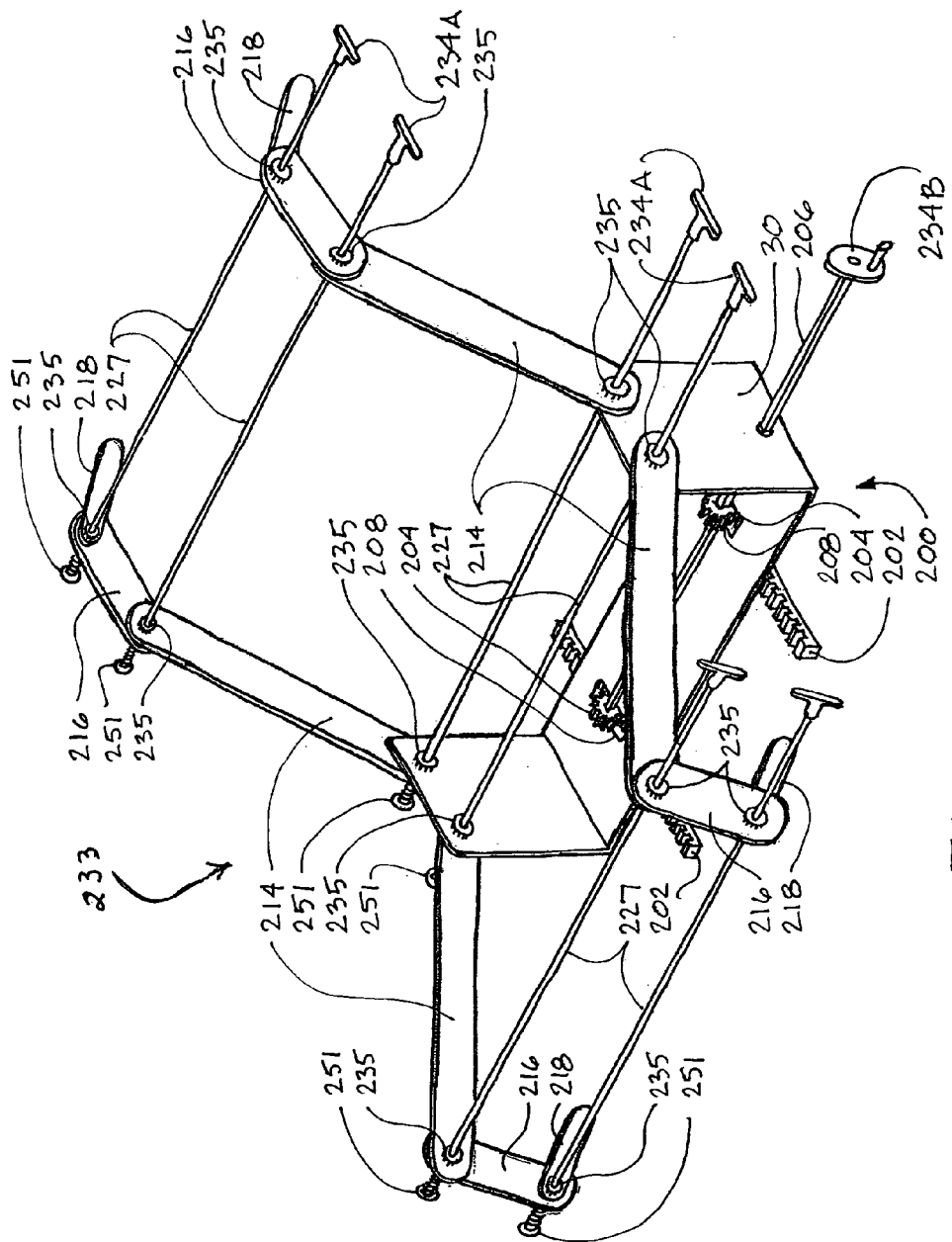
FIG. 30 is a perspective view of an understructure similar to the understructure of FIG. 28 having a manual cranks to operate seat movement.

FIG. 30 shows an adjustable angle embodiment understructure 233 employing two embodiments of hand cranks 234A, B. This understructure embodiment 233 is similar to that shown in FIG. 27 only with motors/gearboxes 224 replaced with first embodiment, "T-shaped," manual hand cranks 234A to position back supports 214, shoulder supports 216, and headrest supports 218. A second embodiment, ovular, hand crank 234B is also employed as part of transverse travel assembly 200. First embodiment hand cranks 234A include mated locking rings 235. Lock rings 235 are fixedly coupled to driveshafts 227. Driveshafts 227 are axially movable with respect to pieces 30, 214, 216, 218. Hand cranks 234A provide three kinds of connections, mount 30/back support 214 connection, back support 214/shoulder support 216 connection, and shoulder support 216/headrest support 218 connection. Mount 30/back support 214 connection provides that driveshaft 227 is rotationally fixed to mount 30 and rotatable relative to back support 214. Back support 214 include locks (not pictured) that engage the locking rings 235 to prevent rotation of back support 214 relative to driveshaft 227. Pulling on hand crank 234 causes axial movement of driveshaft 227, compression of spring 251, and disengagement of locking rings 235 from the locks. The axial movement allows rotation of back support 214 relative to mount 30. Releasing hand crank 234 allows spring 251 to move driveshaft 227 and place locking rings 235 back into engagement with the locks. Similarly, back support 214/shoulder support 216 connection provides that driveshaft 227 is rotationally fixed to back support 214 and rotatable relative to shoulder support 216. Pulling on hand crank 234A allows rotation between back support 214 and shoulder support 216 while releasing hand crank 234A prevents such rotation. Shoulder support 216/headrest support 218 connection operates similarly to mount 30/back support 214 connection and back support 214/shoulder support 216 connection. Hand crank 234B provides an off center handle that allows rotation of hand crank 234B and therefore rotation of rod 206. Rotation of rod 206 causes transverse travel assembly 200 to move understructure 233 relative to the vehicle.

Figure 31:
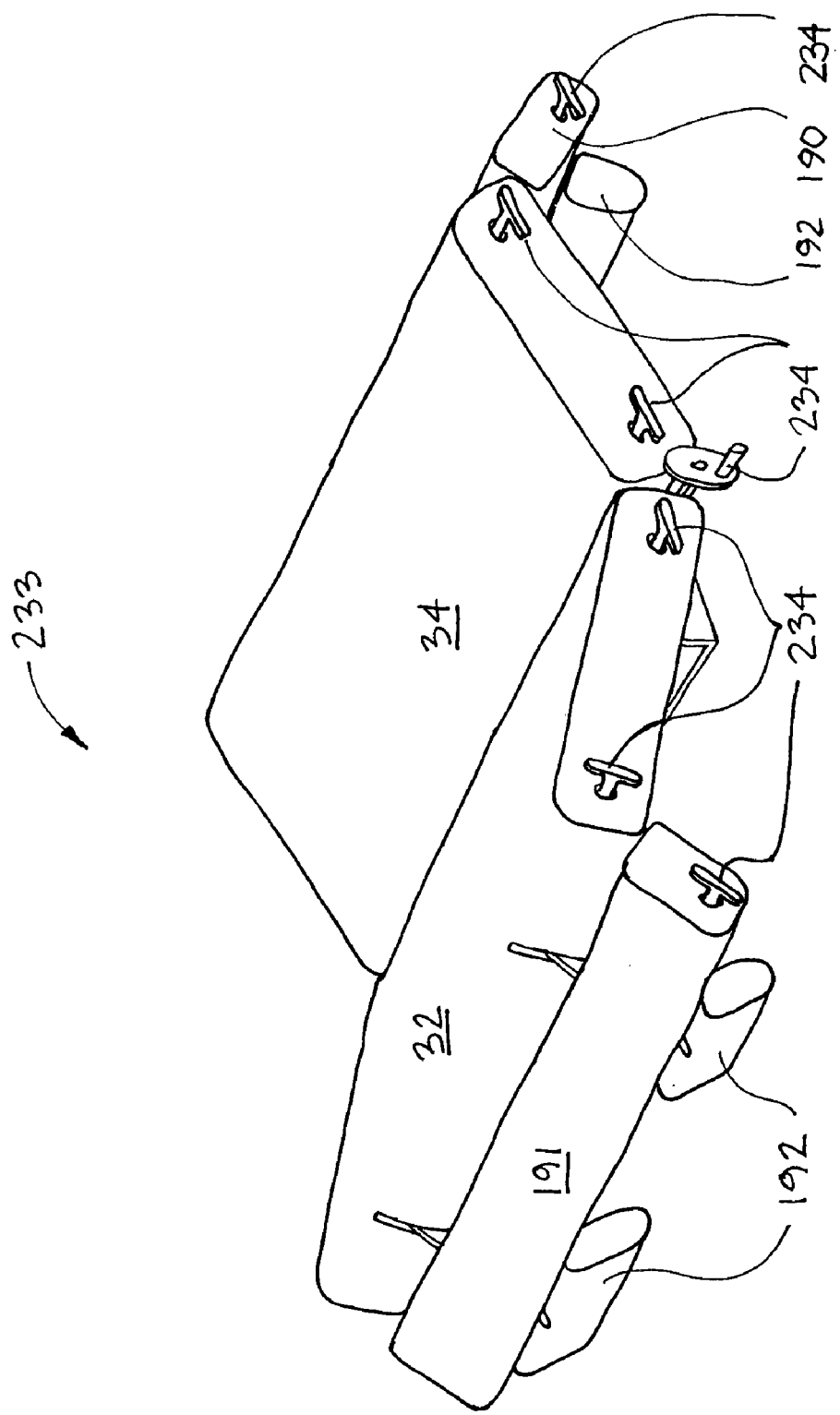
FIG. 31 is a perspective view of the understructure of FIG. 30 with upholstery thereover.

FIG. 31 shows the understructure 233 with upholstery thereon.

Figure 32:
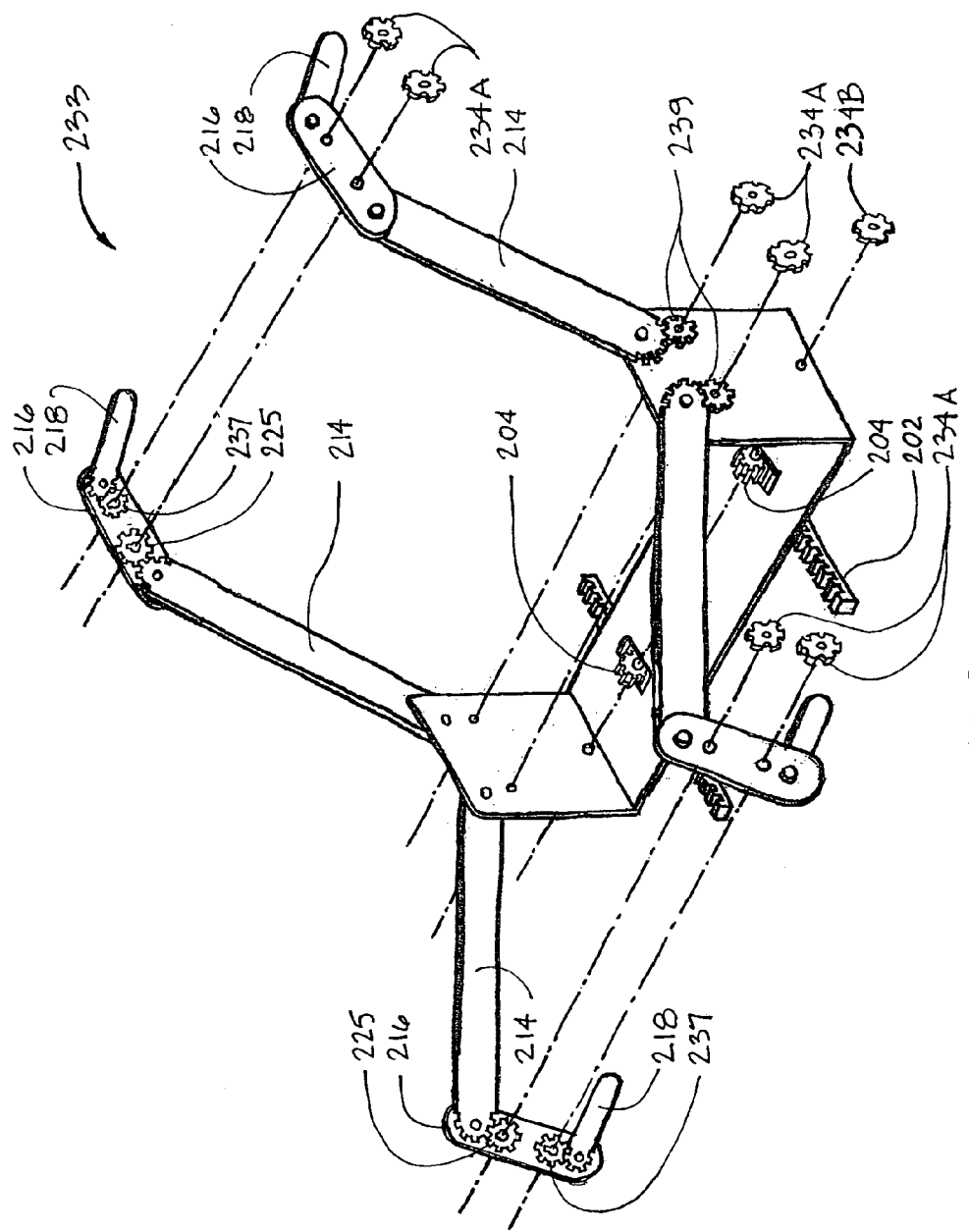
FIG. 32 is a perspective view of an understructure similar to that of FIG. 28 having another embodiment of hand crank to operate seat movement.
Figure 33:
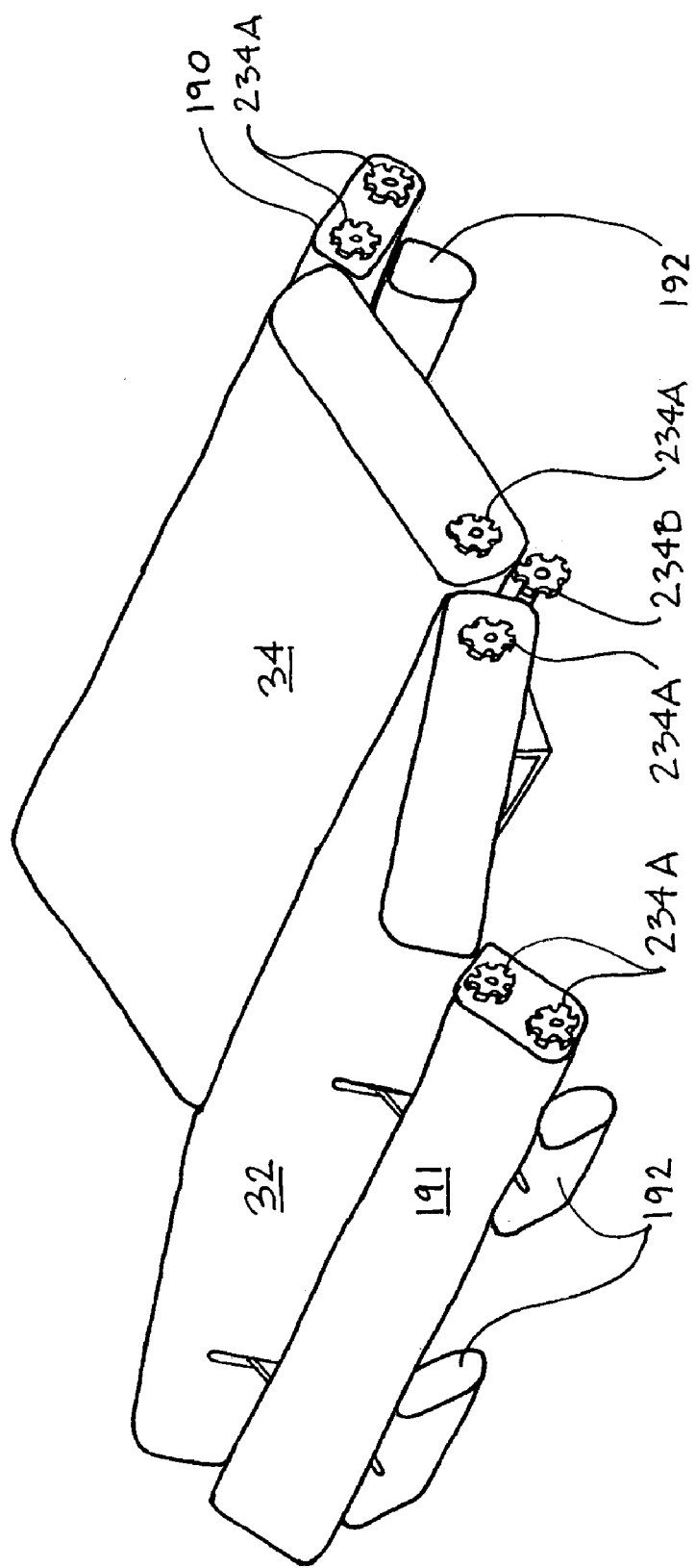
FIG. 33 is a perspective view of the understructure of FIG. 32 with upholstery thereover.

FIGS. 32–33 show understructure 233 with another embodiment handle for hand cranks 234A, B. Each crank 234A is coupled to a gear 225, 237, 239 which engages teeth on one of back support 214, shoulder support 216, and headrest support 218 to effect movement thereof. Likewise, crank 234B is provided for transverse travel apparatus 200.

Figure 34:
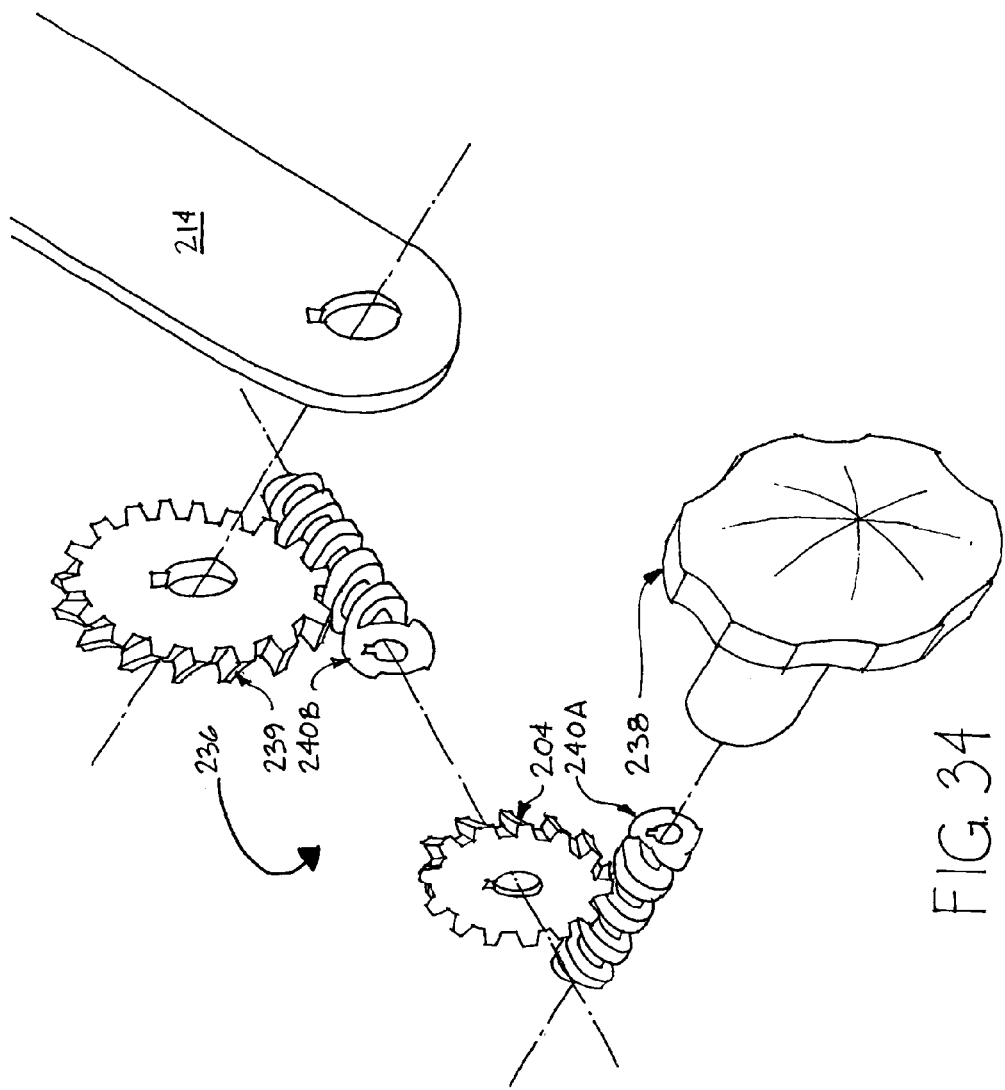
FIG. 34 is a partially exploded view of the hand crank structure of FIG. 32.

FIG. 34 shows another embodiment hand crank 236 that is self-locking. Rotation of handle 238 rotates an attached threaded cylinder 240A that preferably is located on an opposite side of mount 30 than handle 238. Rotation of threaded cylinder 240A causes rotation of gear 204 and a rod (not pictured) that is coupled to gear 204. The rod is also coupled to threaded cylinder 240B, which rotates therewith. Rotation of threaded cylinder 240B causes rotation of gear 239. Rotation of gear 239 causes rotation of back support 214 relative to mount 30. The angle of the threads in threaded cylinders 240A, 240B and spacing of teeth in gears 204, 239 are such that normal pressures applied to portions of the support assembly will not cause rotation of threaded cylinders 240A, B, thereby preventing movement of portions of the support assembly. The combination of two threaded cylinders 240A, 240B and gears 204, 239 allow the self locking feature to be implemented while still having handle 238 extend perpendicularly to mount 30.

Figure 35:
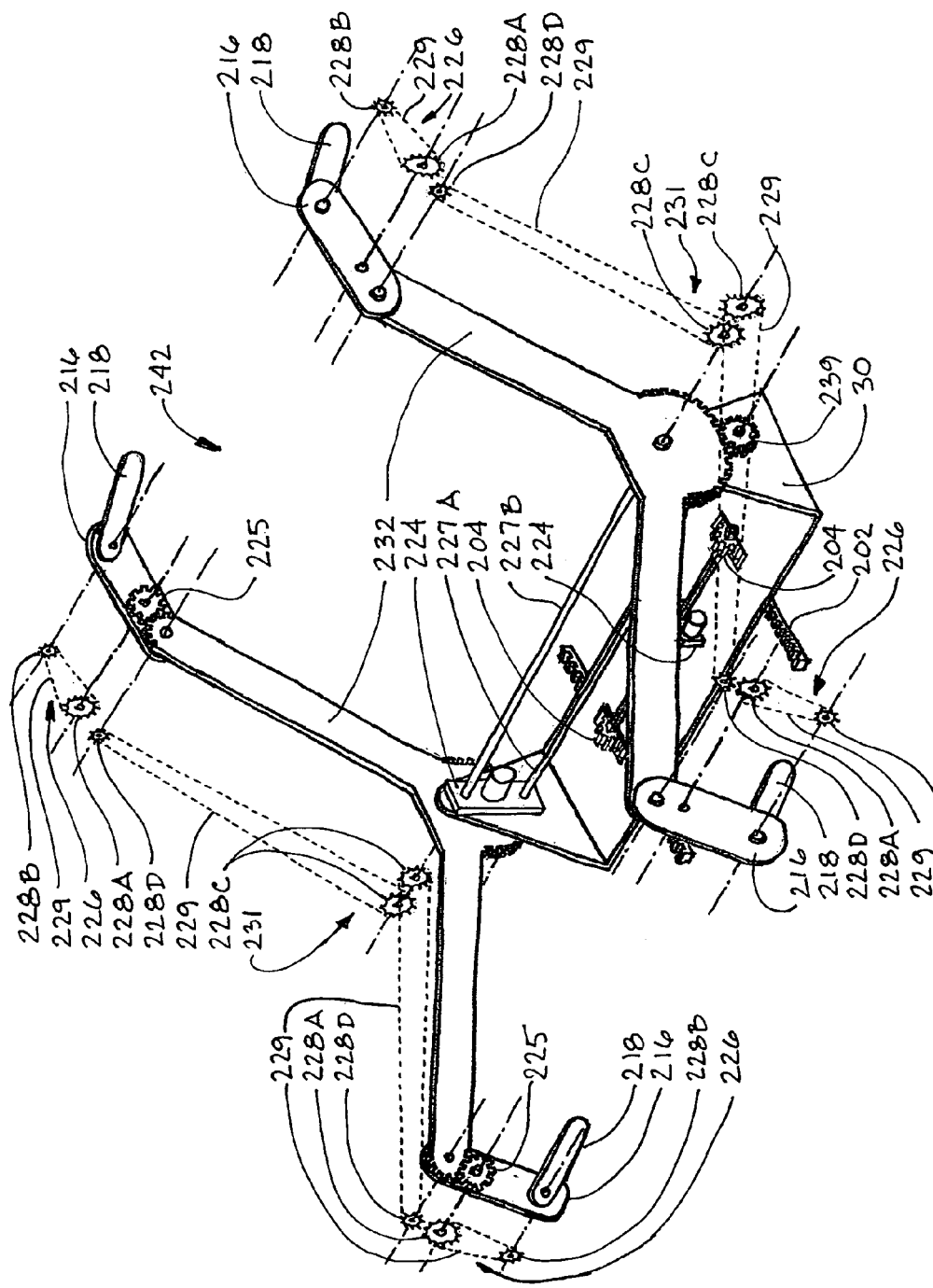
FIG. 35 is a perspective view of a fixed angle embodiment understructure having a double gear train to operate seat movement and having a transverse travel apparatus.

FIG. 35 shows a fixed angle embodiment understructure 242 that is similar to understructure 230 of FIG. 29. Understructure 242 includes a dual geartrain motor/gearbox 224. One driveshaft 227A of motor/geartrain 224 operates movement of armatures 232 by rotating two gears 239 (only one pictured).

Shoulder supports 216 and headrest supports 218 are moved by a combination of a second driveshaft 227B, back linkages 231, and linkages 226. Back linkages 231 include chain rings 228C, D and chain 229. Chain ring 228C couples to second driveshaft 227B and chain ring 228D couples to shoulder support 216. Thus, back linkage 231 connects second driveshaft 227B to shoulder support 216. Rotation of shoulder support 216 causes rotation of gear 225 as the teeth of gear 225 engage teeth on the end of armature 232. Rotation of gear 225, through a common axle, causes rotation of chain ring 228A of linkage 226 which causes rotation of chain ring 228B. Chain ring 228B, through a common axle causes headrest support 218 to move relative to shoulder support 216. Chain rings 228A, B, C, D are sized to coordinate movement of sections 214, 216, 218 as desired. A second motor/gearbox 224 is provided to operate the transverse travel assembly 200.

Figure 36:
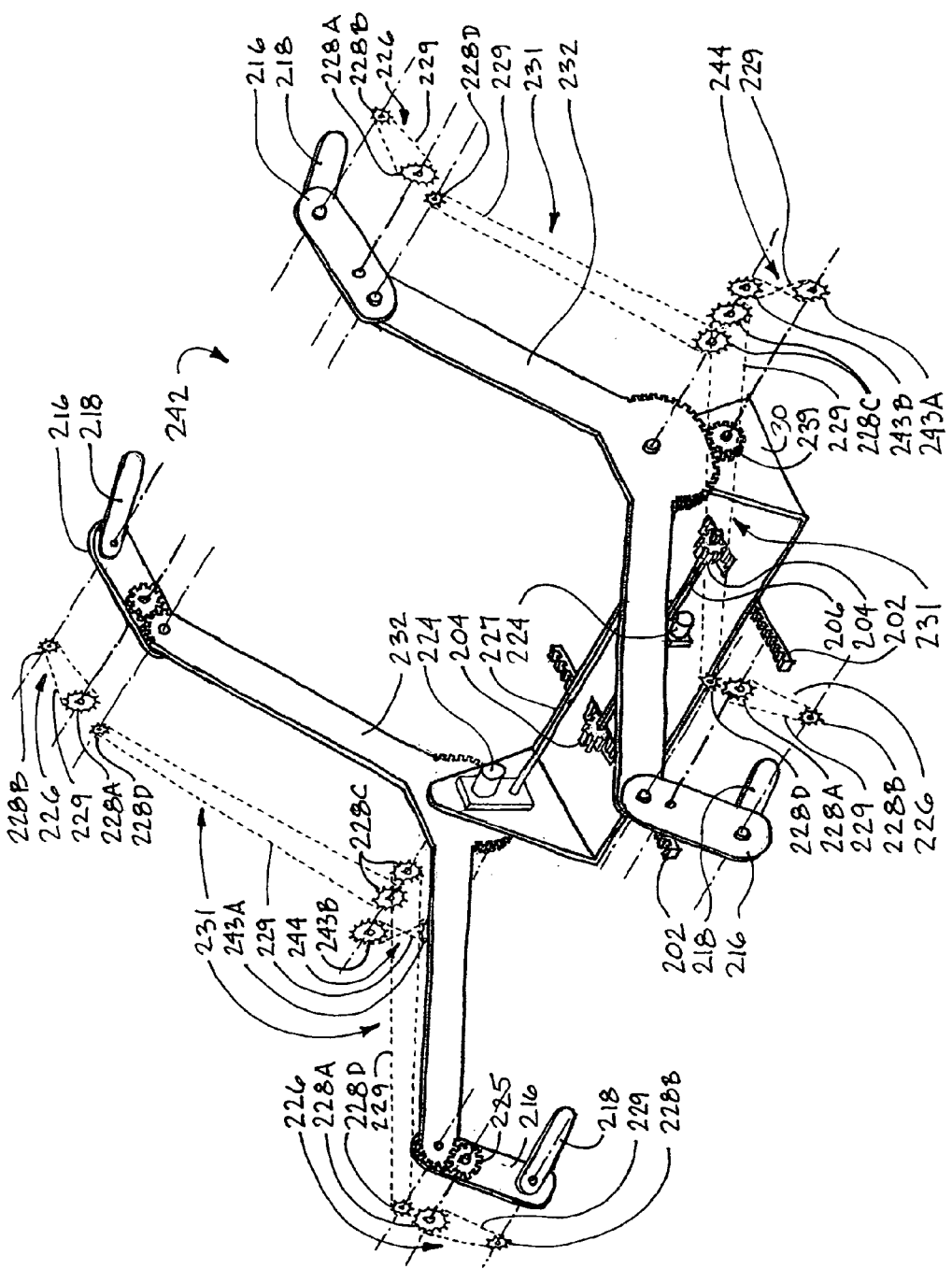
FIG. 36 is a perspective view of a fixed angle embodiment understructure having a single gear train and to operate seat movement and having a transverse travel apparatus.

FIG. 36 shows understructure 242 using single geartrain motor/gearbox 224 for armature 232, shoulder support 216, and headrest support 218 movement. In addition to linkages 226, 231 shown in FIG. 29, reverse linkages 244 are employed to achieve the coordinated movement of armatures 232, shoulder support 216, and headrest supports 218. Rotation of driveshaft 227 rotates gear 239 and also a first chain ring 243A of reverse linkage 244. Chain 229 of reverse linkage 244 "criss-crosses" to cause second chain ring 243B of reverse linkage 244 to rotate in a direction opposite that of first chain ring 243A. Rotation of second chain ring 243B, via a common axle, causes chain rings 228C, D of back linkages 231 to rotate. Back linkages 231 and linkages 226 work similarly as described in reference to FIG. 35 to move shoulder support 218 and headrest support 218. A second motor/gearbox 224 is provided to operate transverse travel assembly 200. Rotation of rod 206 of transverse travel assembly 200 causes rotation of pinion gears 204 along racks 202 and movement of understructure 242.

Figure 37:
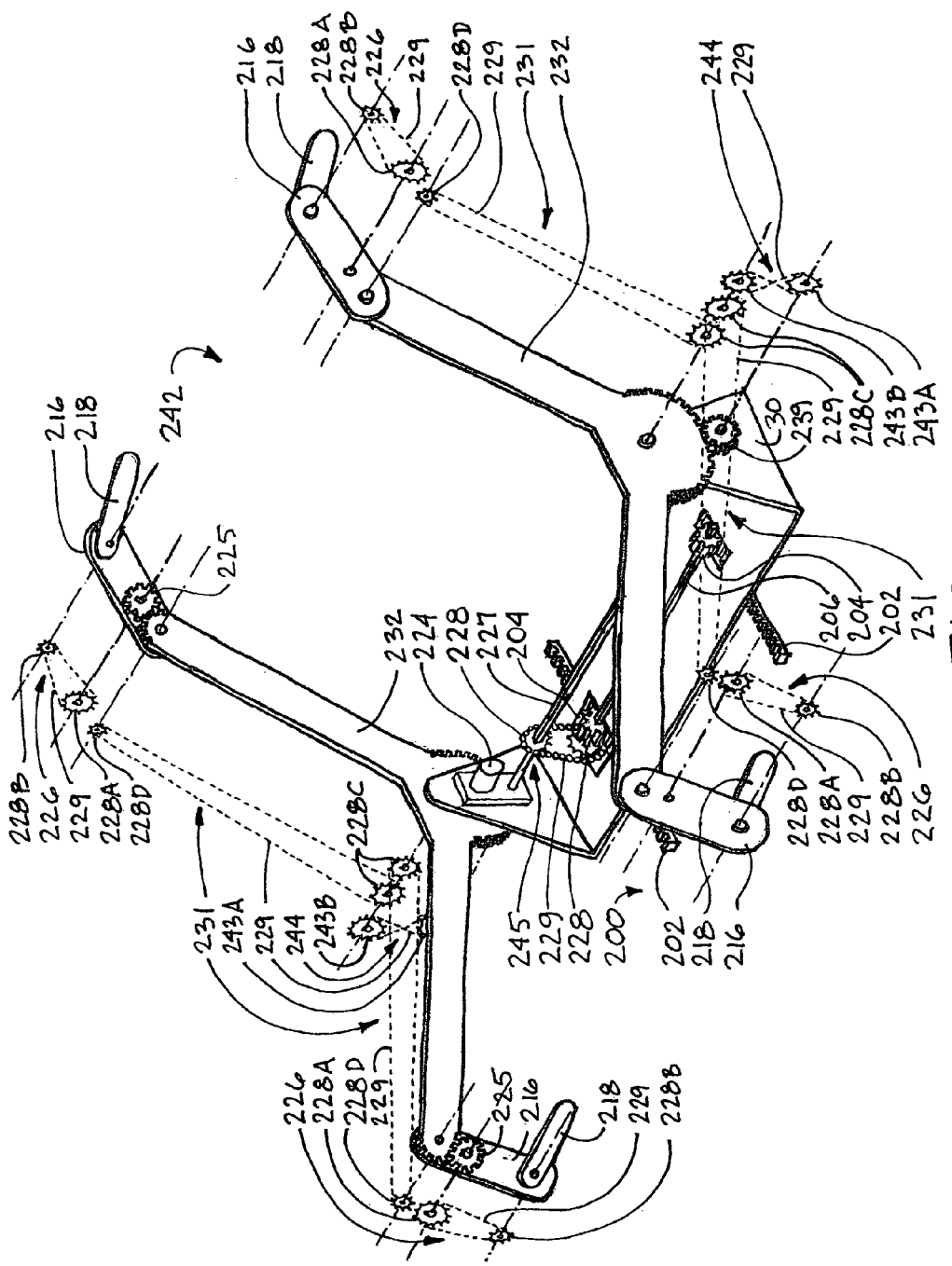
FIG. 37 is a perspective view of a fixed angle embodiment understructure having a single gear train and to operate seat movement and also to operate a transverse travel apparatus.

FIG. 37 shows understructure 242 with travel linkage 245 allowing a single motor/gearbox 224 to operate armatures 232, shoulder supports 216, headrest supports 218, and transverse travel assembly 200. In FIG. 37, travel linkage 245 is added to the understructure of FIG. 36. Travel linkage 245 couples a chain ring 228 to driveshaft 227. Chain 229 of travel linkage 245 connects chain ring 228 attached to driveshaft 227 to chain ring 228 attached to rod 206 of transverse travel assembly 200. Therefore, rotation of driveshaft 227 causes rotation of rod 206 and movement of understructure 242 along racks 202. Motor/geartrain 224 effects all movement of understructure 242, and all movement of understructure 242 is connected.

Figure 38:
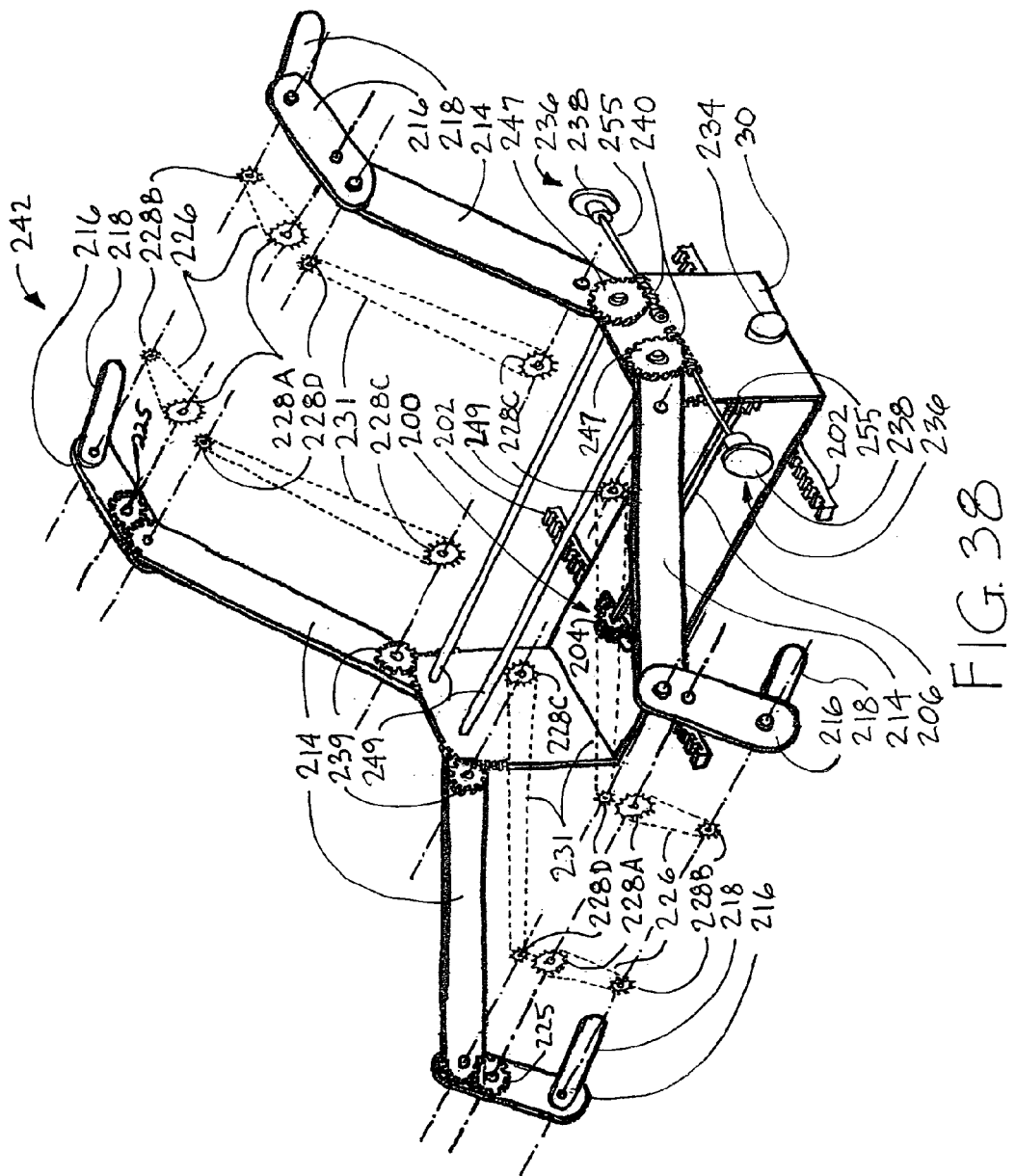
FIG. 38 is a perspective view of another embodiment understructure having three hand cranks to operate seat movement and a transverse travel apparatus.
Figure 39:
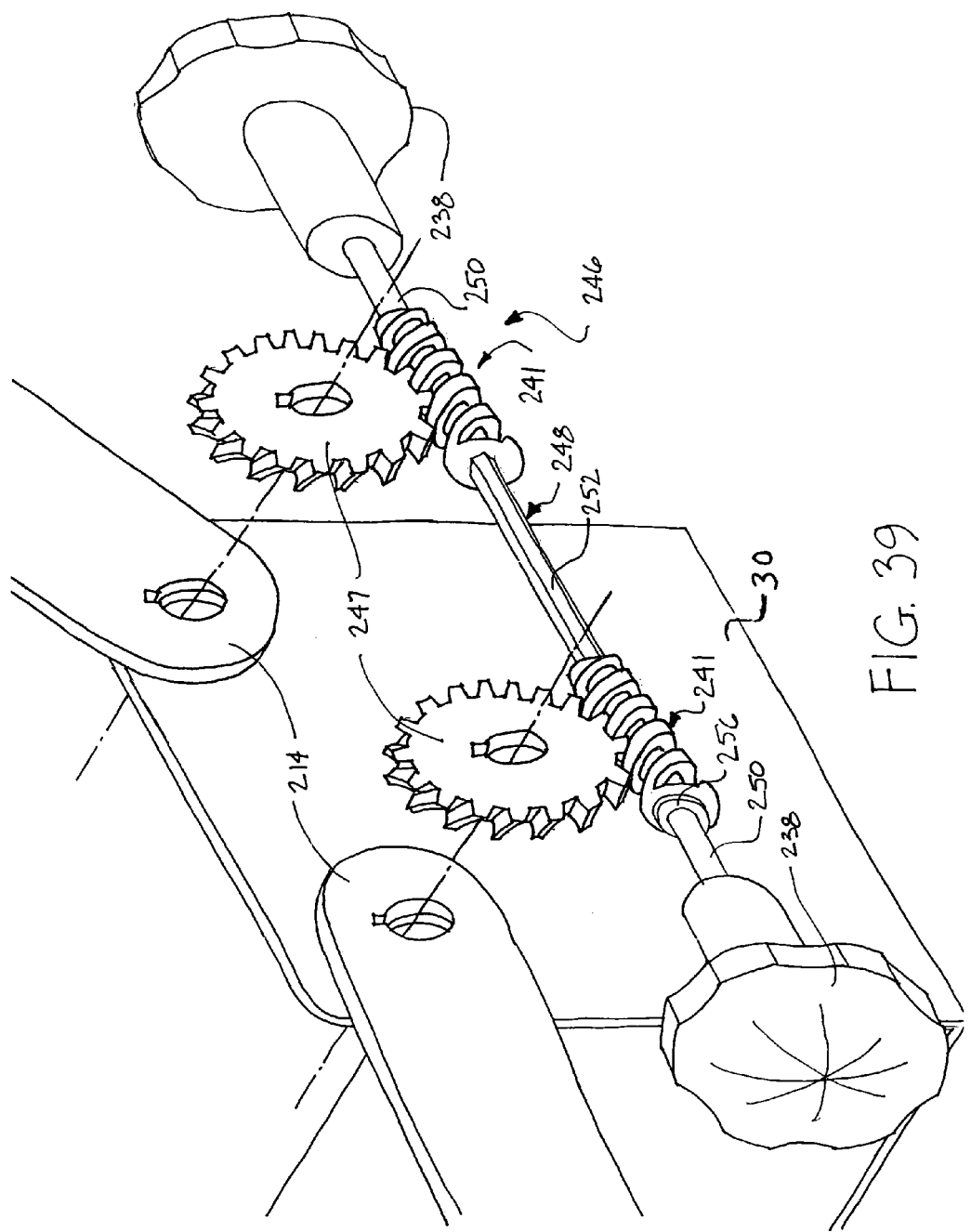
FIG. 39 is a partially exploded view of the hand crank of the understructure of FIG. 38.

In yet another similar embodiment, FIG. 38 shows understructure 242 with a hand crank 234, and two hand cranks 236. Each hand crank 236 is positioned to control the position of respective back support 214, shoulder support 216, and headrest support 218 by linkages 226, 231. More specifically, each crank 236 includes a handle 238, a rod 255, and a threaded cylinder 240. Rod 239 includes a key to engage a keyway on handle 238 and threaded cylinder 240. The key/keyway prevents rotational movement between rod 239, handle 238, and threaded cylinder 240. Accordingly, rotation of handle 238 causes rotation of threaded cylinder 240. As previously described with respect to FIG. 34, rotation of threaded cylinder 240 causes rotation of gear 247. Rotation of gear 247 causes movement of attached back support 214 and also of rod 249. Rotation of rod 249 causes rotation of the other back support 214 to which rod 249 is attached to thereby cause both back supports 214 of a support 32, 34 to move concurrently. Movement of back support 214 causes gear 239 to rotate as the teeth of gear 239 engage teeth on mount 30. Rotation of gear 239 causes rotation of axially connected chain ring 228C. Movement is then translated to shoulder support 216 and headrest support 218 via linkages 231, 226 as previously described.

Hand crank 234 is coupled to rod 206 to operate transverse travel assembly 200. Rotation of crank 234 rotates pinion gears 204 causing travel along racks 202.

Figure 40:
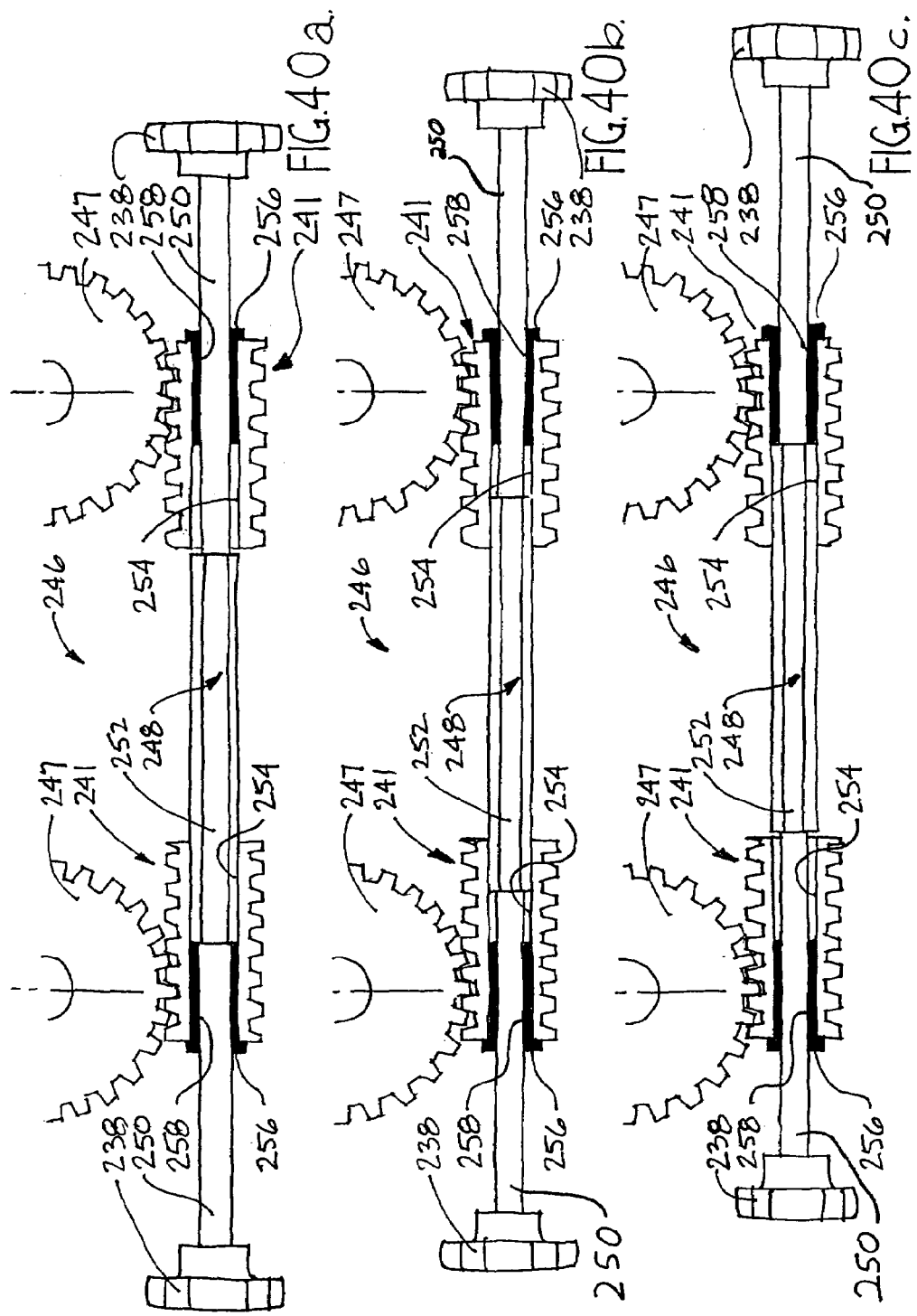
FIG. 40a–c are cross sectional views of the hand crank of FIG. 39.

Another embodiment hand crank 246 is shown in FIGS. 39 and 40a–c. Hand crank 246 includes handles 238, threaded cylinders 241, and gears 247 similarly to hand crank 236. Two handles 238 are provided with a common rod 248 therebetween. Rod 248 includes two cylindrical portions 250 and a hexagonal portion 252 between the two cylindrical portions 250. Cylindrical portions 250 are fixedly coupled to handles 238 and hexagonal portion 252. Rotation of any one of handles 238, cylindrical portions 250, or hexagonal portion 252 results in rotation of all the other attached parts. Each threaded cylinder 241 includes a hexagonal bore 254 therein. Hexagonal bore 254 is sized to slidably receive hexagonal portion 252 of rod 248 therein. When hexagonal portion 252 is received within hexagonal bore 254, rod 248 is fixed rotationally relative to threaded cylinder 241. As shown in FIG. 40, threaded cylinders 241 are spaced at a fixed distance from each other which corresponds to the respective gears 247 associated therewith. Hexagonal portion 252 of rod 248 slides in hexagonal bores 254 of threaded cylinders 241. The sliding travel of rod 248 within threaded cylinders 241 is limited by stoppers 256 placed in outside ends of threaded cylinders 241. Stoppers 256 fit within and extend approximately halfway into hexagonal bores 254. Stoppers 256 have cylindrical bores 258 therein to slidably receive cylindrical portions 250 therein. Such relationship allows rod 248 to assume a plurality of functional positions relative to threaded cylinders 241. FIG. 40a shows rod 248 in a first position. The first position has rod 248 placed at the extreme left end of its travel. The extreme left position places hexagonal portion 252 within hexagonal bore 254 of left threaded cylinder 241 and removes hexagonal portion 252 from hexagonal bore 254 of the right threaded cylinder 241. In the first position, rotation of handle 238 and rod 248 results in rotation of left threaded cylinder 241 with no such movement of right threaded cylinder 241. Thus, the first rod position allows movement of left back support 214 independently of the right back support 214 as viewed in FIG. 40a. This allows adjustable angle movement of the seat 198. FIG. 40b shows a second position where rod 248 assumes a middle position wherein hexagonal portion 252 engages hexagonal bores 254 of both the right and left threaded cylinders 241. By so engaging both threaded cylinders 241, rotation of handle 238 and rod 248 results in adjustment of both right and left back supports 214. It should be appreciated that the threads on both threaded cylinders are similarly-handed threads (both right handed, or both left handed). Therefore, raising of left back support 214 is accompanied by lowering of right back support 214 and vise-versa. This provides understructure 242 with a fixed angle setting. FIG. 40c shows rod 248 in a third position. The third position has rod 248 placed at the extreme right end of its travel. The extreme right position places hexagonal portion 252 within hexagonal bore 254 of right threaded cylinder 241 and removes hexagonal portion 252 from hexagonal bore 254 of the left threaded cylinder 241. In the third position, rotation of handle 238 and rod 248 results in rotation of right threaded cylinder 241 with no such movement of left threaded cylinder 241. Thus, the third rod position allows movement of right back support 214 independently of left back support 214 as viewed in FIG. 40c. This allows adjustable angle movement of seat 198. It should be appreciated that while the figures show the shoulder support 216 and headrest supports 218 as controlled by linkages 226, 231, shoulder supports 216 and headrest supports 218 may be independently controlled by hand cranks 224, 226 similar to those shown in FIGS. 30 and 32.

Figure 41:
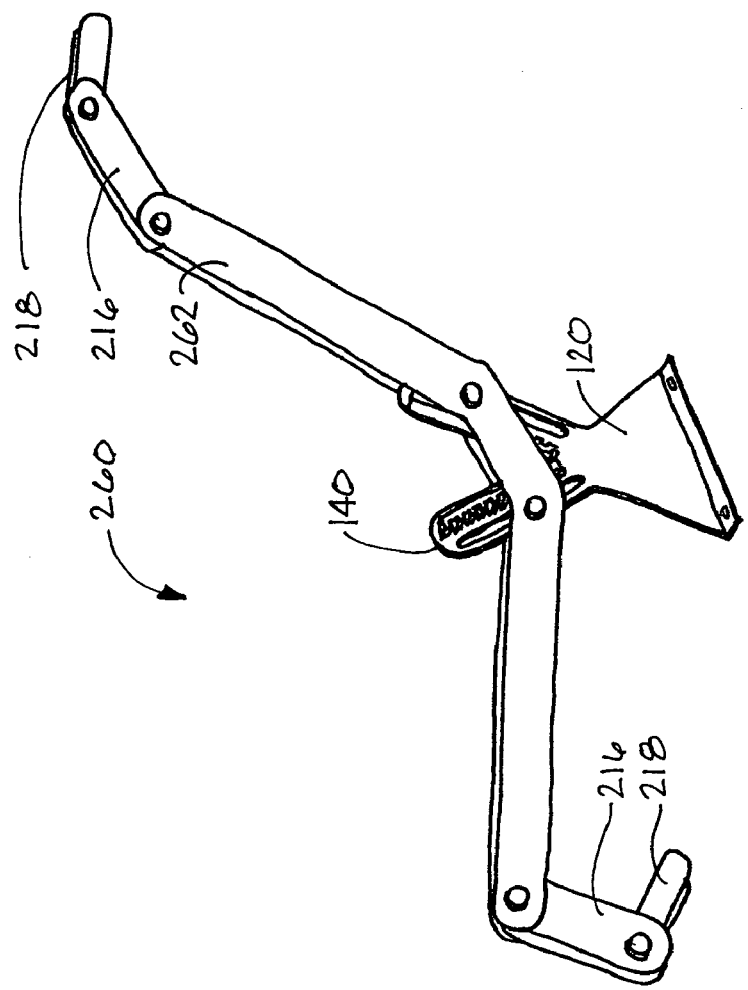
FIG. 41 is a perspective view of another embodiment understructure.
Figure 42:
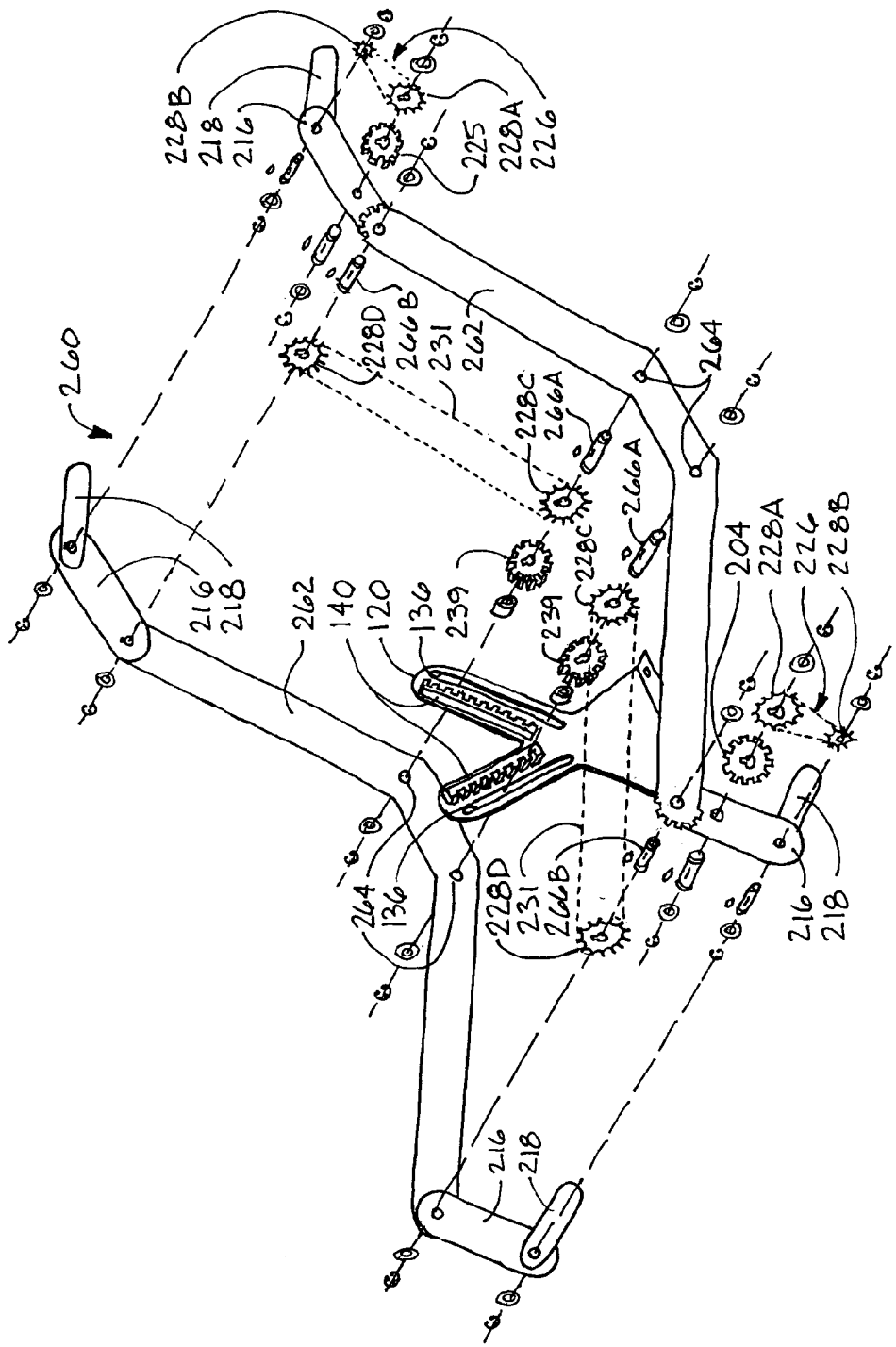
FIG. 42 is an exploded view of the understructure of FIG. 41.

FIGS. 41 and 42 show a fixed angle embodiment understructure 260 that utilizes a bracket 120 similar to bracket 120 previously described and shown in FIG. 12. FIGS. 41 and 42 show one side of understructure 260. It should be appreciated that a second side would be employed to complete understructure 260. Each side of understructure 260 includes bracket 120, two fixed angle back support armatures 262, four shoulder supports 216, four headrest supports 218, and a plurality of gears 225, 239 and linkages 226, 231. Each back support armature 262 includes two lower voids 264. Each void 264 is configured to receive an axle 266A of linkages 231. In addition to being part of linkages 231, axle 266A receives gear 239 thereon, engages slot 136, and engages a lower void 264 on two back support armatures 262 as shown in FIG. 42. Axle 266 engages gears 239 with a key and keyway type design such that rotation of one gear 239 requires movement of coupled linkages 231 by requiring corresponding movement therebetween. Each back support armature 262 includes a shoulder support 216 at each end thereof. Rotation of chain rings 228D of linkages 231 cause shoulder supports 216 to rotate therewith via an axle 266B. Rotation of shoulder supports 216 cause rotation of respective gears 225 and chain rings 228A. Such rotation likewise causes rotation of chain rings 228B and associated headrest support 218. Assembly of the understructure 260 results in the back support armatures 262, shoulder support 216, and headrest supports 218 coming together to have linkages 231, gears 239, and bracket 120 therebetween to proscribe movement of supports 262, 216, 218 in a fixed angle motion previously described with respect to other embodiments. More specifically, with respect to understructure 260, movement of back support armatures 262 requires rotation of gear 239 relative to rack 140. Rotation of gear 239, through co-axial chain ring 228C, requires movement of the linkages 231 which, as previously described, proscribe the desired positions of supports 216, 218 through linkages 226 and gears 225.

Figure 43:
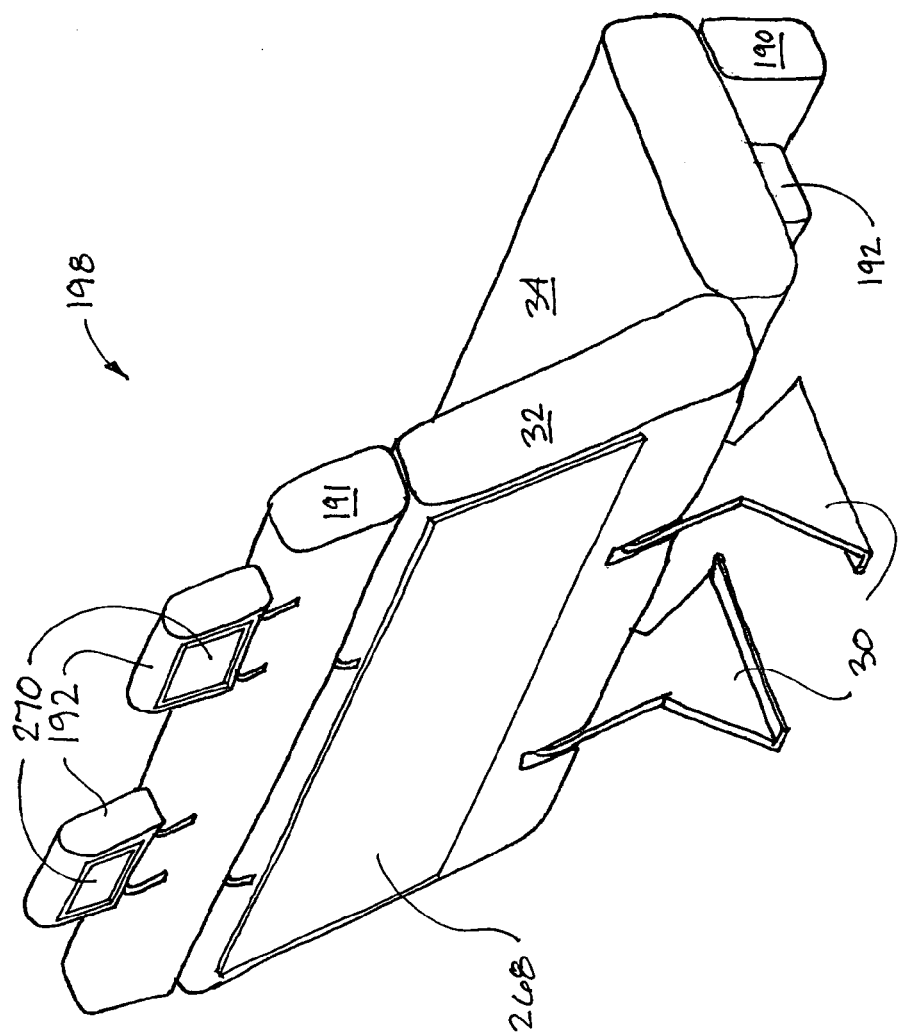
FIG. 43 is a perspective view of another embodiment seat similar to the seat of FIG. 21 and including a table and video screens.
Figure 44:
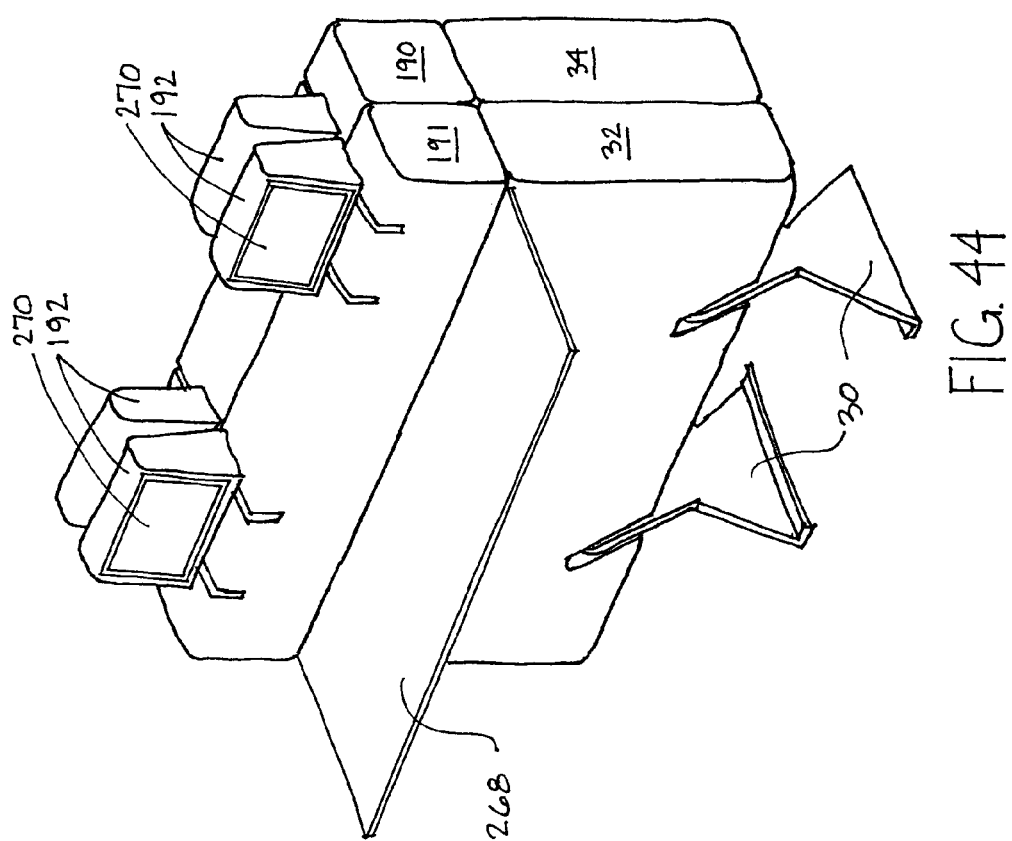
FIG. 44 is a perspective view of the seat of FIG. 43 in a folded up position with the table extended.

FIGS. 43 and 44 show various options that can be added to the seats 10, 198 previously described herein. One such option is a collapsible table 268. FIG. 43 shows seat 198 in a rearward position with table 268 in a stowed position. FIG. 44 shows seat 198 in a folded up position with table 268 in an extended position. Another option shown is to have video screens 270 in headrests 192 as shown in both FIGS. 43 and 44. Earlier embodiments, such as those shown in FIG. 1 have removable headrests. Such embodiments may encompass a video screen 270 having electrical connections in the openings 42 and in posts received in openings 42 to power screen 270. Alternatively, video screens 270 are located in shoulder portions 190, 191.

Figure 45:
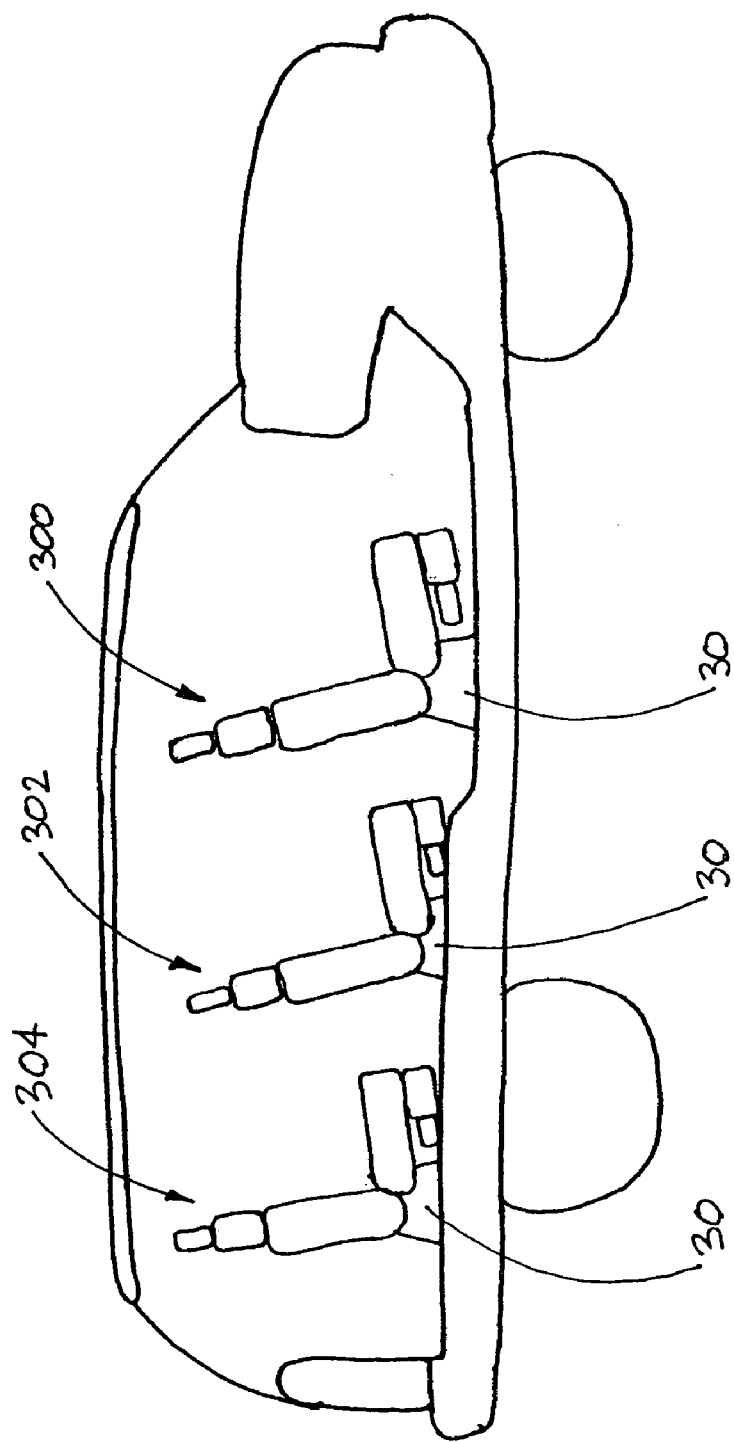
FIG. 45 is a cross-sectional view of seats located in a vehicle.
Figure 46:
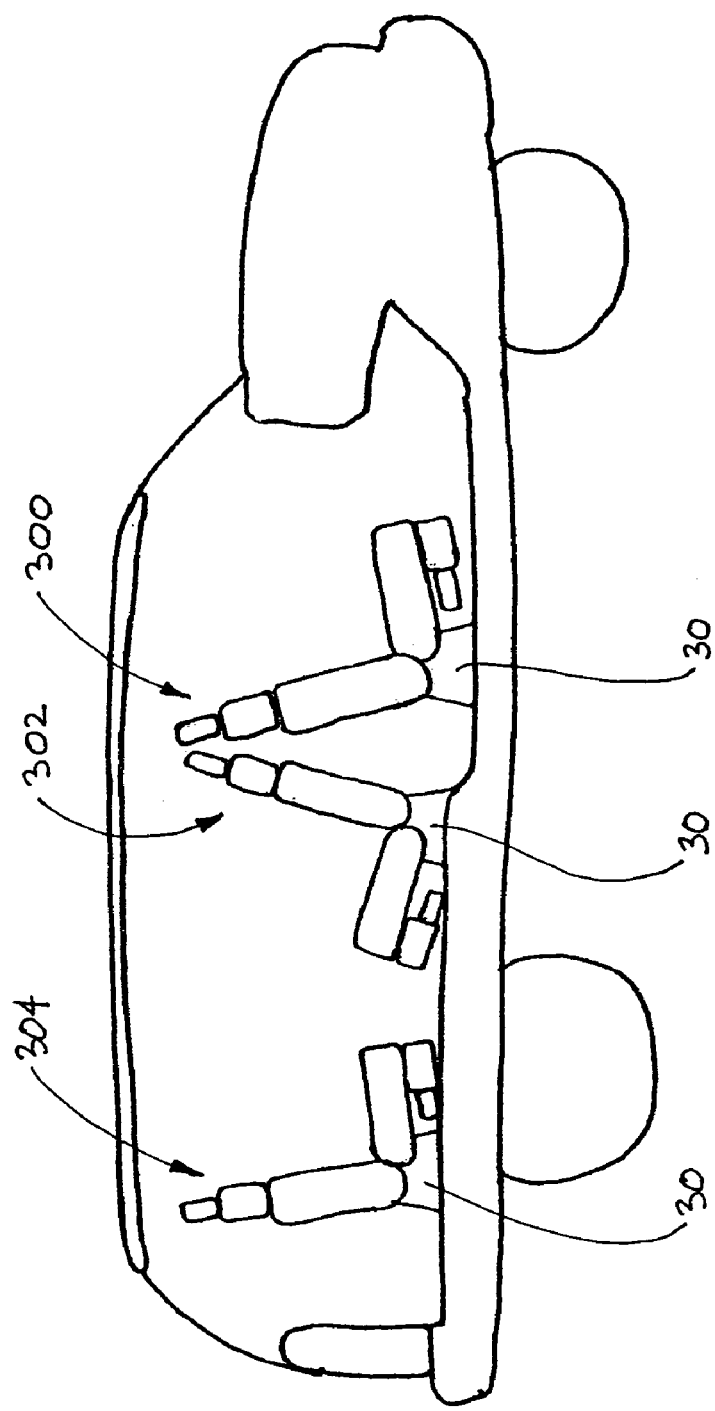
FIGS. 46–54 are cross-sectional views of the vehicle of FIG. 45 with various seat orientations.
Figure 47:
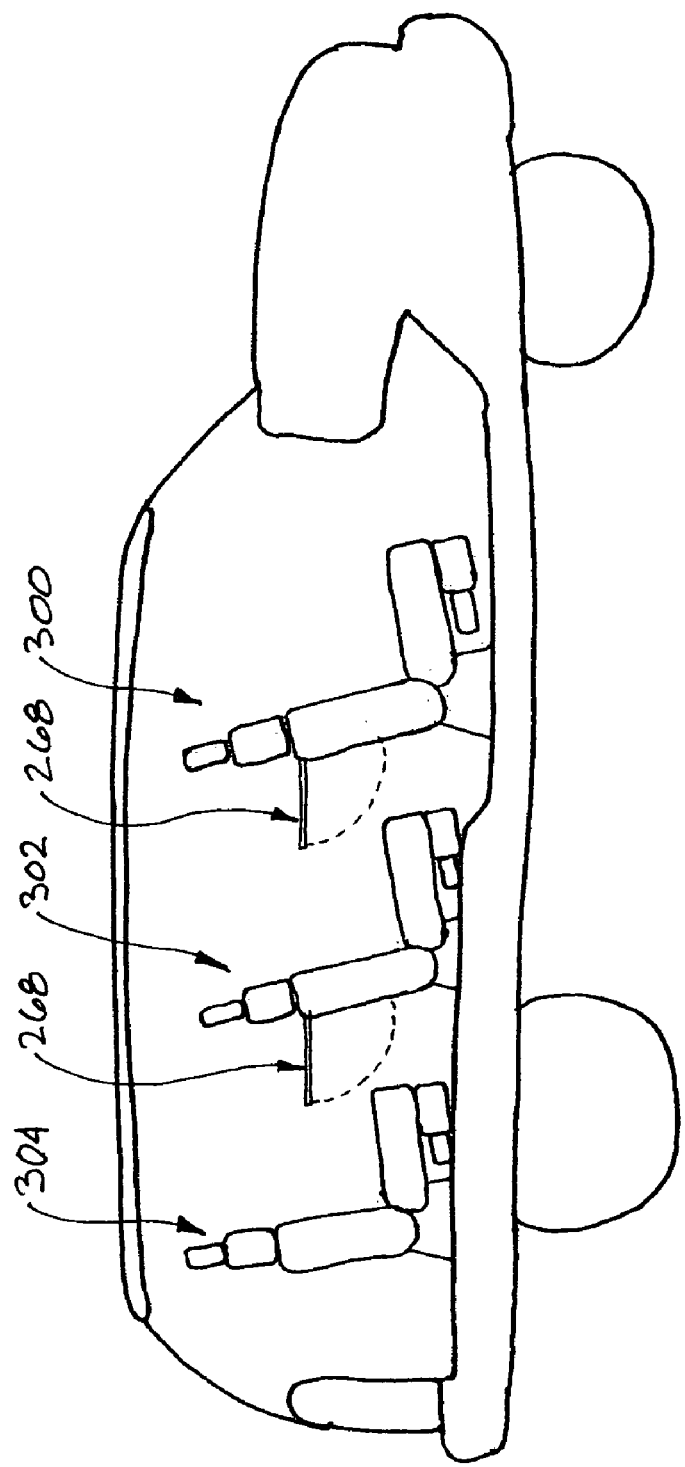

FIGS. 45–54 show seats 198 in a vehicle and in various configurations with various attachments. FIG. 45 shows a vehicle with a front seat 300, a second seat 302, and a third seat 304, all facing forward. FIG. 46 shows the vehicle of FIG. 45 with the middle seat facing rearward. The second seat 302 has reversed its direction and has also employed a transverse travel assembly 200 to move its base 30 forward relative to the floor of the vehicle. FIG. 47 shows the vehicle of FIG. 45 with tables 268 extending from front and middle seats 300, 302. As can be appreciated, the seats 300, 302, 304 are spaced relative to one another to allow extension of the tables 268 without contacting the adjacent seat 302, 304.

Figure 48:
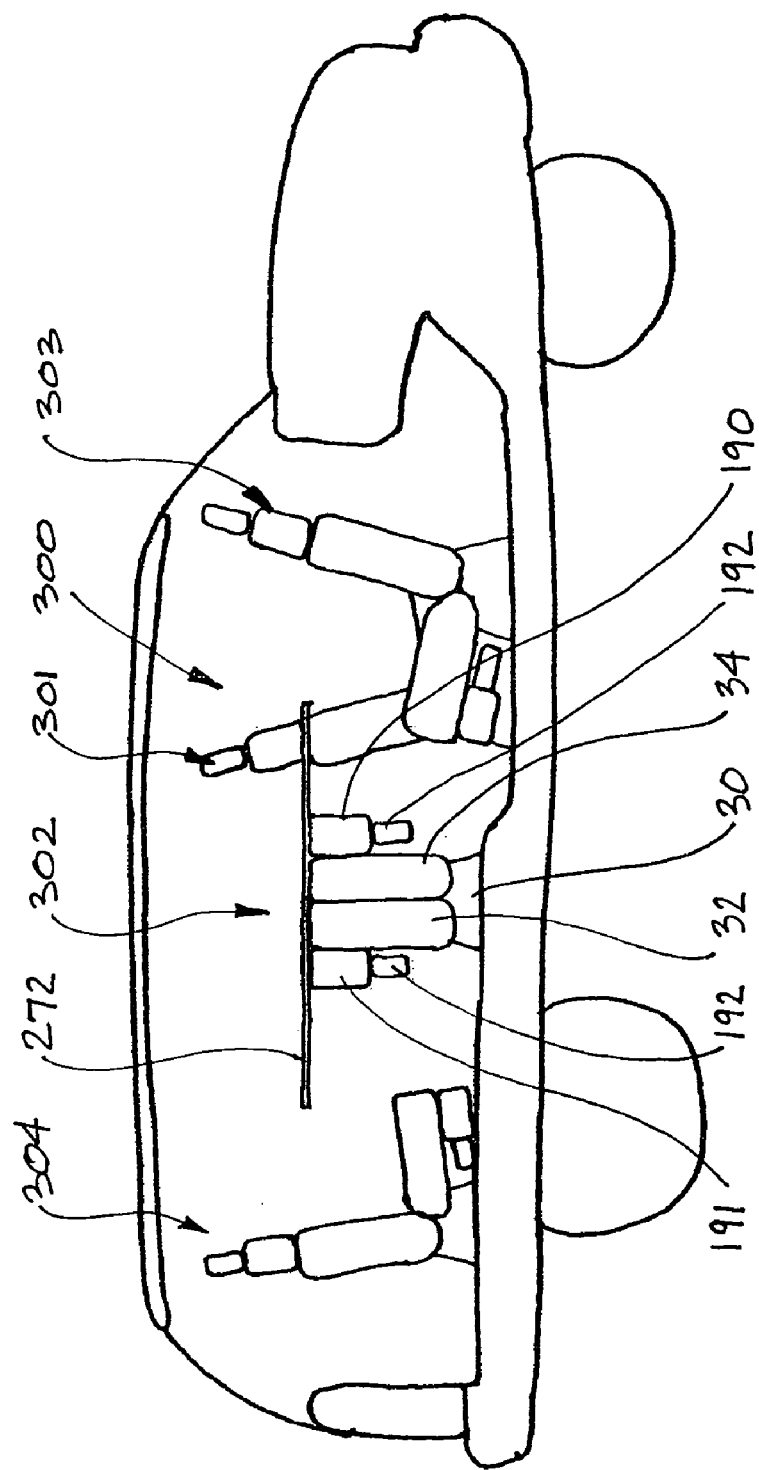
Figure 49:
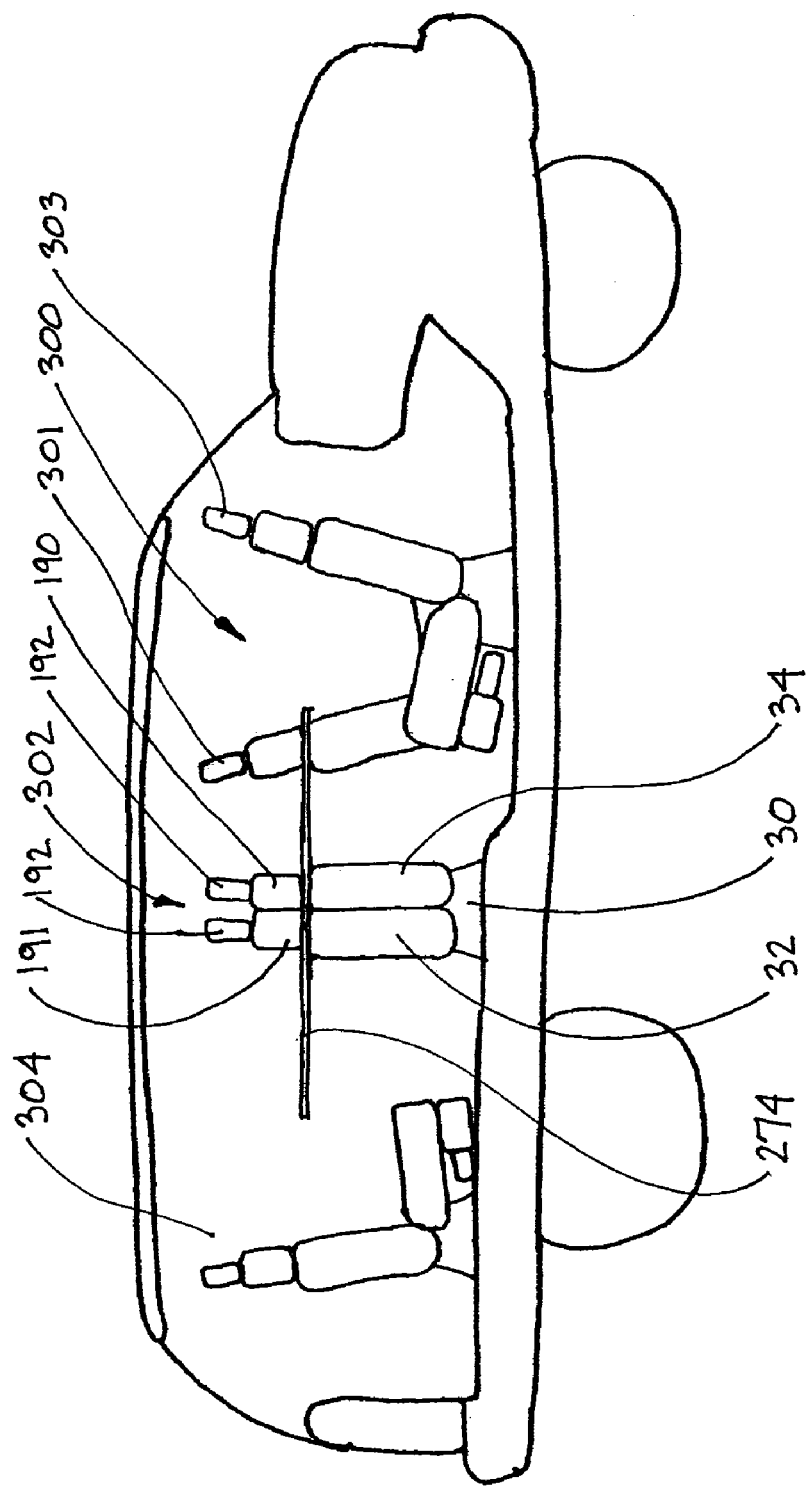

FIG. 48 shows a variety of alterations relative to FIG. 45. First, the front seat 300 is a split seat rather than a bench seat. Split seat 300 allows a driver's side seat 301 to be positioned independently of a passenger's side seat 303. FIG. 48 shows the passenger side front seat 303 in a rearward position while the driver side seat 301 is in a forward position. Second seat 302 has been placed in a partially folded up position. The partially folded up position involves placing the first and second supports 32, 34 in the folded up position, placing the shoulder portions 190, 191 in the retracted position, and placing the headrests 192 in the raised position. Once second seat 302 is so positioned, a table 272 is manually attached to second seat 302. Table 272 is able to present a plurality of configurations to adapt to the various seat configurations. As shown in FIG. 48, table 272 extends farther on the passenger side front than on the driver side front due to the forward facing of the driver side seat 301. FIG. 49 shows another embodiment table 274 that is attachable or extendable when second seat 302 is in the folded up position. Table 274, like table 272, is able to present a plurality of configurations to adapt to the various seat configurations.

Figure 50:
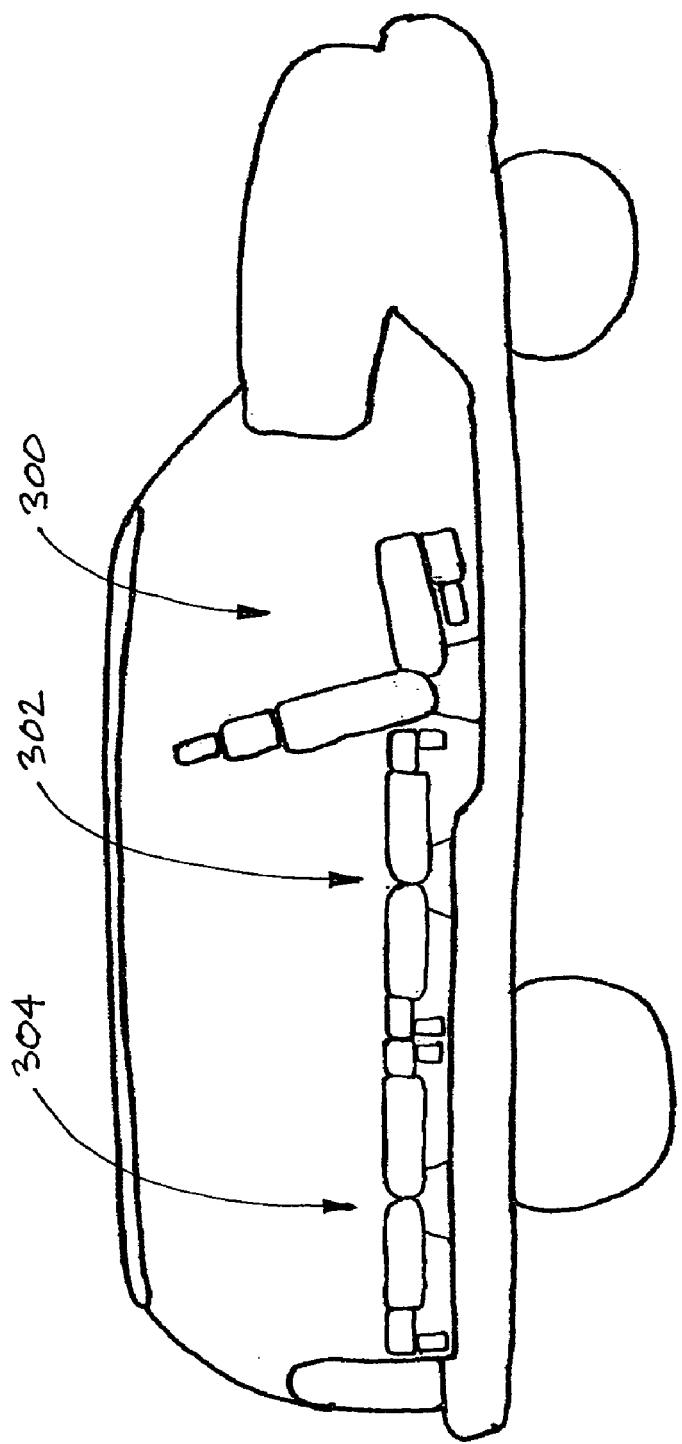
Figure 51:
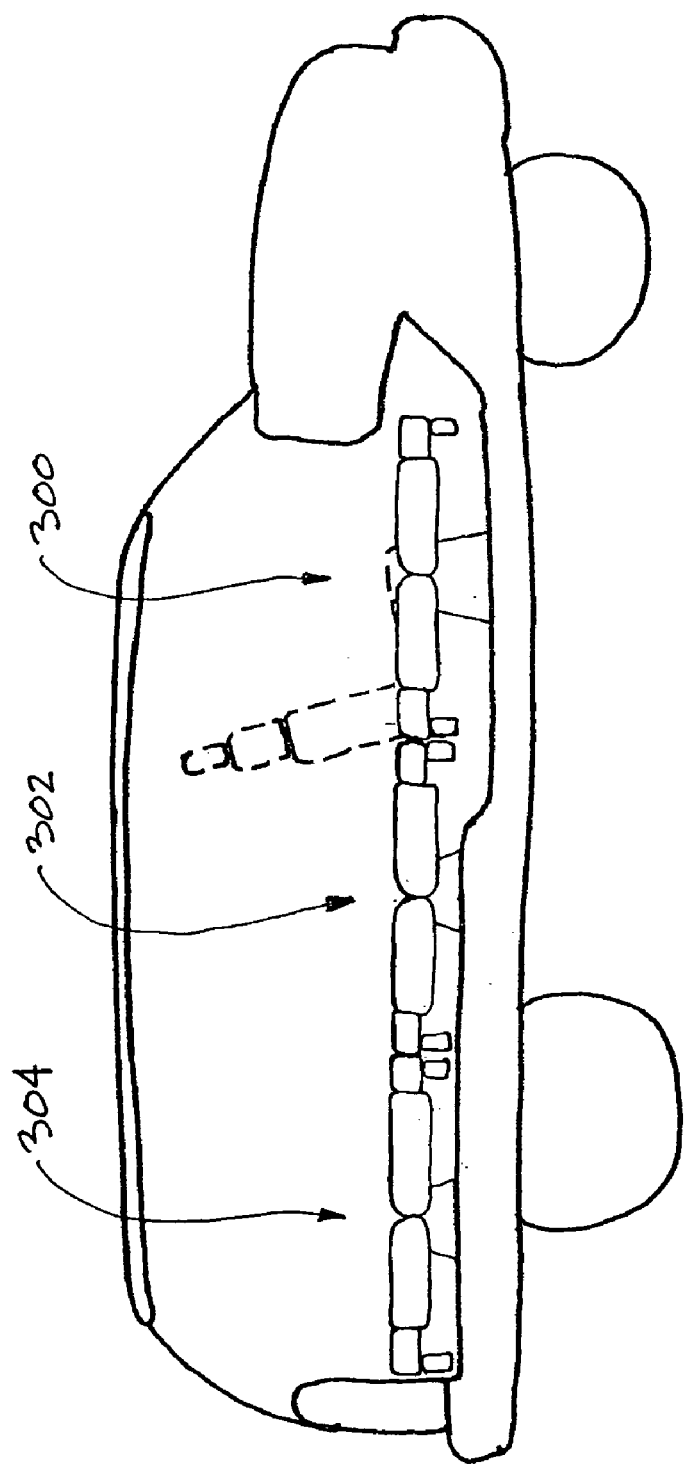

FIG. 50 shows front seat 300 facing forward and second and third seats 302, 304 in the folded down position to allow storage or sleeping space. FIG. 51 also places front seat 300 in the folded down position. Such a configuration would preferably be used when the vehicle is not in motion.

Figure 52:
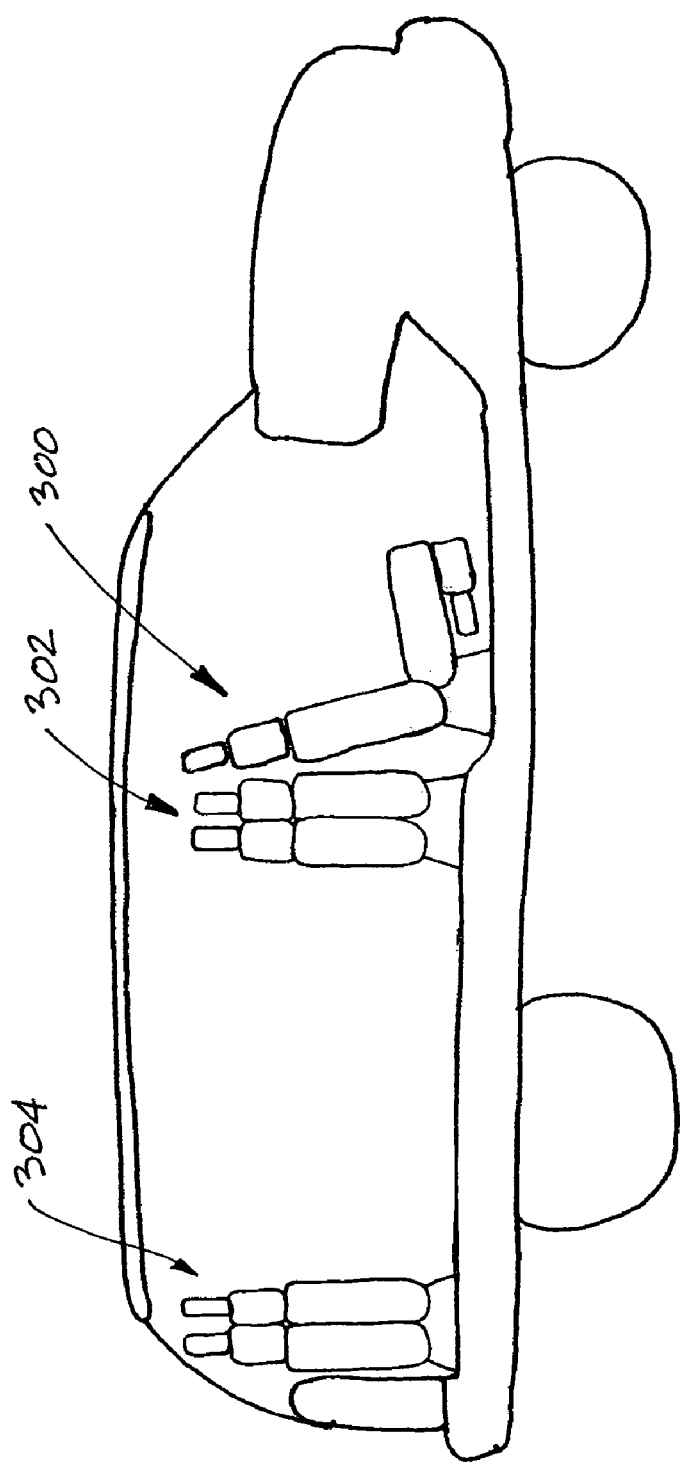

FIG. 52 places front seat 300 facing forward and second and third seats 302, 304 in the folded up position. Second and third seats 302, 304 are specifically noted as having transverse travel assemblies 200 (not pictured in FIG. 52) such that a wide area is made available between the seats.

Figure 53:
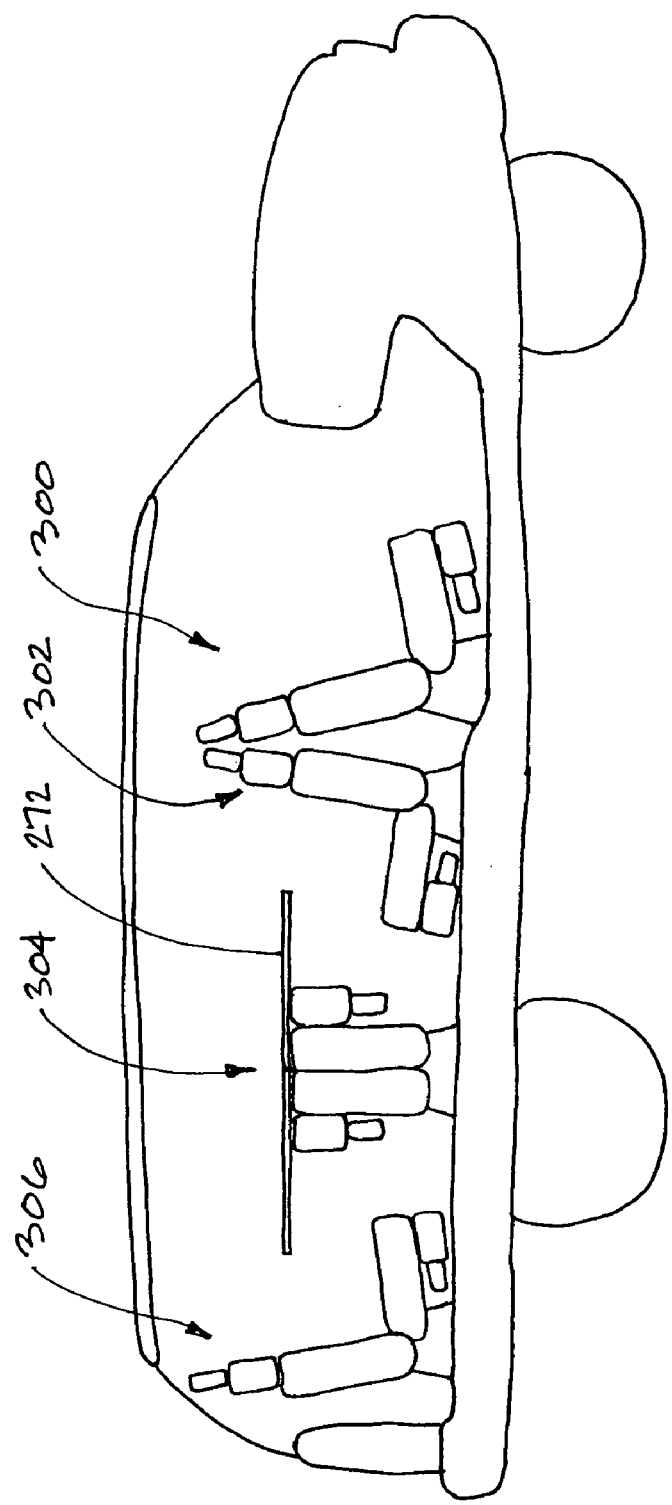
Figure 54:
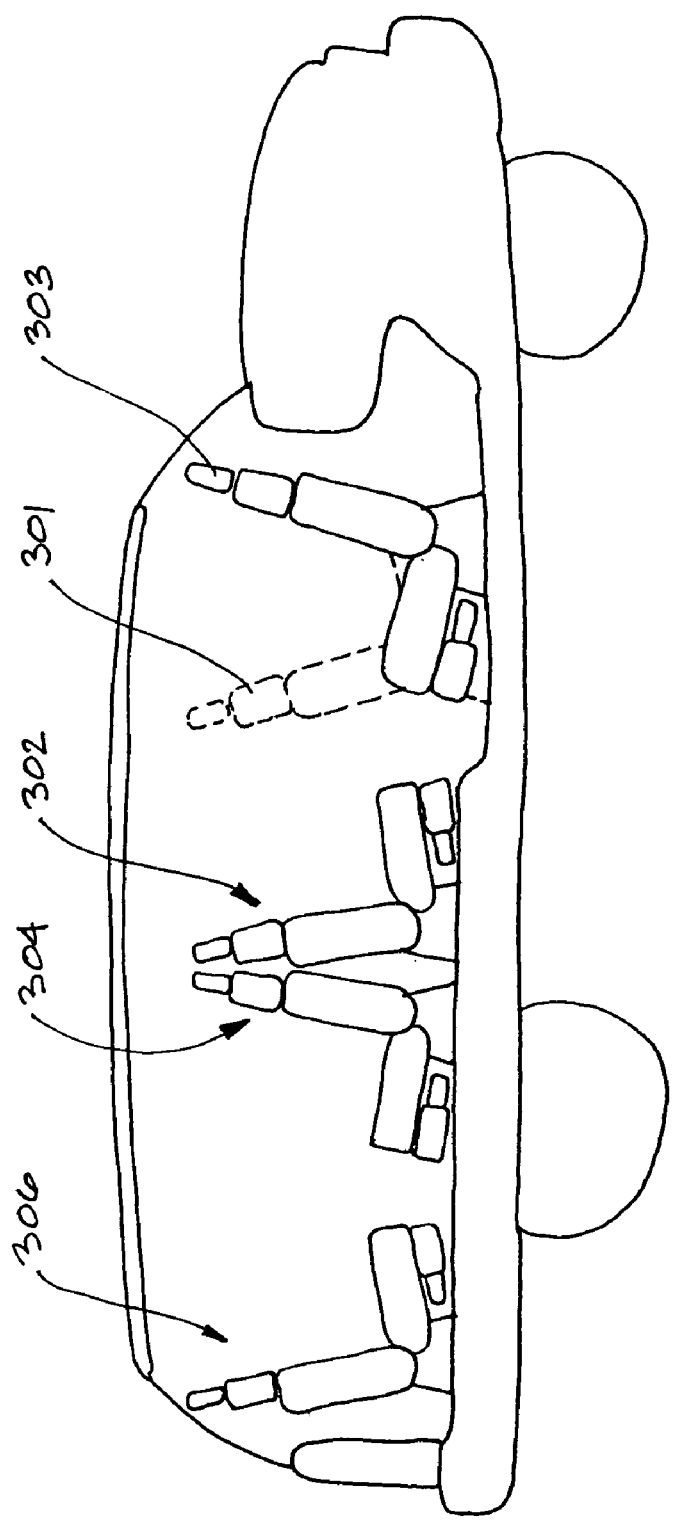

FIG. 53 adds a fourth seat 306. It may be necessary to increase the interior volume of the vehicle in order to fit fourth seat 306 therein. In such cases, the volume altering devices described in U.S. Provisional Patent Application Ser. Nos. 60/476,257 and 60/476,155 may be employed, the specifications of which are incorporated by reference. Third seat 304 is placed to support a table 272 while in the partially folded up position similar to the partially folded up position of second seat 302 in FIG. 48. FIG. 54 shows another configuration for the four seats 300, 302, 304, 306. Front passenger seat 303 is facing rearward, front driver side seat 301 is shown in phantom, second seat 302 is facing forward, third seat 304 is facing rearward, and fourth seat 306 is facing forward.

The foregoing description of the invention is illustrative only, and is not intended to limit the scope of the invention to the precise terms set forth. Although the invention has been described in detail with reference to certain illustrative embodiments, variations and modifications exist within the scope and spirit of the invention as described and defined in the following claims.

What is claimed is:

1. A vehicle including a
    body having a floor, and
    an adjustable seat including
        a first support having a first end and a second end;
        a second support having a first end and a second end, the second support first end being connected to the first support first end to form a seat having a first side and a second side;
        a mount configured for attachment to the vehicle; and
        a headrest, each of the first support and the second support including an opening for receiving the headrest,
        wherein the seat is movable between a forward orientation wherein the first support forms a first angle relative to the floor and the second support forms a second angle relative to the floor, and a rearward orientation wherein the first support forms the second angle and the second support forms the first angle.

2. The vehicle of claim 1, wherein the seat further includes a pair of rods extending between the mount and the sides of the seat, the mount includes a plurality of openings, the rods being connected to the sides and extending into the openings.

3. The vehicle of claim 2, wherein the opening is an elongated slot having an axis of elongation that is substantially parallel to the floor when the mount is attached to the floor.

4. The vehicle of claim 1, wherein the seat further includes a pair of rods extending between the mount and the sides of the seat, each side includes an opening, the rods being connected to the mount and extending into the openings.

5. The vehicle of claim 1, wherein the second angle is greater than the first angle.

6. The vehicle of claim 1, wherein the seat further includes a pair of rods extending between the mount and the sides of the seat, the rods are movable in a forward direction and a rearward direction relative to the mount.

7. The vehicle of claim 1, wherein a pair of pins extends from each of the seat sides and the mount includes a pair of notches, one of the pins of each pair of pins being received by one of the notches of each pair of notches when the seat is in the forward orientation, and the other of the pins being received by the other of the notches when the seat is in the rearward orientation.

8. The vehicle of claim 1, wherein the first support includes a first pin, the second support includes a second pin, and the mount includes a forward notch and a rearward notch, the first pin being received by the forward notch when the seat is in the forward orientation, and the second pin being received by the rearward notch when the seat is in the rearward orientation.

9. The vehicle of claim 8, wherein the seat further includes a pair of rods extending between the mount and the sides of the seat, one of the rods is positioned adjacent the rearward notch when the seat is in the forward orientation and adjacent the forward notch when the seat is in the rearward orientation.

10. The vehicle of claim 8, further including a retainer having a body, a first arm extending from the body, and a second arm extending from the body, the first arm capturing the second pin when the seat is in the forward orientation, and the second arm capturing the first pin when the seat is in the rearward orientation, thereby inhibiting rotation of the seat.

11. The vehicle of claim 10, further including a biasing element connected to the retainer, the biasing element biasing the first arm into engagement with the second pin when the seat is in the forward orientation, and biasing the second arm into engagement with the first pin when the seat is in the rearward orientation.

12. The vehicle of claim 11, the seat further includes a pair of rods extending between the mount and the sides of the seat, wherein the retainer body includes an opening for receiving one of the rods, the body opening moving over the one rod as the retainer arms are moved into and out of engagement with the pins.

13. A vehicle including a
body having a floor, and
a seat including
    a first support;
    a second support; and
    a mount configured for mounting to the vehicle to support the first and second supports above a floor of the vehicle; and
a headrest, each of the supports including an opening for receiving the headrest;
wherein the supports are pivotable about an axis between a forward orientation wherein the second support is substantially upright relative to the floor and a rearward orientation wherein the first support is substantially upright relative to the floor.

14. The vehicle of claim 13, wherein the first support includes a first pin, the second support includes a second pin, and the mount includes a forward notch and a rearward notch, the first pin being received by the forward notch when the supports are in the forward orientation, and the second pin being received by the rearward notch when the supports are in the rearward orientation.

15. The vehicle of claim 14, wherein the seat further includes a rod extending from the mount, the rod is positioned adjacent the rearward notch when the supports are in the forward orientation and adjacent the forward notch when the supports are in the rearward orientation.

16. The vehicle of claim 14, further including a retainer having a body, a first arm extending from the body, and a second arm extending from the body, the first arm capturing the second pin when the supports are in the forward orientation, and the second arm capturing the first pin when the supports are in the rearward orientation, thereby inhibiting rotation of the supports.

17. The vehicle of claim 16, further including a biasing element connected to the retainer, the biasing element biasing the first arm into engagement with the second pin when the supports are in the forward orientation, and biasing the second arm into engagement with the first pin when the supports are in the rearward orientation.

18. The vehicle of claim 17, wherein the seat further includes a rod extending from the mount, the retainer body includes an opening for receiving the rod, the body opening moving over the rod as the arms move into and out of engagement with the pins.

19. The vehicle of claim 13, wherein the second support extends a first horizontal distance from the mount and the first support extends a second horizontal distance from the mount when the supports are in the forward orientation, and the second support extends a third horizontal distance from the mount and the first support extends a fourth horizontal distance from the mount when the supports are in the rearward orientation.

20. The vehicle of claim 19, wherein the third distance is greater than the first distance and the fourth distance is greater than the second distance.

21. The vehicle of claim 19, wherein the third distance is substantially equal to the first distance and the fourth distance is substantially equal to the second distance.

22. A vehicle including a
body having a floor, and
a seat including
    a first support;
    a second support;
    a mount configured for attachment to the vehicle; and
    a powered drive mechanism connected to the mount for moving the first and second supports about an axis that is substantially parallel to a floor of the vehicle between a first position wherein the supports form a seat in a forward orientation, and a second position, wherein the supports form a seat in a rearward orientation.

23. The vehicle of claim 22, wherein the mount includes a rack having a plurality of teeth and the drive mechanism includes a first pinion gear having a plurality of teeth sized to mesh with the rack teeth as the first pinion gear rotates, thereby causing movement of the supports between the first and second positions.

24. The vehicle of claim 23, wherein the drive mechanism further includes a gearbox, the gearbox including a drive rod connected to the first pinion gear for causing rotation of the first pinion gear.

25. The vehicle of claim 23, wherein the drive mechanism further includes a gearbox having a drive rod that rotates upon activation of the gearbox, a drive pinion connected to the drive rod for rotation therewith, and an idler gear rotatably mounted such that rotation of the drive pinion causes rotation of the idler pinion, which in turn causes rotation of the first pinion.

26. The vehicle of claim 23, wherein the mount includes a pair of substantially parallel plates, each of said plates having a slot, the drive mechanism including a first shaft connected to the first pinion gear and extending partially into the slots.

27. The vehicle of claim 26, wherein the rack is connected to one of the plates such that the rack teeth are positioned adjacent the slot of the one plate.

28. The vehicle of claim 26, wherein each of the slots has a first portion extending between a first end of the slot and a midpoint of the slot, and a second portion extending between a second end of the slot and the midpoint, the first portion and the second portion diverging from one another with distance from the midpoint.

29. The vehicle of claim 28, wherein the drive mechanism further includes a second pinion gear and a second shaft connected to the second pinion gear and extending partially into the slots, the first pinion gear being positioned adjacent the first end of one of the slots and the second pinion gear being positioned adjacent the midpoint of the one slot when the supports are in the first position, and the first pinion gear being positioned adjacent the midpoint of the one slot and the second pinion gear being positioned adjacent the second end of the one slot when the supports are in the second position.

30. The vehicle of claim 22, wherein the axis moves vertically and horizontally relative to the mount as the supports move between the first and second positions.

31. A vehicle including a
    body having a floor, and
    a seat including
    a first support having a first surface,
    a second support having a second surface;
    a mount adapted for connection to the vehicle; and
    a powered drive mechanism interacting with the mount to move the first and second supports between a first position wherein the first surface is substantially perpendicular to a floor of the vehicle, and a second position wherein the first surface is substantially parallel to the floor, the second surface being substantially parallel to the floor when in the first position and substantially perpendicular to the floor when in the second position.

32. A vehicle including a
    body having a floor, and
    a seat including
    a first support having a first surface,
    a second support having a second surface;
    a mount adapted for connection to the vehicle;
    a drive mechanism interacting with the mount to move the first and second supports between a first position wherein the first surface is substantially perpendicular to a floor of the vehicle, and a second position wherein the first surface is substantially parallel to the floor, the second surface being substantially parallel to the floor when in the first position and substantially perpendicular to the floor when in the second position, and
    a support assembly configured to increase a vertical dimension of the first surface when in the first position and the second surface when in the second position.

33. The vehicle of claim 32, wherein the first support includes an opening for receiving the support assembly when in the first position, and the second support includes an opening for receiving the support assembly when in the second position.

34. The vehicle of claim 32, wherein the support assembly includes an upper portion having an opening and a headrest portion having a post, the upper portion opening being configured to removably receive the headrest portion post.

35. The vehicle of claim 32, further including a sensor for sensing when the first and second supports are in the first position and when the first and second supports are in the second position.

36. The vehicle of claim 32, further including a sensor for sensing presence of an object on the seat.

37. The vehicle of claim 32, further including a sensor for sensing interference between an object and the seat as the first and second supports are moving between the first and second positions.

38. The vehicle of claim 32, wherein the drive mechanism includes a first shaft having a first pair of ends with a first pair of pinion gears mounted thereto, and a second shaft mounted in parallel relationship to the first shaft, the second shaft having a second pair of ends with a second pair of pinion gears mounted thereto.

39. The vehicle of claim 38, wherein the mount includes a pair of racks, each having a first segment and a second segment connected together at a midpoint, the first and second rack segments diverging from one another with distance from the midpoint.

40. The vehicle of claim 39, wherein one of the pinion gears of the first pair of pinion gears is positioned adjacent the midpoint of one of the racks and one of the pinion gears of the second pair of pinion gears is positioned adjacent the midpoint of the other of the racks when the first and second supports are in the first position, and the other of the pinion gears of the first pair of pinion gears is positioned adjacent the midpoint of the one rack and the other of the pinion gears is positioned adjacent the midpoint of the other rack when the first and second supports are in the second position.

41. The vehicle of claim 40, wherein portions of the shafts move within a first V-shaped slot formed in the mount adjacent the one rack and other portions of the shafts move within a second V-shaped slot formed in the mount adjacent the other rack as the first and second supports move between the first position and the second position.

42. A vehicle including:
    a frame; and
    an adjustable seat supported by the frame, the adjustable seat including
    a first support including a first section and a second section; and
    a second support including a first section and a second section, the first and second supports each movable between substantially horizontal and substantially vertical positions, placing one of the first and second supports in the substantially horizontal position causes the respective second section to assume a retracted position, and placing one of the first and second supports in the substantially vertical position causes the respective second section to assume an extended position.

43. The vehicle of claim 42, wherein each of the first and second supports further include headrests.

44. The vehicle of claim 42, wherein movement of the first or second support causes movement of the respective second section relative to the respective first section.

45. The vehicle of claim 42, wherein movement of the first section causes movement of the second section.

46. The vehicle of claim 42, wherein movement of the supports is caused by actuation of a motor.

47. The vehicle of claim 42, wherein movement of the supports is caused by actuation of a hand crank.

48. The vehicle of claim 47, wherein the hand cranks is self-locking.

49. The vehicle of claim 42, wherein the first and second supports may simultaneously assume the substantially vertical position.

50. The vehicle of claim 42, wherein the first and second supports may simultaneously assume the substantially horizontal position.

51. The vehicle of claim 42, further including a mount coupling the first and second supports to the frame.

52. The vehicle of claim 51, further including a transverse translation device to move the mount relative to the vehicle frame.

53. The vehicle of claim 42, further including a linkage wherein movement of the first section of the first support acts upon the linkage to cause movement of the second section of the first support.

54. The vehicle of claim 42, further including a self-locking hand crank to position the supports.

55. The vehicle of claim 54, wherein the hand crank includes at least two gears, at least two threaded cylinders, and a multi-diametered rod.

56. The vehicle of claim 55, wherein the rod includes at least one round section and a hexagonal section, the hexagonal section selectively engaging threaded bores of the threaded cylinders, rotation of the rod causing rotation of the engaged threaded cylinder, rotation of the cylinder causing rotation of the respective gear, and rotation of the gear causing movement of the respective support.

57. The vehicle of claim 42, further including a table therein.

58. The vehicle of claim 42, further including a video monitor therein.

59. A vehicle including
a body; and
an adjustable seat operably coupled to the body, the adjustable seat including
a first support including a first section and a second section; and
a second support including a first section configured to support a first portion of a passenger and a second section configured to support a second portion of a passenger positioned at a different longitudinal position than the first portion, the first and second supports each movable between substantially horizontal and substantially vertical positions, the first section of the first support being movable relative to the second section of the first support, the first section of the second support being movable relative to the second section of the second support.

60. The vehicle of claim 59, wherein each of the first and second supports further include headrests.

61. The vehicle of claim 59, wherein movement of the first or second support causes movement of the respective second section relative to the respective first section.

62. The vehicle of claim 59, wherein the first and second supports may simultaneously assume the substantially vertical position.

* * * * *